(12) United States Patent
Liao et al.

(10) Patent No.: US 12,363,320 B2
(45) Date of Patent: *Jul. 15, 2025

(54) BLOCK PARTITIONING METHODS FOR VIDEO CODING

(71) Applicant: ALIBABA GROUP HOLDING LIMITED, Grand Cayman (KY)

(72) Inventors: Ru-Ling Liao, Beijing (CN); Jie Chen, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,770

(22) Filed: Feb. 23, 2024

(65) Prior Publication Data

US 2024/0283946 A1    Aug. 22, 2024

Related U.S. Application Data

(63) Continuation of application No. 17/659,751, filed on Apr. 19, 2022, now Pat. No. 11,949,888, which is a
(Continued)

(51) Int. Cl.
*H04N 19/176*    (2014.01)
*H04N 19/103*    (2014.01)
(Continued)

(52) U.S. Cl.
CPC ........ *H04N 19/176* (2014.11); *H04N 19/103* (2014.11); *H04N 19/186* (2014.11); *H04N 19/513* (2014.11)

(58) Field of Classification Search
CPC .. H04N 19/176; H04N 19/186; H04N 19/103; H04N 19/513; H04N 19/503
See application file for complete search history.

(56) References Cited

U.S. PATENT DOCUMENTS

| | | | |
|---|---|---|---|
| 9,749,651 B2 | 8/2017 | Merkle et al. | |
| 10,742,972 B1 | 8/2020 | Li et al. | |
| | (Continued) | | |

FOREIGN PATENT DOCUMENTS

| | | |
|---|---|---|
| CN | 108028933 A | 5/2018 |
| CN | 109565595 A | 4/2019 |
| | (Continued) | |

OTHER PUBLICATIONS

Japanese Search Report issued in corresponding Japanese Application No. 2021-576628 on Jul. 11, 2024 (43 pages).
(Continued)

*Primary Examiner* — Nam D Pham
(74) *Attorney, Agent, or Firm* — Finnegan, Henderson, Farabow, Garrett & Dunner, LLP

(57) ABSTRACT

The present disclosure provides systems and methods for processing video content. The method can include: partitioning, along a partitioning edge, a plurality of blocks associated with a picture into a first partition and a second partition; performing inter prediction on the plurality of blocks, to generate a first prediction signal for the first partition and a second prediction signal for the second partition; and blending the first and second prediction signals for edge blocks associated with the partitioning edge.

20 Claims, 74 Drawing Sheets

Triangle partition based inter prediction

Related U.S. Application Data continuation of application No. 16/935,835, filed on Jul. 22, 2020, now Pat. No. 11,356,677.

(60) Provisional application No. 62/903,970, filed on Sep. 23, 2019, provisional application No. 62/887,039, filed on Aug. 15, 2019.

(51) Int. Cl.
 *H04N 19/186* (2014.01)
 *H04N 19/513* (2014.01)

(56) References Cited

U.S. PATENT DOCUMENTS

| | | | |
|---|---|---|---|
| 2014/0301470 A1 | 10/2014 | Yie et al. | |
| 2015/0208091 A1 | 7/2015 | Yie et al. | |
| 2017/0332093 A1 | 11/2017 | Merkle et al. | |
| 2018/0199058 A1 | 7/2018 | Lee et al. | |
| 2020/0029087 A1* | 1/2020 | Lim | H04N 19/52 |
| 2020/0213622 A1 | 7/2020 | Xu et al. | |
| 2020/0228828 A1 | 7/2020 | Li et al. | |

FOREIGN PATENT DOCUMENTS

| | | |
|---|---|---|
| JP | 2015144487 A | 8/2015 |
| JP | 2022183333 A | 12/2022 |
| JP | 2023501726 A | 1/2023 |
| WO | 2019039324 A1 | 2/2019 |

OTHER PUBLICATIONS

Chen et al., "Joint Inter-Intra Prediction Based on Mode-Variant and Edge-Directed Weighting Approaches in Video Coding," IEEE International Conference on Accoustic, Speech and Signal Processing, 7372-7376, 2014.
Liao et al., "CE4-related: Simplification of blending weights and motion field storage in geometric merge mode," JVET-P0304-v1, 16$^{th}$ Meeting: Geneva, CH, Oct. 1-11, 2019, 7 pages.
"Requirements for a Future Video Coding Standard v5," International Organisation for Standardisation, Torino, IT, 14 pages (2017).
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
Esenlik et al., "Non-CE4: Geometrical partitioning for inter blocks," JVET-O0489-v4, 15$^{th}$ Meeting: Gothenburg, SE, Jul. 3-12, 2019, 9 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Jem, https://jvet.hhi.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion mailed Oct. 26, 2020 issued in corresponding International Application No. PCT/US2020/043143 (20 pgs.).
European Patent Office Communication issued for Application No. 20851879.5 the Supplementary European Search Report (Art. 153(7) EPC) and the European search opinion dated Oct. 4, 2022, 15 pages.
Bross et al., "Versatile Video Coding (Draft 7)," JVET-N1001-v1, 14th Meeting: Geneva, CH, 19-127 Mar. 2019, 343 pages.
Bross et al., "Versatile Video Coding (Draft 7)," JVET-P2001-vE, 16$^{th}$ Meeting: Geneva, CH, Oct. 1-11, 2019, 490 pages.
Chen et al., "Algorithm description for Versatile Video Coding and Test Model 5 (VTM 5)," JVET-N1002-v1, 14$^{th}$ Meeting: Geneva, CH, Mar. 19-27, 2019, 70 pages.
Huang et al., "Merge Modes Signaling," JVET-O0249, 15th Meeting: Gothenburg, SE, Jul. 3-12, 2019, 8 pages.
European Patent Office Communication pursuant to Article 94(3) EPC issued for Application No. 20851879.5 dated Sep. 19, 2023, 7 pages.
Liao et al., "CE4-related: Unification of triangle partition mode and geometric merge mode," JVET-P0305-v2, 16$^{th}$ Meeting: Geneva, CH, Oct. 1-11, 2019.
First Office Action issued in corresponding Chinese Application No. 202080057176.4 on Oct. 23, 2024, (12 pages).
Huang et al., "Merge Modes Signaling," JVET-O0249, 15th Meeting: Gothenburg, SE, Jul. 3-12, 2019, 8 pages.

\* cited by examiner

Triangle partition based inter prediction

| Merge Index | L0 MV | L1 MV |
|---|---|---|
| 0 | X | |
| 1 | | X |
| 2 | X | |
| 3 | | X |
| 4 | X | |

FIG. 6

FIG. 7: Weights used in the blending process

FIG. 8: Examples of the 4×4 subblocks located in the uni-predicted or bi-predicted area FIG. 9: An exemplary syntax structure FIG. 10: Another exemplary syntax structure FIG. 11: Examples of geometric partitions Table 12: The look-up table for Dis[]

| idx     | 0   | 1   | 2   | 3   | 4   | 5   | 6   | 7   | 8   | 9   | 10  | 11  | 12  | 13  | 14  | 15  |
|---------|-----|-----|-----|-----|-----|-----|-----|-----|-----|-----|-----|-----|-----|-----|-----|-----|
| Dis[idx]| 64  | 63  | 59  | 53  | 45  | 36  | 24  | 12  | 0   | -12 | -24 | -36 | -45 | -53 | -59 | -63 |
| idx     | 16  | 17  | 18  | 19  | 20  | 21  | 22  | 23  | 24  | 25  | 26  | 27  | 28  | 29  | 30  | 31  |
| Dis[idx]| -64 | -63 | -59 | -53 | -45 | -36 | -24 | -12 | 0   | 12  | 24  | 36  | 45  | 53  | 59  | 63  |

FIG. 12

Table 13A: A look-up table for GeoFilter[]

| Idx | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| GeoFilter[idx] | 4 | 4 | 5 | 5 | 5 | 5 | 6 | 6 | 6 | 6 | 7 | 7 | 7 | 7 | 8 |

Table 13B: A look-up table for GeoFilter[]

| Idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| GeoFilter[idx] | 4 | 4 | 4 | 4 | 5 | 5 | 5 | 5 | 5 | 5 | 5 | 6 | 6 | 6 |
| Idx | 14 | 15 | 16 | 17 | 18 | 19 | 20 | 21 | 22 | 23 | 24 | 25 | 26 | |
| GeoFilter[idx] | 6 | 6 | 6 | 6 | 7 | 7 | 7 | 7 | 7 | 7 | 7 | 7 | 8 | |

FIG. 13

Table 14: The look-up table for angleIdx and distanceIdx

| geo_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 1 |
| 20 | 4 | 2 |
| 21 | 4 | 3 |
| 22 | 4 | 4 |
| 23 | 5 | 0 |
| 24 | 5 | 1 |
| 25 | 5 | 2 |
| 26 | 5 | 3 |
| 27 | 5 | 4 |
| 28 | 6 | 0 |
| 29 | 6 | 1 |
| 30 | 6 | 2 |
| 31 | 6 | 3 |
| 32 | 6 | 4 |
| 33 | 7 | 0 |
| 34 | 7 | 1 |
| 35 | 7 | 2 |
| 36 | 7 | 3 |
| 37 | 7 | 4 |
| 38 | 8 | 1 |
| 39 | 8 | 2 |

FIG. 14

Table 14 – Continued: The look-up table for angleIdx and distanceIdx

| geo_partition_idx | angleIdx | distanceIdx |
|---|---|---|
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| 47 | 10 | 0 |
| 48 | 10 | 1 |
| 49 | 10 | 2 |
| 50 | 10 | 3 |
| 51 | 10 | 4 |
| 52 | 11 | 0 |
| 53 | 11 | 1 |
| 54 | 11 | 2 |
| 55 | 11 | 3 |
| 56 | 11 | 4 |
| 57 | 12 | 1 |
| 58 | 12 | 2 |
| 59 | 12 | 3 |
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |

FIG. 14 (Continued)

Table 14 – Continued: The look-up table for angleIdx and distanceIdx

| geo_partition_idx | angleIdx | distanceIdx |
|---|---|---|
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |
| 120 | 27 | 1 |

FIG. 14 (Continued)

Table 14 – Continued: The look-up table for angleIdx and distanceIdx

| geo_partition_idx | angleIdx | distanceIdx |
|---|---|---|
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

FIG. 14 (Continued)

Table 15A: The look-up table for stepDis

| whRatio | angleN | stepDis |
|---|---|---|
| 0 | 0 | 0 |
| 0 | 1 | 18 |
| 0 | 2 | 31 |
| 0 | 3 | 40 |
| 0 | 4 | 42 |
| 0 | 5 | 40 |
| 0 | 6 | 31 |
| 0 | 7 | 18 |
| 0 | 8 | 0 |
| 1 | 0 | 0 |
| 1 | 1 | 38 |
| 1 | 2 | 71 |
| 1 | 3 | 97 |
| 1 | 4 | 115 |
| 1 | 5 | 125 |
| 1 | 6 | 126 |
| 1 | 7 | 118 |
| 1 | 8 | 102 |
| 2 | 0 | 0 |
| 2 | 1 | 78 |
| 2 | 2 | 149 |
| 2 | 3 | 210 |
| 2 | 4 | 260 |
| 2 | 5 | 295 |
| 2 | 6 | 315 |
| 2 | 7 | 319 |
| 2 | 8 | 307 |
| 3 | 0 | 0 |
| 3 | 1 | 158 |
| 3 | 2 | 306 |
| 3 | 3 | 438 |
| 3 | 4 | 549 |
| 3 | 5 | 636 |
| 3 | 6 | 694 |
| 3 | 7 | 721 |
| 3 | 8 | 717 |

FIG. 15A

Table 15A – Continued: The look-up table for stepDis

| whRatio | angleN | stepDis |
|---|---|---|
| 4 | 0 | 0 |
| 4 | 1 | 318 |
| 4 | 2 | 619 |
| 4 | 3 | 893 |
| 4 | 4 | 1129 |
| 4 | 5 | 1317 |
| 4 | 6 | 1450 |
| 4 | 7 | 1524 |
| 4 | 8 | 1536 |

FIG. 15A (Continued)

Table 15B: The look-up table for stepDis

| whRatio | angleN | stepDis |
|---|---|---|
| 0 | 0 | 0 |
| 0 | 1 | 18 |
| 0 | 2 | 31 |
| 0 | 3 | 39 |
| 0 | 4 | 42 |
| 0 | 5 | 39 |
| 0 | 6 | 31 |
| 0 | 7 | 18 |
| 0 | 8 | 0 |
| 1 | 0 | 0 |
| 1 | 1 | 38 |
| 1 | 2 | 70 |
| 1 | 3 | 96 |
| 1 | 4 | 115 |
| 1 | 5 | 125 |
| 1 | 6 | 126 |
| 1 | 7 | 118 |
| 1 | 8 | 102 |
| 2 | 0 | 0 |
| 2 | 1 | 78 |
| 2 | 2 | 149 |
| 2 | 3 | 210 |
| 2 | 4 | 259 |
| 2 | 5 | 295 |
| 2 | 6 | 315 |
| 2 | 7 | 319 |
| 2 | 8 | 307 |
| 3 | 0 | 0 |
| 3 | 1 | 158 |
| 3 | 2 | 305 |
| 3 | 3 | 438 |
| 3 | 4 | 549 |
| 3 | 5 | 635 |
| 3 | 6 | 693 |
| 3 | 7 | 721 |
| 3 | 8 | 717 |
| 4 | 0 | 0 |
| 4 | 1 | 317 |

FIG. 15B

Table 15B — Continued : The look-up table for stepDis

| whRatio | angleN | stepDis |
|---|---|---|
| 4 | 2 | 619 |
| 4 | 3 | 893 |
| 4 | 4 | 1128 |
| 4 | 5 | 1317 |
| 4 | 6 | 1450 |
| 4 | 7 | 1524 |
| 4 | 8 | 1536 |

FIG. 15B (Continued)

Table 15C: The look-up table for angleIdx and distanceIdx when the total number of geometric partitioning submodes is set to 140

| geo_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 1 |
| 20 | 4 | 2 |
| 21 | 4 | 3 |
| 22 | 4 | 4 |
| 23 | 5 | 0 |
| 24 | 5 | 1 |
| 25 | 5 | 2 |
| 26 | 5 | 3 |
| 27 | 5 | 4 |
| 28 | 6 | 0 |
| 29 | 6 | 1 |
| 30 | 6 | 2 |
| 31 | 6 | 3 |
| 32 | 6 | 4 |
| 33 | 7 | 0 |
| 34 | 7 | 1 |
| 35 | 7 | 2 |

FIG. 15C

Table 15C – Continued: The look-up table for angleIdx and distanceIdx when the total number of geometric partitioning submodes is set to 140

| geo_partition_idx | angleIdx | distanceIdx |
|---|---|---|
| 35 | 7 | 2 |
| 36 | 7 | 3 |
| 37 | 7 | 4 |
| 38 | 8 | 1 |
| 39 | 8 | 2 |
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| 47 | 10 | 0 |
| 48 | 10 | 1 |
| 49 | 10 | 2 |
| 50 | 10 | 3 |
| 51 | 10 | 4 |
| 52 | 11 | 0 |
| 53 | 11 | 1 |
| 54 | 11 | 2 |
| 55 | 11 | 3 |
| 56 | 11 | 4 |
| 57 | 12 | 1 |
| 58 | 12 | 2 |
| 59 | 12 | 3 |
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |

FIG. 15C (Continued)

Table 15C – Continued: The look-up table for angleIdx and distanceIdx when the total number of geometric partitioning submodes is set to 140

| geo_partition_idx | angleIdx | distanceIdx |
|---|---|---|
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |

FIG. 15C (Continued)

Table 15C – Continued: The look-up table for angleIdx and distanceIdx when the total number of geometric partitioning submodes is set to 140

| geo_partition_idx | angleIdx | distanceIdx |
|---|---|---|
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |
| 120 | 27 | 1 |
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

FIG. 15C (Continued)

Table 15D: The look-up table for angleIdx and distanceIdx when the total number of geometric partitioning submodes is set to 108

| geo_partition_idx | angleIdx | distanceIdx |
|---|---|---|
| 0 | 0 | 1 |
| 1 | 0 | 2 |
| 2 | 0 | 3 |
| 3 | 1 | 0 |
| 4 | 1 | 1 |
| 5 | 1 | 2 |
| 6 | 1 | 3 |
| 7 | 2 | 0 |
| 8 | 2 | 1 |
| 9 | 2 | 2 |
| 10 | 2 | 3 |
| 11 | 3 | 0 |
| 12 | 3 | 1 |
| 13 | 3 | 2 |
| 14 | 3 | 3 |
| 15 | 4 | 1 |
| 16 | 4 | 2 |
| 17 | 4 | 3 |
| 18 | 5 | 0 |
| 19 | 5 | 1 |
| 20 | 5 | 2 |
| 21 | 5 | 3 |
| 22 | 6 | 0 |
| 23 | 6 | 1 |
| 24 | 6 | 2 |
| 25 | 6 | 3 |
| 26 | 7 | 0 |
| 27 | 7 | 1 |
| 28 | 7 | 2 |
| 29 | 7 | 3 |
| 30 | 8 | 1 |
| 31 | 8 | 2 |
| 32 | 8 | 3 |
| 33 | 9 | 0 |
| 34 | 9 | 1 |
| 35 | 9 | 2 |

FIG. 15D

Table 15D – Continued: The look-up table for angleIdx and distanceIdx when the total number of geometric partitioning submodes is set to 108

| geo_partition_idx | angleIdx | distanceIdx |
|---|---|---|
| 36 | 9 | 3 |
| 37 | 10 | 0 |
| 38 | 10 | 1 |
| 39 | 10 | 2 |
| 40 | 10 | 3 |
| 41 | 11 | 0 |
| 42 | 11 | 1 |
| 43 | 11 | 2 |
| 44 | 11 | 3 |
| 45 | 12 | 1 |
| 46 | 12 | 2 |
| 47 | 12 | 3 |
| 48 | 13 | 0 |
| 49 | 13 | 1 |
| 50 | 13 | 2 |
| 51 | 13 | 3 |
| 52 | 14 | 0 |
| 53 | 14 | 1 |
| 54 | 14 | 2 |
| 55 | 14 | 3 |
| 56 | 15 | 0 |
| 57 | 15 | 1 |
| 58 | 15 | 2 |
| 59 | 15 | 3 |
| 60 | 16 | 1 |
| 61 | 16 | 2 |
| 62 | 16 | 3 |
| 63 | 17 | 1 |
| 64 | 17 | 2 |
| 65 | 17 | 3 |
| 66 | 18 | 1 |
| 67 | 18 | 2 |
| 68 | 18 | 3 |
| 69 | 19 | 1 |
| 70 | 19 | 2 |

FIG. 15D (Continued)

Table 15D – Continued: The look-up table for angleIdx and distanceIdx when the total number of geometric partitioning submodes is set to 108

| geo_partition_idx | angleIdx | distanceIdx |
|---|---|---|
| 71 | 19 | 3 |
| 72 | 20 | 1 |
| 73 | 20 | 2 |
| 74 | 20 | 3 |
| 75 | 21 | 1 |
| 76 | 21 | 2 |
| 77 | 21 | 3 |
| 78 | 22 | 1 |
| 79 | 22 | 2 |
| 80 | 22 | 3 |
| 81 | 23 | 1 |
| 82 | 23 | 2 |
| 83 | 23 | 3 |
| 84 | 24 | 1 |
| 85 | 24 | 2 |
| 86 | 24 | 3 |
| 87 | 25 | 1 |
| 88 | 25 | 2 |
| 89 | 25 | 3 |
| 90 | 26 | 1 |
| 91 | 26 | 2 |
| 92 | 26 | 3 |
| 93 | 27 | 1 |
| 94 | 27 | 2 |
| 95 | 27 | 3 |
| 96 | 28 | 1 |
| 97 | 28 | 2 |
| 98 | 28 | 3 |
| 99 | 29 | 1 |
| 100 | 29 | 2 |
| 101 | 29 | 3 |
| 102 | 30 | 1 |
| 103 | 30 | 2 |
| 104 | 30 | 3 |
| 105 | 31 | 1 |
| 106 | 31 | 2 |
| 107 | 31 | 3 |

FIG. 15D (Continued)

Table 15E: The look-up table for angleIdx and distanceIdx when the total number of geometric partitioning submodes is set to 80

| geo_partition_idx | angleIdx | distanceIdx |
|---|---|---|
| 0 | 0 | 1 |
| 1 | 0 | 2 |
| 2 | 0 | 3 |
| 3 | 1 | 0 |
| 4 | 1 | 1 |
| 5 | 1 | 2 |
| 6 | 1 | 3 |
| 7 | 2 | 0 |
| 8 | 2 | 1 |
| 9 | 2 | 2 |
| 10 | 2 | 3 |
| 11 | 3 | 0 |
| 12 | 3 | 1 |
| 13 | 3 | 2 |
| 14 | 3 | 3 |
| 15 | 4 | 1 |
| 16 | 4 | 2 |
| 17 | 4 | 3 |
| 18 | 5 | 0 |
| 19 | 5 | 1 |
| 20 | 5 | 2 |
| 21 | 5 | 3 |
| 22 | 8 | 1 |
| 23 | 8 | 2 |
| 24 | 8 | 3 |
| 25 | 11 | 0 |
| 26 | 11 | 1 |
| 27 | 11 | 2 |
| 28 | 11 | 3 |
| 29 | 12 | 1 |
| 30 | 12 | 2 |
| 31 | 12 | 3 |
| 32 | 13 | 0 |
| 33 | 13 | 1 |
| 34 | 13 | 2 |
| 35 | 13 | 3 |
| 36 | 14 | 0 |
| 37 | 14 | 1 |
| 38 | 14 | 2 |
| 39 | 14 | 3 |

FIG. 15E

Table 15E – Continued: The look-up table for angleIdx and distanceIdx when the total number of geometric partitioning submodes is set to 80

| geo_partition_idx | angleIdx | distanceIdx |
|---|---|---|
| 40 | 15 | 0 |
| 41 | 15 | 1 |
| 42 | 15 | 2 |
| 43 | 15 | 3 |
| 44 | 16 | 1 |
| 45 | 16 | 2 |
| 46 | 16 | 3 |
| 47 | 17 | 1 |
| 48 | 17 | 2 |
| 49 | 17 | 3 |
| 50 | 18 | 1 |
| 51 | 18 | 2 |
| 52 | 18 | 3 |
| 53 | 19 | 1 |
| 54 | 19 | 2 |
| 55 | 19 | 3 |
| 56 | 20 | 1 |
| 57 | 20 | 2 |
| 58 | 20 | 3 |
| 59 | 21 | 1 |
| 60 | 21 | 2 |
| 61 | 21 | 3 |
| 62 | 24 | 1 |
| 63 | 24 | 2 |
| 64 | 24 | 3 |
| 65 | 27 | 1 |
| 66 | 27 | 2 |
| 67 | 27 | 3 |
| 68 | 28 | 1 |
| 69 | 28 | 2 |
| 70 | 28 | 3 |
| 71 | 29 | 1 |
| 72 | 29 | 2 |
| 73 | 29 | 3 |
| 74 | 30 | 1 |
| 75 | 30 | 2 |
| 76 | 30 | 3 |
| 77 | 31 | 1 |
| 78 | 31 | 2 |
| 79 | 31 | 3 |

FIG. 15E (Continued)

Table 15F: The look-up table for angleIdx and distanceIdx when the total number of geometric partitioning submodes is set to 64

| geo_partition_idx | angleIdx | distanceIdx |
|---|---|---|
| 0 | 0 | 1 |
| 1 | 0 | 2 |
| 2 | 16 | 2 |
| 3 | 16 | 1 |
| 4 | 17 | 3 |
| 5 | 17 | 2 |
| 6 | 17 | 1 |
| 7 | 1 | 0 |
| 8 | 1 | 1 |
| 9 | 1 | 2 |
| 10 | 1 | 3 |
| 11 | 31 | 3 |
| 12 | 31 | 2 |
| 13 | 31 | 1 |
| 14 | 15 | 0 |
| 15 | 15 | 1 |
| 16 | 15 | 2 |
| 17 | 15 | 3 |
| 18 | 18 | 3 |
| 19 | 18 | 2 |
| 20 | 18 | 1 |
| 21 | 2 | 0 |
| 22 | 2 | 1 |
| 23 | 2 | 2 |
| 24 | 2 | 3 |
| 25 | 30 | 3 |
| 26 | 30 | 2 |
| 27 | 30 | 1 |
| 28 | 14 | 0 |
| 29 | 14 | 1 |
| 30 | 14 | 2 |
| 31 | 14 | 3 |
| 32 | 19 | 3 |
| 33 | 19 | 2 |
| 34 | 19 | 1 |
| 35 | 3 | 0 |

Table 15F

FIG. 15F – Continued: The look-up table for angleIdx and distanceIdx when the total number of geometric partitioning submodes is set to 64

| geo_partition_idx | angleIdx | distanceIdx |
|---|---|---|
| 36 | 3 | 1 |
| 37 | 3 | 2 |
| 38 | 3 | 3 |
| 39 | 29 | 3 |
| 40 | 29 | 2 |
| 41 | 29 | 1 |
| 42 | 13 | 0 |
| 43 | 13 | 1 |
| 44 | 13 | 2 |
| 45 | 13 | 3 |
| 46 | 21 | 3 |
| 47 | 21 | 2 |
| 48 | 21 | 1 |
| 49 | 5 | 0 |
| 50 | 5 | 1 |
| 51 | 5 | 2 |
| 52 | 5 | 3 |
| 53 | 27 | 3 |
| 54 | 27 | 2 |
| 55 | 27 | 1 |
| 56 | 11 | 0 |
| 57 | 11 | 1 |
| 58 | 11 | 2 |
| 59 | 11 | 3 |
| 60 | 8 | 1 |
| 61 | 8 | 2 |
| 62 | 24 | 2 |
| 63 | 24 | 1 |

FIG. 15F (Continued)

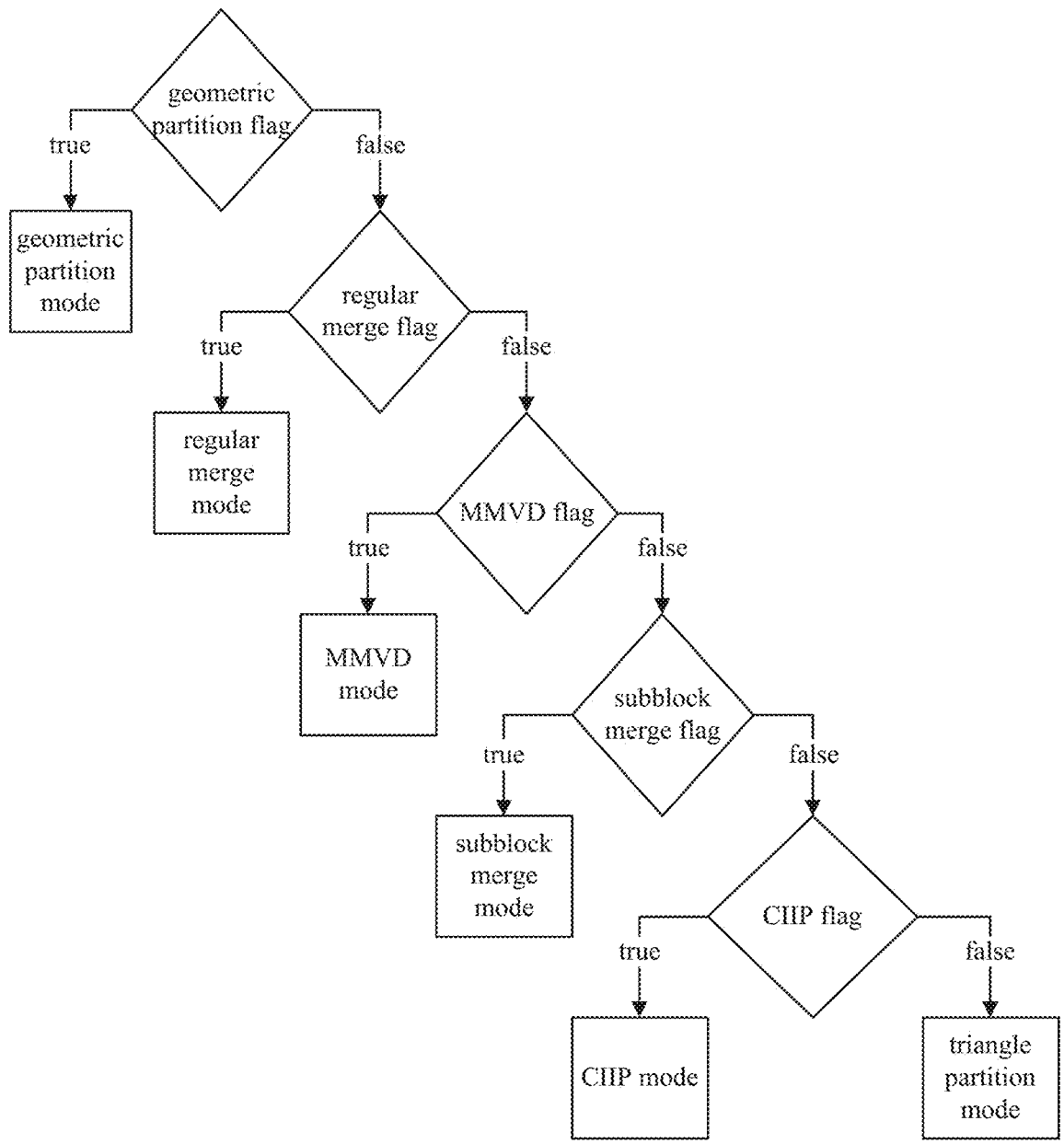
FIG. 16: Exemplary syntax structure for geometric partition mode

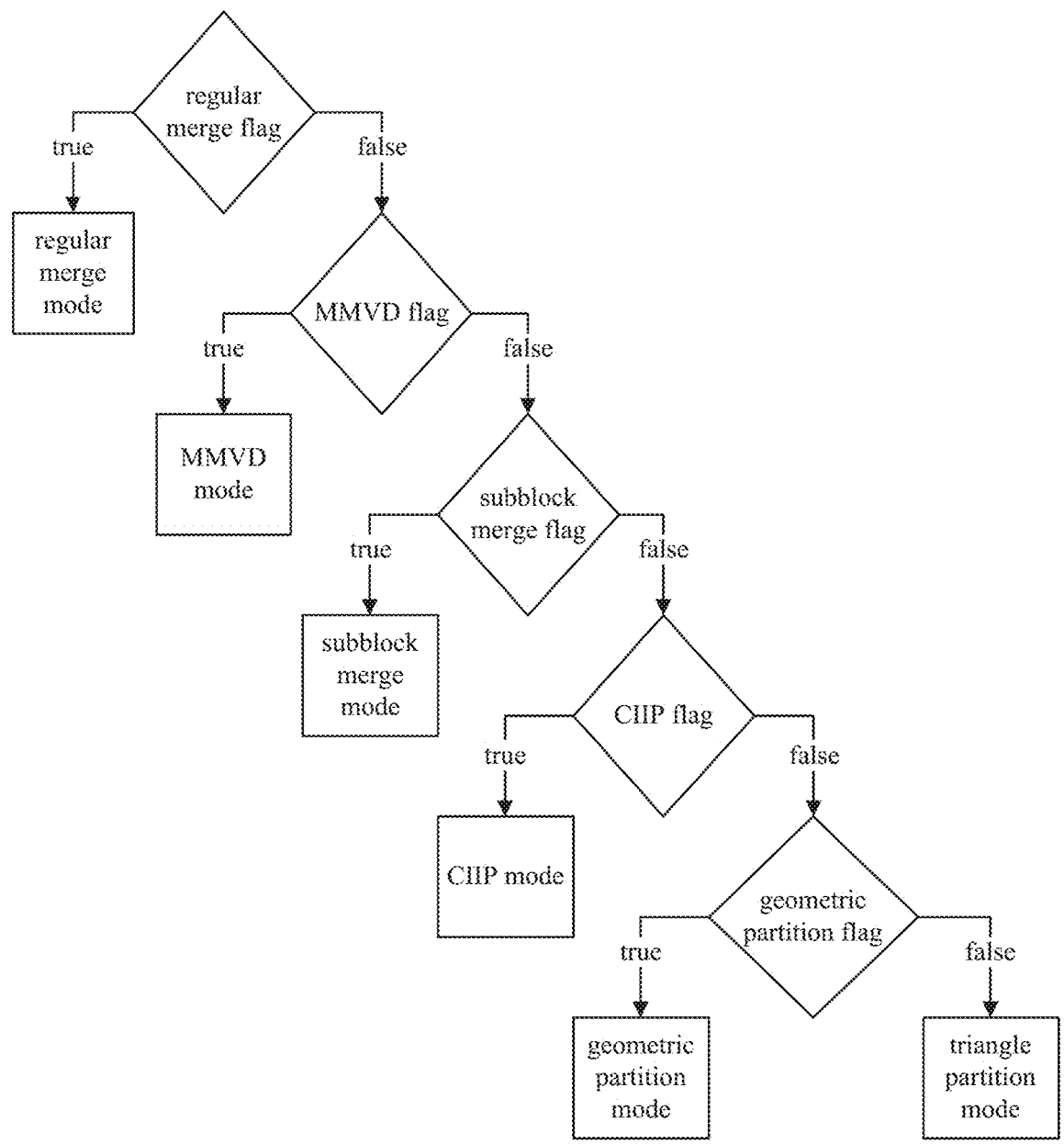
FIG. 17A: Exemplary syntax structure for geometric partition mode

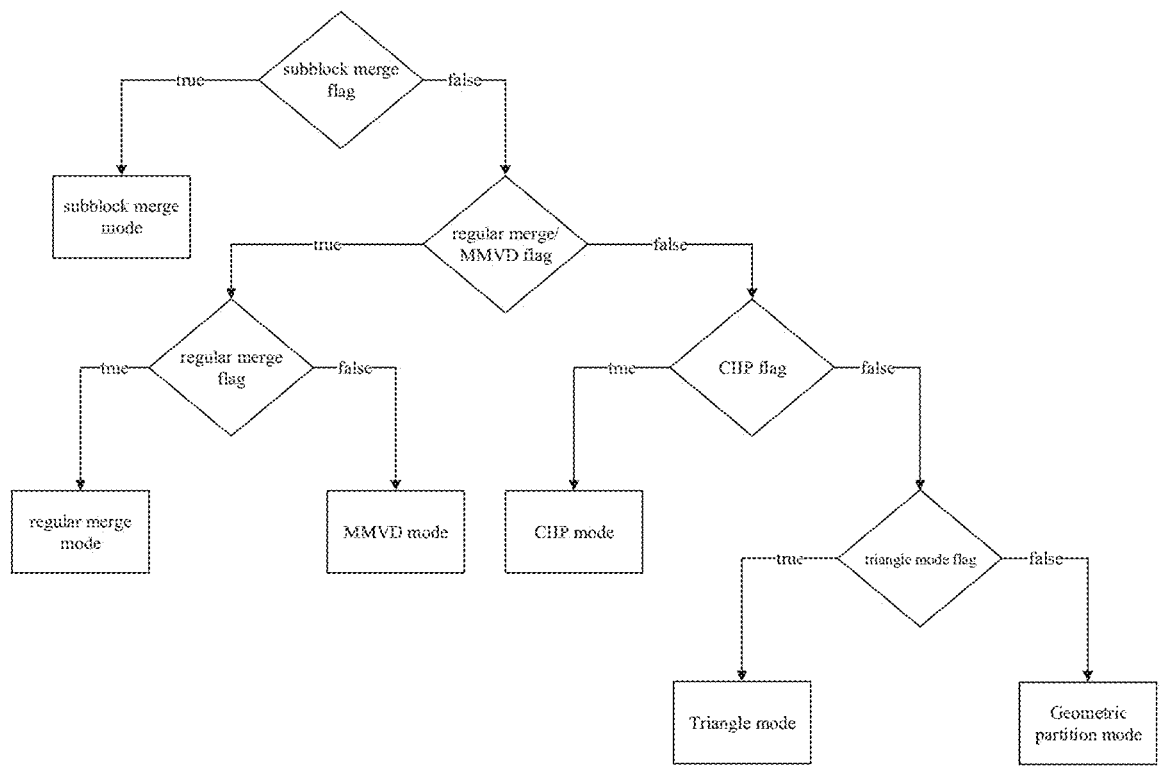
FIG. 17B: Exemplary syntax structure for geometric partition mode

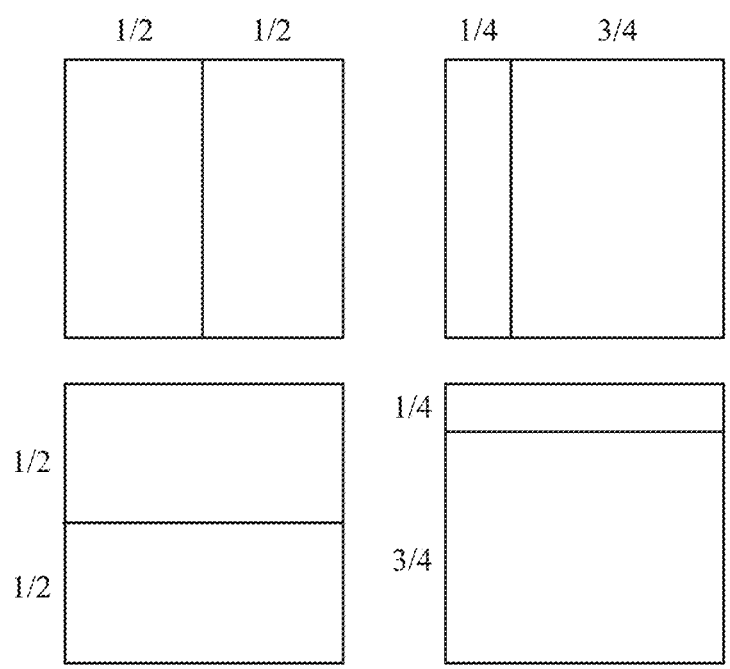
FIG. 18: Sub block transform for inter predicted block

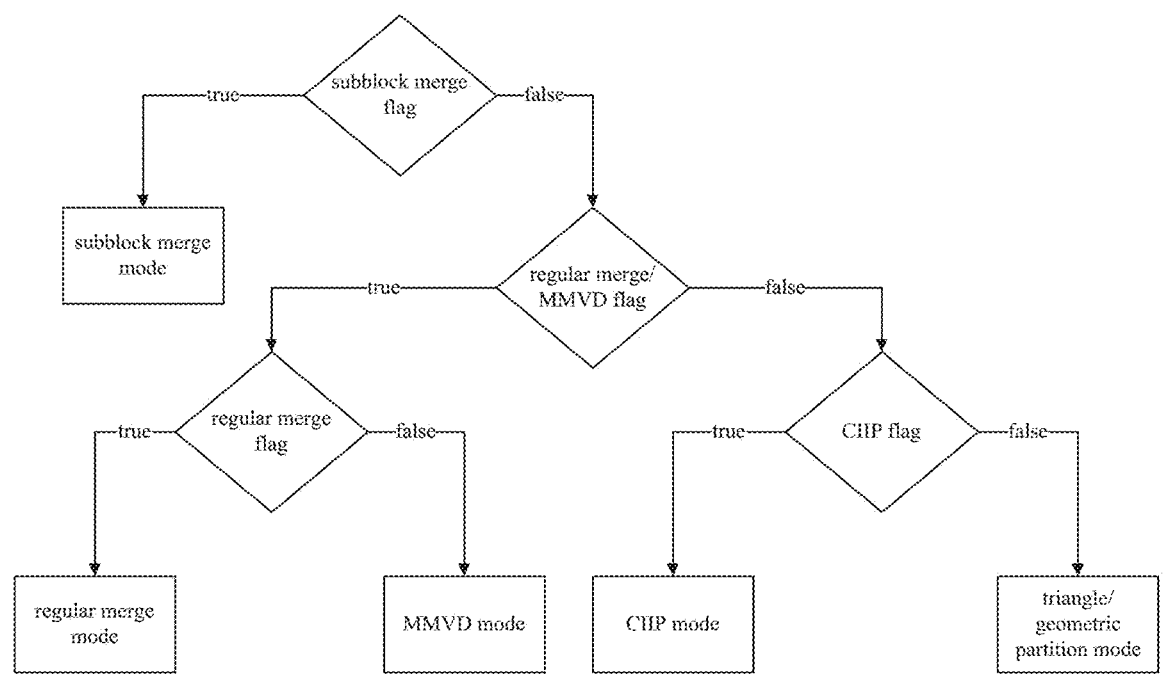
FIG. 19: An example of unified syntax structure

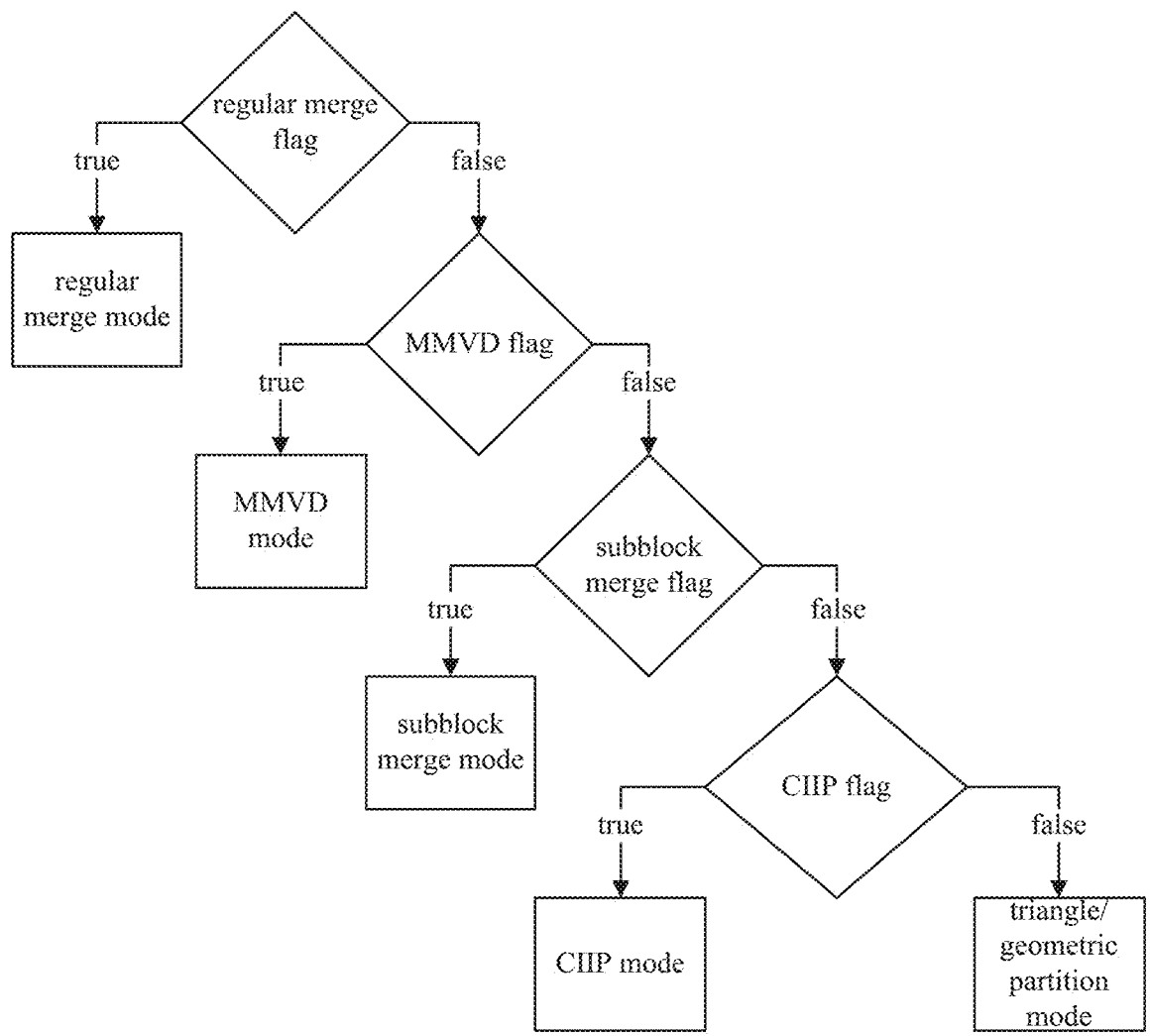
FIG. 20: An example of unified syntax structure

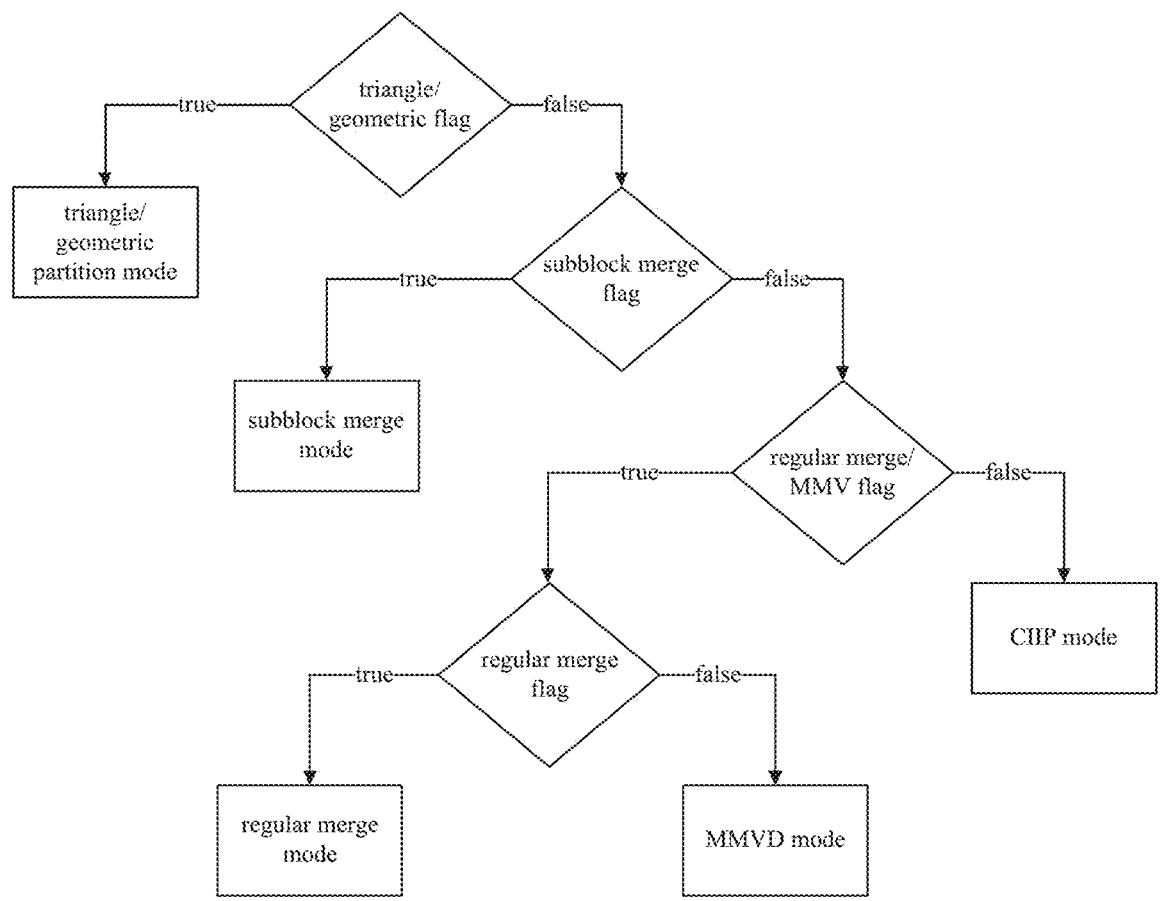
FIG. 21: An example of unified syntax structure

Table 22A: The look-up table for angleIdx and distanceIdx including triangle and geometric partitions

| geo_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 0 |
| 20 | 4 | 1 |
| 21 | 4 | 2 |
| 22 | 4 | 3 |
| 23 | 4 | 4 |
| 24 | 5 | 0 |
| 25 | 5 | 1 |
| 26 | 5 | 2 |
| 27 | 5 | 3 |
| 28 | 5 | 4 |
| 29 | 6 | 0 |
| 30 | 6 | 1 |
| 31 | 6 | 2 |
| 32 | 6 | 3 |
| 33 | 6 | 4 |
| 34 | 7 | 0 |
| 35 | 7 | 1 |

FIG. 22A

Table 22A – Continued: The look-up table for angleIdx and distanceIdx including triangle and geometric partitions

| geo_partition_idx | angleIdx | distanceIdx |
|---|---|---|
| 36 | 7 | 2 |
| 37 | 7 | 3 |
| 38 | 7 | 4 |
| 39 | 8 | 1 |
| 40 | 8 | 2 |
| 41 | 8 | 3 |
| 42 | 8 | 4 |
| 43 | 9 | 0 |
| 44 | 9 | 1 |
| 45 | 9 | 2 |
| 46 | 9 | 3 |
| 47 | 9 | 4 |
| 48 | 10 | 0 |
| 49 | 10 | 1 |
| 50 | 10 | 2 |
| 51 | 10 | 3 |
| 52 | 10 | 4 |
| 53 | 11 | 0 |
| 54 | 11 | 1 |
| 55 | 11 | 2 |
| 56 | 11 | 3 |
| 57 | 11 | 4 |
| 58 | 12 | 0 |
| 59 | 12 | 1 |
| 60 | 12 | 2 |
| 61 | 12 | 3 |
| 62 | 12 | 4 |
| 63 | 13 | 0 |
| 64 | 13 | 1 |
| 65 | 13 | 2 |
| 66 | 13 | 3 |
| 67 | 13 | 4 |
| 68 | 14 | 0 |
| 69 | 14 | 1 |
| 70 | 14 | 2 |

FIG. 22A (Continued)

Table 22A – Continued: The look-up table for angleIdx and distanceIdx including triangle and geometric partitions

| geo_partition_idx | angleIdx | distanceIdx |
|---|---|---|
| 71 | 14 | 3 |
| 72 | 14 | 4 |
| 73 | 15 | 0 |
| 74 | 15 | 1 |
| 75 | 15 | 2 |
| 76 | 15 | 3 |
| 77 | 15 | 4 |
| 78 | 16 | 1 |
| 79 | 16 | 2 |
| 80 | 16 | 3 |
| 81 | 16 | 4 |
| 82 | 17 | 1 |
| 83 | 17 | 2 |
| 84 | 17 | 3 |
| 85 | 17 | 4 |
| 86 | 18 | 1 |
| 87 | 18 | 2 |
| 88 | 18 | 3 |
| 89 | 18 | 4 |
| 90 | 19 | 1 |
| 91 | 19 | 2 |
| 92 | 19 | 3 |
| 93 | 19 | 4 |
| 94 | 20 | 1 |
| 95 | 20 | 2 |
| 96 | 20 | 3 |
| 97 | 20 | 4 |
| 98 | 21 | 1 |
| 99 | 21 | 2 |
| 100 | 21 | 3 |
| 101 | 21 | 4 |
| 102 | 22 | 1 |
| 103 | 22 | 2 |
| 104 | 22 | 3 |
| 105 | 22 | 4 |
| 106 | 23 | 1 |
| 107 | 23 | 2 |
| 108 | 23 | 3 |
| 109 | 23 | 4 |
| 110 | 24 | 1 |

FIG. 22A (Continued)

Table 22A – Continued: The look-up table for angleIdx and distanceIdx including triangle and geometric partitions

| geo_partition_idx | angleIdx | distanceIdx |
|---|---|---|
| 111 | 24 | 2 |
| 112 | 24 | 3 |
| 113 | 24 | 4 |
| 114 | 25 | 1 |
| 115 | 25 | 2 |
| 116 | 25 | 3 |
| 117 | 25 | 4 |
| 118 | 26 | 1 |
| 119 | 26 | 2 |
| 120 | 26 | 3 |
| 121 | 26 | 4 |
| 122 | 27 | 1 |
| 123 | 27 | 2 |
| 124 | 27 | 3 |
| 125 | 27 | 4 |
| 126 | 28 | 1 |
| 127 | 28 | 2 |
| 128 | 28 | 3 |
| 129 | 28 | 4 |
| 130 | 29 | 1 |
| 131 | 29 | 2 |
| 132 | 29 | 3 |
| 133 | 29 | 4 |
| 134 | 30 | 1 |
| 135 | 30 | 2 |
| 136 | 30 | 3 |
| 137 | 30 | 4 |
| 138 | 31 | 1 |
| 139 | 31 | 2 |
| 140 | 31 | 3 |
| 141 | 31 | 4 |

FIG. 22A (Continued)

Table 22B: The look-up table for angleIdx and distanceIdx including triangle and geometric partitions

| geo_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| geo_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| geo_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| geo_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 22B

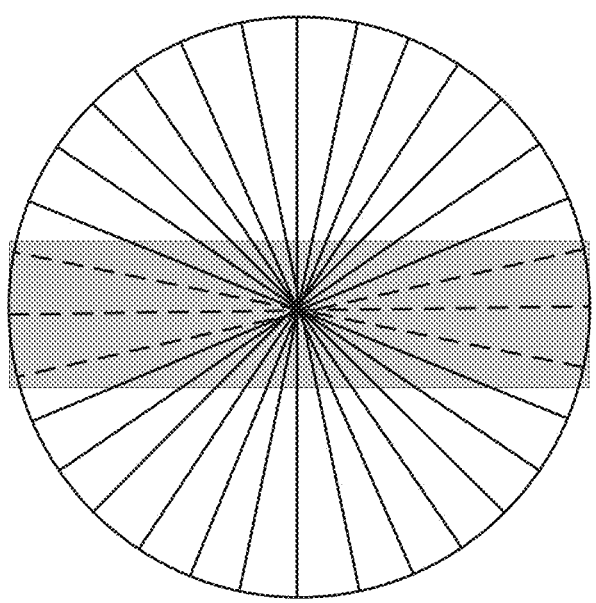
FIG. 23: An example of allowing angles that partition the larger block dimension only Table 24. The look-up table for angleIdx and distanceIdx including triangle and geometric partitions

| geo_partition_idx | angleIdx | distanceIdx |
|---|---|---|
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 9 | 0 |
| 8 | 10 | 0 |
| 9 | 11 | 0 |
| 10 | 12 | 0 |
| 11 | 13 | 0 |
| 12 | 14 | 0 |
| 13 | 15 | 0 |
| 14 | 0 | 1 |
| 15 | 1 | 1 |
| 16 | 2 | 1 |
| 17 | 3 | 1 |
| 18 | 4 | 1 |
| 19 | 5 | 1 |
| 20 | 6 | 1 |
| 21 | 7 | 1 |
| 22 | 8 | 1 |
| 23 | 9 | 1 |
| 24 | 10 | 1 |
| 25 | 11 | 1 |
| 26 | 12 | 1 |
| 27 | 13 | 1 |
| 28 | 14 | 1 |
| 29 | 15 | 1 |
| 30 | 16 | 1 |
| 31 | 17 | 1 |
| 32 | 18 | 1 |
| 33 | 19 | 1 |
| 34 | 20 | 1 |
| 35 | 21 | 1 |

FIG. 24

Table 24 – Continued: The look-up table for angleIdx and distanceIdx including triangle and geometric partitions

| geo_partition_idx | angleIdx | distanceIdx |
|---|---|---|
| 36 | 22 | 1 |
| 37 | 23 | 1 |
| 38 | 24 | 1 |
| 39 | 25 | 1 |
| 40 | 26 | 1 |
| 41 | 27 | 1 |
| 42 | 28 | 1 |
| 43 | 29 | 1 |
| 44 | 30 | 1 |
| 45 | 31 | 1 |
| 46 | 0 | 2 |
| 47 | 1 | 2 |
| 48 | 2 | 2 |
| 49 | 3 | 2 |
| 50 | 4 | 2 |
| 51 | 5 | 2 |
| 52 | 6 | 2 |
| 53 | 7 | 2 |
| 54 | 8 | 2 |
| 55 | 9 | 2 |
| 56 | 10 | 2 |
| 57 | 11 | 2 |
| 58 | 12 | 2 |
| 59 | 13 | 2 |
| 60 | 14 | 2 |
| 61 | 15 | 2 |
| 62 | 16 | 2 |
| 63 | 17 | 2 |
| 64 | 18 | 2 |
| 65 | 19 | 2 |
| 66 | 20 | 2 |
| 67 | 21 | 2 |
| 68 | 22 | 2 |
| 69 | 23 | 2 |
| 70 | 24 | 2 |

FIG. 24 (Continued)

Table 24 – Continued: The look-up table for angleIdx and distanceIdx including triangle and geometric partitions

| geo_partition_idx | angleIdx | distanceIdx |
|---|---|---|
| 71 | 25 | 2 |
| 72 | 26 | 2 |
| 73 | 27 | 2 |
| 74 | 28 | 2 |
| 75 | 29 | 2 |
| 76 | 30 | 2 |
| 77 | 31 | 2 |
| 78 | 0 | 3 |
| 79 | 1 | 3 |
| 80 | 2 | 3 |
| 81 | 3 | 3 |
| 82 | 4 | 3 |
| 83 | 5 | 3 |
| 84 | 6 | 3 |
| 85 | 7 | 3 |
| 86 | 8 | 3 |
| 87 | 9 | 3 |
| 88 | 10 | 3 |
| 89 | 11 | 3 |
| 90 | 12 | 3 |
| 91 | 13 | 3 |
| 92 | 14 | 3 |
| 93 | 15 | 3 |
| 94 | 16 | 3 |
| 95 | 17 | 3 |
| 96 | 18 | 3 |
| 97 | 19 | 3 |
| 98 | 20 | 3 |
| 99 | 21 | 3 |
| 100 | 22 | 3 |
| 101 | 23 | 3 |
| 102 | 24 | 3 |
| 103 | 25 | 3 |
| 104 | 26 | 3 |
| 105 | 27 | 3 |

FIG. 24 (Continued)

Table 24 – Continued: The look-up table for angleIdx and distanceIdx including triangle and geometric partitions

| geo_partition_idx | angleIdx | distanceIdx |
|---|---|---|
| 106 | 28 | 3 |
| 107 | 29 | 3 |
| 108 | 30 | 3 |
| 109 | 31 | 3 |
| 110 | 0 | 4 |
| 111 | 1 | 4 |
| 112 | 2 | 4 |
| 113 | 3 | 4 |
| 114 | 4 | 4 |
| 115 | 5 | 4 |
| 116 | 6 | 4 |
| 117 | 7 | 4 |
| 118 | 8 | 4 |
| 119 | 9 | 4 |
| 120 | 10 | 4 |
| 121 | 11 | 4 |
| 122 | 12 | 4 |
| 123 | 13 | 4 |
| 124 | 14 | 4 |
| 125 | 15 | 4 |
| 126 | 16 | 4 |
| 127 | 17 | 4 |
| 128 | 18 | 4 |
| 129 | 19 | 4 |
| 130 | 20 | 4 |
| 131 | 21 | 4 |
| 132 | 22 | 4 |
| 133 | 23 | 4 |
| 134 | 24 | 4 |
| 135 | 25 | 4 |
| 136 | 26 | 4 |
| 137 | 27 | 4 |
| 138 | 28 | 4 |
| 139 | 29 | 4 |
| 140 | 30 | 4 |
| 141 | 31 | 4 |

FIG. 24 (Continued)

Table 25. The look-up table for angleIdx and distanceIdx including triangle and geometric partitions

| geo_partition_idx | angleIdx | distanceIdx |
|---|---|---|
| 0 | 4 | 0 |
| 1 | 12 | 0 |
| 2 | 0 | 1 |
| 3 | 8 | 1 |
| 4 | 4 | 1 |
| 5 | 12 | 1 |
| 6 | 0 | 2 |
| 7 | 8 | 2 |
| 8 | 4 | 2 |
| 9 | 12 | 2 |
| 10 | 0 | 3 |
| 11 | 8 | 3 |
| 12 | 4 | 3 |
| 13 | 12 | 3 |
| 14 | 0 | 4 |
| 15 | 8 | 4 |
| 16 | 4 | 4 |
| 17 | 12 | 4 |
| 18 | 1 | 0 |
| 19 | 2 | 0 |
| 20 | 3 | 0 |
| 21 | 5 | 0 |
| 22 | 6 | 0 |
| 23 | 7 | 0 |
| 24 | 9 | 0 |
| 25 | 10 | 0 |
| 26 | 11 | 0 |
| 27 | 13 | 0 |
| 28 | 14 | 0 |
| 29 | 15 | 0 |
| 30 | 1 | 1 |
| 31 | 2 | 1 |
| 32 | 3 | 1 |
| 33 | 5 | 1 |
| 34 | 6 | 1 |
| 35 | 7 | 1 |

FIG. 25

Table 25 – Continued: The look-up table for angleIdx and distanceIdx including triangle and geometric partitions

| geo_partition_idx | angleIdx | distanceIdx |
|---|---|---|
| 36 | 9 | 1 |
| 37 | 10 | 1 |
| 38 | 11 | 1 |
| 39 | 13 | 1 |
| 40 | 14 | 1 |
| 41 | 15 | 1 |
| 42 | 16 | 1 |
| 43 | 17 | 1 |
| 44 | 18 | 1 |
| 45 | 19 | 1 |
| 46 | 20 | 1 |
| 47 | 21 | 1 |
| 48 | 22 | 1 |
| 49 | 23 | 1 |
| 50 | 24 | 1 |
| 51 | 25 | 1 |
| 52 | 26 | 1 |
| 53 | 27 | 1 |
| 54 | 28 | 1 |
| 55 | 29 | 1 |
| 56 | 30 | 1 |
| 57 | 31 | 1 |
| 58 | 1 | 2 |
| 59 | 2 | 2 |
| 60 | 3 | 2 |
| 61 | 5 | 2 |
| 62 | 6 | 2 |
| 63 | 7 | 2 |
| 64 | 9 | 2 |
| 65 | 10 | 2 |
| 66 | 11 | 2 |
| 67 | 13 | 2 |
| 68 | 14 | 2 |
| 69 | 15 | 2 |
| 70 | 16 | 2 |

FIG. 25 (Continued)

Table 25 – Continued: The look-up table for angleIdx and distanceIdx including triangle and geometric partitions

| geo_partition_idx | angleIdx | distanceIdx |
|---|---|---|
| 71 | 17 | 2 |
| 72 | 18 | 2 |
| 73 | 19 | 2 |
| 74 | 20 | 2 |
| 75 | 21 | 2 |
| 76 | 22 | 2 |
| 77 | 23 | 2 |
| 78 | 24 | 2 |
| 79 | 25 | 2 |
| 80 | 26 | 2 |
| 81 | 27 | 2 |
| 82 | 28 | 2 |
| 83 | 29 | 2 |
| 84 | 30 | 2 |
| 85 | 31 | 2 |
| 86 | 1 | 3 |
| 87 | 2 | 3 |
| 88 | 3 | 3 |
| 89 | 5 | 3 |
| 90 | 6 | 3 |
| 91 | 7 | 3 |
| 92 | 9 | 3 |
| 93 | 10 | 3 |
| 94 | 11 | 3 |
| 95 | 13 | 3 |
| 96 | 14 | 3 |
| 97 | 15 | 3 |
| 98 | 16 | 3 |
| 99 | 17 | 3 |
| 100 | 18 | 3 |
| 101 | 19 | 3 |
| 102 | 20 | 3 |
| 103 | 21 | 3 |
| 104 | 22 | 3 |
| 105 | 23 | 3 |

FIG. 25 (Continued)

Table 25 – Continued: The look-up table for angleIdx and distanceIdx including triangle and geometric partitions

| geo_partition_idx | angleIdx | distanceIdx |
|---|---|---|
| 106 | 24 | 3 |
| 107 | 25 | 3 |
| 108 | 26 | 3 |
| 109 | 27 | 3 |
| 110 | 28 | 3 |
| 111 | 29 | 3 |
| 112 | 30 | 3 |
| 113 | 31 | 3 |
| 114 | 1 | 4 |
| 115 | 2 | 4 |
| 116 | 3 | 4 |
| 117 | 5 | 4 |
| 118 | 6 | 4 |
| 119 | 7 | 4 |
| 120 | 9 | 4 |
| 121 | 10 | 4 |
| 122 | 11 | 4 |
| 123 | 13 | 4 |
| 124 | 14 | 4 |
| 125 | 15 | 4 |
| 126 | 16 | 4 |
| 127 | 17 | 4 |
| 128 | 18 | 4 |
| 129 | 19 | 4 |
| 130 | 20 | 4 |
| 131 | 21 | 4 |
| 132 | 22 | 4 |
| 133 | 23 | 4 |
| 134 | 24 | 4 |
| 135 | 25 | 4 |
| 136 | 26 | 4 |
| 137 | 27 | 4 |
| 138 | 28 | 4 |
| 139 | 29 | 4 |
| 140 | 30 | 4 |
| 141 | 31 | 4 |

FIG. 25 (Continued)

Table 26. The look-up table for Dis[]

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Dis[idx] | 128 | 126 | 118 | 106 | 90 | 72 | 48 | 24 | 0 | -24 | -48 | -72 | -90 | -106 | -118 | -126 |
| Idx | 16 | 17 | 18 | 19 | 20 | 21 | 22 | 23 | 24 | 25 | 26 | 27 | 28 | 29 | 30 | 31 |
| Dis[idx] | -128 | -126 | -118 | -106 | -90 | -72 | -48 | -24 | 0 | 24 | 48 | 72 | 90 | 106 | 118 | 126 |

FIG. 26

Table 27. Coding unit syntax structure

| coding_unit( x0, y0, cbWidth, cbHeight, treeType ) { | Descript or |
|---|---|
| ... | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|     cu_cbf | ae(v) |
|   if( cu_cbf ) { | |
|     if( CuPredMode[ x0 ][ y0 ] == MODE_INTER && sps_sbt_enabled_flag && !ciip_flag[ x0 ][ y0 ] && !Merge_triangle_flag[ x0 ][ y0 ] && !geo_flag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH \|\| allowSbtHorH \|\| allowSbtVerQ \|\| allowSbtHorQ ) | |
|           cu_sbt_flag | ae(v) |
|       } | |
| ... | |
| } | |

FIG. 27

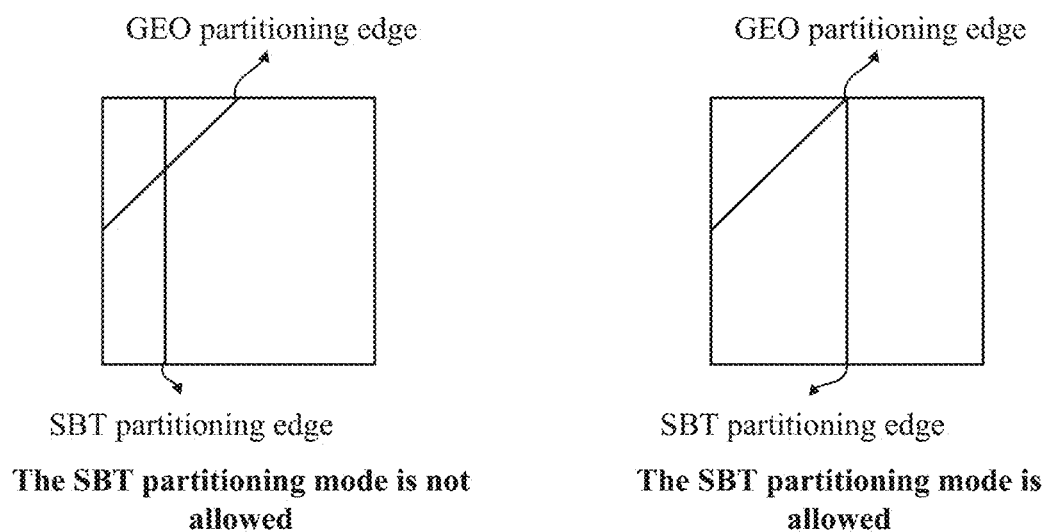
FIG. 28: Examples of SBT and GEO partitionings

Table 29. Coding unit syntax structure

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|       cu_cbf | ae(v) |
|     if( cu_cbf ) { | |
|       if( CuPredMode[ x0 ][ y0 ] == MODE_INTER && sps_sbt_enabled_flag && <br>        !ciip_flag[ x0 ][ y0 ] && !Merge_triangle_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH || allowSbtHorH || allowSbtVerQ || allowSbtHorQ ) | |
|             cu_sbt_flag | ae(v) |
|         } | |
|         if( cu_sbt_flag ) { | |
|           if( ( allowSbtVerH || allowSbtHorH ) && ( allowSbtVerQ || allowSbtHorQ) ) | |
|             cu_sbt_quad_flag | ae(v) |
|           if( ( ( cu_sbt_quad_flag && allowSbtVerQ && allowSbtHorQ ) || <br>            ( !cu_sbt_quad_flag && allowSbtVerH && allowSbtHorH ) ) && <br>            geo_angle_idx != 0 ) | |
|             cu_sbt_horizontal_flag | ae(v) |
|           cu_sbt_pos_flag | ae(v) |
|         } | |
|       } | |
|   ... | |
| } | |

FIG. 29

Table 30: The look-up table for angleIdx and distanceIdx when the total number of geometric partitioning submodes is set to 80

| geo_partition_idx | angleIdx | distanceIdx |
|---|---|---|
| 0 | 0 | 1 |
| 1 | 0 | 2 |
| 2 | 0 | 3 |
| 3 | 1 | 0 |
| 4 | 1 | 1 |
| 5 | 1 | 2 |
| 6 | 1 | 3 |
| 7 | 2 | 0 |
| 8 | 2 | 1 |
| 9 | 2 | 2 |
| 10 | 2 | 3 |
| 11 | 3 | 0 |
| 12 | 3 | 1 |
| 13 | 3 | 2 |
| 14 | 3 | 3 |
| 15 | 4 | 1 |
| 16 | 4 | 2 |
| 17 | 4 | 3 |
| 18 | 5 | 0 |
| 19 | 5 | 1 |
| 20 | 5 | 2 |
| 21 | 5 | 3 |
| 22 | 6 | 1 |
| 23 | 6 | 2 |
| 24 | 6 | 3 |
| 25 | 7 | 0 |
| 26 | 7 | 1 |
| 27 | 7 | 2 |
| 28 | 7 | 3 |
| 29 | 8 | 1 |
| 30 | 8 | 2 |
| 31 | 8 | 3 |
| 32 | 9 | 0 |
| 33 | 9 | 1 |
| 34 | 9 | 2 |
| 35 | 9 | 3 |
| 36 | 10 | 0 |
| 37 | 10 | 1 |
| 38 | 10 | 2 |
| 39 | 10 | 3 |

FIG. 30

Table 30 – Continued: The look-up table for angleIdx and distanceIdx when the total number of geometric partitioning submodes is set to 80

| geo_partition_idx | angleIdx | distanceIdx |
|---|---|---|
| 40 | 11 | 0 |
| 41 | 11 | 1 |
| 42 | 11 | 2 |
| 43 | 11 | 3 |
| 44 | 12 | 1 |
| 45 | 12 | 2 |
| 46 | 12 | 3 |
| 47 | 13 | 1 |
| 48 | 13 | 2 |
| 49 | 13 | 3 |
| 50 | 14 | 1 |
| 51 | 14 | 2 |
| 52 | 14 | 3 |
| 53 | 15 | 1 |
| 54 | 15 | 2 |
| 55 | 15 | 3 |
| 56 | 16 | 1 |
| 57 | 16 | 2 |
| 58 | 16 | 3 |
| 59 | 17 | 1 |
| 60 | 17 | 2 |
| 61 | 17 | 3 |
| 62 | 18 | 1 |
| 63 | 18 | 2 |
| 64 | 18 | 3 |
| 65 | 19 | 1 |
| 66 | 19 | 2 |
| 67 | 19 | 3 |
| 68 | 20 | 1 |
| 69 | 20 | 2 |
| 70 | 20 | 3 |
| 71 | 21 | 1 |
| 72 | 21 | 2 |
| 73 | 21 | 3 |
| 74 | 22 | 1 |
| 75 | 22 | 2 |
| 76 | 22 | 3 |
| 77 | 23 | 1 |
| 78 | 23 | 2 |
| 79 | 23 | 3 |

FIG. 30 (Continued)

Table 31: The look-up table for angleIdx and distanceIdx when the total number of geometric partitioning submodes is set to 64

| geo_partition_idx | angleIdx | distanceIdx |
|---|---|---|
| 0 | 0 | 1 |
| 1 | 0 | 2 |
| 2 | 10 | 2 |
| 3 | 10 | 1 |
| 4 | 11 | 3 |
| 5 | 11 | 2 |
| 6 | 11 | 1 |
| 7 | 1 | 0 |
| 8 | 1 | 1 |
| 9 | 1 | 2 |
| 10 | 1 | 3 |
| 11 | 19 | 3 |
| 12 | 19 | 2 |
| 13 | 19 | 1 |
| 14 | 9 | 0 |
| 15 | 9 | 1 |
| 16 | 9 | 2 |
| 17 | 9 | 3 |
| 18 | 12 | 3 |
| 19 | 12 | 2 |
| 20 | 12 | 1 |
| 21 | 2 | 0 |
| 22 | 2 | 1 |
| 23 | 2 | 2 |
| 24 | 2 | 3 |
| 25 | 18 | 3 |
| 26 | 18 | 2 |
| 27 | 18 | 1 |
| 28 | 8 | 0 |
| 29 | 8 | 1 |
| 30 | 8 | 2 |
| 31 | 8 | 3 |
| 32 | 13 | 3 |
| 33 | 13 | 2 |
| 34 | 13 | 1 |
| 35 | 3 | 0 |

FIG. 31

Table 31 – Continued: The look-up table for angleIdx and distanceIdx when the total number of geometric partitioning submodes is set to 64

| geo_partition_idx | angleIdx | distanceIdx |
|---|---|---|
| 36 | 3 | 1 |
| 37 | 3 | 2 |
| 38 | 3 | 3 |
| 39 | 17 | 3 |
| 40 | 17 | 2 |
| 41 | 17 | 1 |
| 42 | 7 | 0 |
| 43 | 7 | 1 |
| 44 | 7 | 2 |
| 45 | 7 | 3 |
| 46 | 14 | 3 |
| 47 | 14 | 2 |
| 48 | 14 | 1 |
| 49 | 4 | 0 |
| 50 | 4 | 1 |
| 51 | 4 | 2 |
| 52 | 4 | 3 |
| 53 | 16 | 3 |
| 54 | 16 | 2 |
| 55 | 16 | 1 |
| 56 | 6 | 0 |
| 57 | 6 | 1 |
| 58 | 6 | 2 |
| 59 | 6 | 3 |
| 60 | 5 | 1 |
| 61 | 5 | 2 |
| 62 | 15 | 2 |
| 63 | 15 | 1 |

FIG. 31 (Continued)

Table 32: The look-up table for Rho[]

| Idx | 0 | 1 | 2 | 3 | 4 | 5 | 6 | 7 |
|---|---|---|---|---|---|---|---|---|
| Rho[idx] | 16384 | 13056 | 8960 | 4352 | 0 | -4352 | -8960 | -13056 |
| Idx | 8 | 9 | 10 | 11 | 12 | 13 | 14 | 15 |
| Rho[idx] | -16384 | -19200 | -21248 | -22784 | -23040 | -22784 | -21248 | -19200 |

FIG. 32

Table 33: Numbers of each operation per block.

| Equations | × | << | + | comparison |
|---|---|---|---|---|
| Per block | | | | |
| $displacementX = angleIdx \% 16$ | 1 | 0 | 0 | 0 |
| $displacementY = (displacementX + NumAngles >> 2)\%NumAngles$ | 1 | 1 | 1 | 0 |
| $offsetX = \begin{cases} ((256-W) >> 1) + A < N ? (D \times W) >> 3 : -((D \times W) >> 3) & \text{is horizontal split or (is not vertical split and otherwise)} \\ (256-W) >> 1 & \text{otherwise} \end{cases}$ | 1 | 3 | 3 | 3 |
| $offsetY = \begin{cases} ((256-H) >> 1) + A < N ? (D \times H) >> 3 : -((D \times H) >> 3) & \text{is horizontal split or (is not vertical split and otherwise)} \\ (256-H) >> 1 & \text{otherwise} \end{cases}$ | | | | |
| $offsetXmotion = \begin{cases} (64 - (W >> 2)) >> 1 & \text{is horizontal split or (is not vertical split and otherwise)} \\ ((64 - (W >> 2)) >> 1) + A < N ? (D \times W) >> 5 : -(D \times W) >> 5 & \text{otherwise} \end{cases}$ | 1 | 5 | 3 | 3 |
| $offsetYmotion = \begin{cases} ((64 - (H >> 2)) >> 1) + A < N ? (D \times H) >> 5 : -((D \times H) >> 5) & \text{is horizontal split or (is not vertical split a otherwise)} \\ (64 - (H >> 2)) >> 1 & \text{otherwise} \end{cases}$ | | | | |
| Per luma sample | | | | |
| $distFromLine = (((x + offsetX) << 1) + 1) \times Dis[displacementX] + (((y + offsetY) << 1) + 1) \times Dis[displacementY] - Rho[displacementX]$ | 2 | 3 | 8 | 2 |
| $distScaled = Min((abs(distFromLine) + 4) >> 3, 26)$ | 2 | 2 | 6 | 0 |
| $sampleWeight_L[x][y] = distFromLine \leq 0 ? GeoFilter[distScaled] : 8 - GeoFilter[distScaled]$ | 0 | 1 | 1 | 1 |
| Per 4×4 subblock | | | | |
| $distFromLine_{subblk} = (((x_{subblk} + offsetXmotion) << 3) + 1) \times Dis[displacementX] + (((y_{subblk} + offsetYmotion) << 3) + 1) \times Dis[displacementY] - rho_{subblk}[displacementX]$ | 2 | 2 | 6 | 2 |
| $motionMask[x_{subblk}][y_{subblk}] = abs(distFromLine_{subblk}) < 256 ? 2 : (distFromLine_{subblk} \leq 0 ? 0 : 1)$ | 0 | 0 | 0 | 2 |

FIG. 33

Table 34: The look-up table for $Rho_{subblk}[]$

| Idx | 0 | 1 | 2 | 3 | 4 | 5 | 6 | 7 |
|---|---|---|---|---|---|---|---|---|
| $Rho_{subblk}[idx]$ | 16192 | 12903 | 8855 | 4301 | 0 | -4301 | -8855 | -12903 |
| Idx | 8 | 9 | 10 | 11 | 12 | 13 | 14 | 15 |
| $Rho_{subblk}[idx]$ | -16192 | -18975 | -20999 | -22517 | -22770 | -22517 | -20999 | -18975 |

FIG. 34

| 4 | 5 | 6 | 7 | 8 | 8 | 8 | 8 |
|---|---|---|---|---|---|---|---|
| 3 | 4 | 5 | 6 | 7 | 8 | 8 | 8 |
| 2 | 3 | 4 | 5 | 6 | 7 | 8 | 8 |
| 1 | 2 | 3 | 4 | 5 | 6 | 7 | 8 |
| 0 | 1 | 2 | 3 | 4 | 5 | 6 | 7 |
| 0 | 0 | 1 | 2 | 3 | 4 | 5 | 6 |
| 0 | 0 | 0 | 1 | 2 | 3 | 4 | 5 |
| 0 | 0 | 0 | 0 | 1 | 2 | 3 | 4 |

FIG. 35A

| 8 | 8 | 8 | 8 | 7 | 6 | 5 | 4 |
|---|---|---|---|---|---|---|---|
| 8 | 8 | 8 | 7 | 6 | 5 | 4 | 3 |
| 8 | 8 | 7 | 6 | 5 | 4 | 3 | 2 |
| 8 | 7 | 6 | 5 | 4 | 3 | 2 | 1 |
| 7 | 6 | 5 | 4 | 3 | 2 | 1 | 0 |
| 6 | 5 | 4 | 3 | 2 | 1 | 0 | 0 |
| 5 | 4 | 3 | 2 | 1 | 0 | 0 | 0 |
| 4 | 3 | 2 | 1 | 0 | 0 | 0 | 0 |

FIG. 35B

| 4 | 5 | 6 | 7 | 8 | 8 | 8 | 8 |
|---|---|---|---|---|---|---|---|
| 3 | 4 | 5 | 6 | 7 | 8 | 8 | 8 |
| 2 | 3 | 4 | 5 | 6 | 7 | 8 | 8 |
| 1 | 2 | 3 | 4 | 5 | 6 | 7 | 8 |
| 0 | 1 | 2 | 3 | 4 | 5 | 6 | 7 |
| 0 | 0 | 1 | 2 | 3 | 4 | 5 | 6 |
| 0 | 0 | 0 | 1 | 2 | 3 | 4 | 5 |
| 0 | 0 | 0 | 0 | 1 | 2 | 3 | 4 |

FIG. 36A

| 0 | 0 | 0 | 0 | 1 | 2 | 3 | 4 |
|---|---|---|---|---|---|---|---|
| 0 | 0 | 0 | 1 | 2 | 3 | 4 | 5 |
| 0 | 0 | 1 | 2 | 3 | 4 | 5 | 6 |
| 0 | 1 | 2 | 3 | 4 | 5 | 6 | 7 |
| 1 | 2 | 3 | 4 | 5 | 6 | 7 | 8 |
| 2 | 3 | 4 | 5 | 6 | 7 | 8 | 8 |
| 3 | 4 | 5 | 6 | 7 | 8 | 8 | 8 |
| 4 | 5 | 6 | 7 | 8 | 8 | 8 | 8 |

FIG. 36B

Table 37: The angles of triangle partition modes for different block shapes

| width : height ratio | 1 : 1 | 1 : 2 | 1 : 4 | 1 : 8 | 1 : 16 |
|---|---|---|---|---|---|
| Triangle angle 1 | 135° | 116.5° ≈ 112.5° | 104° ≈ 101.25° | 97.1° ≈ 101.25° | 93.6° ≈ 90° |
| Triangle angle 2 | 45° | 63.5° ≈ 67.5° | 76° ≈ 78.75° | 82.9° ≈ 78.75° | 86.4° ≈ 90° |
| width : height ratio | | 2 : 1 | 4 : 1 | 8 : 1 | 16 : 1 |
| Triangle angle 1 | | 153.4° ≈ 157.5° | 166° ≈ 168.75° | 172.9° ≈ 168.75° | 176.4° ≈ 0° |
| Triangle angle 2 | | 26.6° ≈ 22.5° | 14° ≈ 11.25° | 7.1° ≈ 11.25° | 3.6° ≈ 0° |

FIG. 37

Table 38: The look-up table for angleIdx and distanceIdx when the total number of geometric partitioning submodes is set to 140

| geo_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 0 |
| ~~19~~20 | ~~4~~4 | ~~1~~1 |
| ~~20~~21 | ~~4~~4 | ~~2~~2 |
| ~~21~~22 | ~~4~~4 | ~~3~~3 |
| ~~22~~23 | ~~4~~4 | ~~4~~4 |
| ~~23~~24 | ~~5~~5 | ~~0~~0 |
| ~~24~~25 | ~~5~~5 | ~~1~~1 |
| ~~25~~26 | ~~5~~5 | ~~2~~2 |
| ~~26~~27 | ~~5~~5 | ~~3~~3 |
| ~~27~~28 | ~~5~~5 | ~~4~~4 |
| ~~28~~ | ~~6~~ | ~~0~~ |
| 29 | 6 | 1 |
| 30 | 6 | 2 |
| 31 | 6 | 3 |
| 32 | 6 | 4 |
| 33 | 7 | 0 |
| 34 | 7 | 1 |
| 35 | 7 | 2 |

FIG. 38

Table 38 – Continued: The look-up table for angleIdx and distanceIdx when the total number of geometric partitioning submodes is set to 140

| geo_partition_idx | angleIdx | distanceIdx |
|---|---|---|
| 35 | 7 | 2 |
| 36 | 7 | 3 |
| 37 | 7 | 4 |
| 38 | 8 | 1 |
| 39 | 8 | 2 |
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| ~~47~~ | ~~10~~ | ~~0~~ |
| ~~48~~47 | 10 | 1 |
| ~~49~~48 | 10 | 2 |
| ~~50~~49 | 10 | 3 |
| ~~51~~50 | 10 | 4 |
| ~~52~~51 | 11 | 0 |
| ~~53~~52 | 11 | 1 |
| ~~54~~53 | 11 | 2 |
| ~~55~~54 | 11 | 3 |
| ~~56~~55 | 11 | 4 |
| 57 | 12 | 1 |
| 58 | 12 | 2 |
| 59 | 12 | 3 |
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |

FIG. 38 (Continued)

Table 38 – Continued: The look-up table for angleIdx and distanceIdx when the total number of geometric partitioning submodes is set to 140

| geo_partition_idx | angleIdx | distanceIdx |
|---|---|---|
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |

FIG. 38 (Continued)

Table 38 – Continued: The look-up table for angleIdx and distanceIdx when the total number of geometric partitioning submodes is set to 140

| geo_partition_idx | angleIdx | distanceIdx |
|---|---|---|
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |
| 120 | 27 | 1 |
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

FIG. 38 (Continued)

BLOCK PARTITIONING METHODS FOR VIDEO CODING

CROSS REFERENCE TO RELATED APPLICATIONS

The present application is a continuation of U.S. application Ser. No. 18/585,770, filed Feb. 23, 2024, which is a continuation of U.S. application Ser. No. 17/659,751 filed Apr. 19, 2022, which is a continuation of U.S. application Ser. No. 16/935,835 filed Jul. 22, 2020, which claims the benefits of priority to U.S. Provisional Application No. 62/887,039, filed Aug. 15, 2019, and U.S. Provisional Application No. 62/903,970, filed Sep. 23, 2019, all of which are incorporated herein by reference in their entireties.

TECHNICAL FIELD

The present disclosure generally relates to video processing, and more particularly, to methods and systems for performing motion prediction using triangle partitioning or geometric partitioning.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for processing video content. The method can include: partitioning, along a partitioning edge, a plurality of blocks associated with a picture into a first partition and a second partition; performing inter prediction on the plurality of blocks, to generate a first prediction signal for the first partition and a second prediction signal for the second partition; and blending the first and second prediction signals for edge blocks associated with the partitioning edge.

Embodiments of the present disclosure provide a system for processing video content. The system can include: a memory storing a set of instructions; and at least one processor configured to execute the set of instructions to cause the system to perform: partitioning, along a partitioning edge, a plurality of blocks associated with a picture into a first partition and a second partition; performing inter prediction on the plurality of blocks, to generate a first prediction signal for the first partition and a second prediction signal for the second partition; and blending the first and second prediction signals for edge blocks associated with the partitioning edge.

Embodiments of the present disclosure provide a non-transitory computer readable medium storing instructions that are executable by at least one processor of a computer system, wherein the execution of the instructions causes the computer system to perform a method comprising: partitioning, along a partitioning edge, a plurality of blocks associated with a picture into a first partition and a second partition; performing inter prediction on the plurality of blocks, to generate a first prediction signal for the first partition and a second prediction signal for the second partition; and blending the first and second prediction signals for edge blocks associated with the partitioning edge.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates an exemplary table for associating a merge index with motion vectors, consistent with embodiments of the disclosure.

FIG. 12 illustrate an exemplary look-up table for dis[ ], consistent with embodiments of the disclosure.

FIG. 13 illustrates an exemplary look-up table for GeoFilter[ ], consistent with embodiments of the disclosure.

FIG. 14 illustrates an exemplary look-up table for angleIdx and distanceIdx, consistent with embodiments of the disclosure.

FIG. 15A illustrates an exemplary look-up table for stepDis, consistent with embodiments of the disclosure.

FIG. 15B illustrates another exemplary look-up table for stepDis, consistent with embodiments of the disclosure.

FIG. 15C illustrates an exemplary look-up table for angleIdx and distanceIdx when the total number of geometric partitioning submodes is set to 140, consistent with embodiments of the disclosure.

FIG. 15D illustrates an exemplary look-up table for angleIdx and distanceIdx when the total number of geometric partitioning submodes is set to 108, consistent with embodiments of the disclosure.

FIG. 15E illustrates an exemplary look-up table for angleIdx and distanceIdx when the total number of geometric partitioning submodes is set to 80, consistent with embodiments of the disclosure.

FIG. 15F illustrates an exemplary look-up table for angleIdx and distanceIdx when the total number of geometric partitioning submodes is set to 64, consistent with embodiments of the disclosure.

FIG. 16 illustrates an exemplary syntax structure for a geometric partition mode, consistent with embodiments of the disclosure.

FIG. 17A illustrates another exemplary syntax structure for a geometric partition mode, consistent with embodiments of the disclosure.

FIG. 17B illustrates yet another exemplary syntax structure for a geometric partition mode, consistent with embodiments of the disclosure.

FIG. 18 illustrates an exemplary sub block transform for an inter-predicted block, consistent with embodiments of the disclosure.

FIG. 19 illustrates an example of unified syntax structure, consistent with embodiments of the disclosure.

FIG. 20 illustrates another example of unified syntax structure, consistent with embodiments of the disclosure.

FIG. 21 illustrates yet another example of unified syntax structure, consistent with embodiments of the disclosure.

FIG. 22A illustrates an exemplary look-up table for angleIdx and distanceIdx including triangle and geometric partitions, consistent with embodiments of the disclosure.

FIG. 22B illustrates another exemplary look-up table for angleIdx and distanceIdx including triangle and geometric partitions, consistent with embodiments of the disclosure.

FIG. 23 illustrates an example of allowing angles that partition the larger block dimension only, consistent with embodiments of the disclosure.

FIG. 24 illustrates yet another exemplary look-up table for angleIdx and distanceIdx including triangle and geometric partitions, consistent with embodiments of the disclosure.

FIG. 25 illustrates yet another exemplary look-up table for angleIdx and distanceIdx including triangle and geometric partitions, consistent with embodiments of the disclosure.

FIG. 26 illustrates an exemplary look-up table for Dis[ ], consistent with embodiments of the disclosure.

FIG. 27 illustrates an exemplary coding unit syntax structure, consistent with embodiments of the disclosure.

FIG. 28 illustrates examples of SBT and GEO partitionings, consistent with embodiments of the disclosure.

FIG. 29 illustrates another exemplary coding unit syntax structure, consistent with embodiments of the disclosure.

FIG. 30 illustrates an exemplary look-up table for angleIdx and distanceIdx when the total number of geometric partitioning submodes is set to 80, consistent with embodiments of the disclosure.

FIG. 31 illustrates an exemplary look-up table for angleIdx and distanceIdx when the total number of geometric partitioning submodes is set to 64, consistent with embodiments of the disclosure.

FIG. 32 illustrates an exemplary look-up table for Rho[ ], consistent with embodiments of the disclosure.

FIG. 33 illustrates a table of numbers of each operation per block, consistent with embodiments of the disclosure.

FIG. 34 illustrates an exemplary look-up table for $Rho_{subblk[\ ]}$, consistent with embodiments of the disclosure.

FIG. 35A illustrates exemplary masks of angle 135°, consistent with embodiments of the disclosure.

FIG. 35B illustrates exemplary masks of angle 45°, consistent with embodiments of the disclosure.

FIG. 36A illustrates exemplary masks of angle 135°, consistent with embodiments of the disclosure.

FIG. 36B illustrates exemplary masks of 45°, consistent with embodiments of the disclosure.

FIG. 37 illustrates exemplary angles of triangle partition modes for different block shapes, consistent with embodiments of the disclosure.

FIG. 38 illustrates an exemplary look-up table for angleIdx and distanceIdx when the total number of geometric partitioning submodes is set to 140, consistent with embodiments of the disclosure

DETAILED DESCRIPTION

Figure 1:
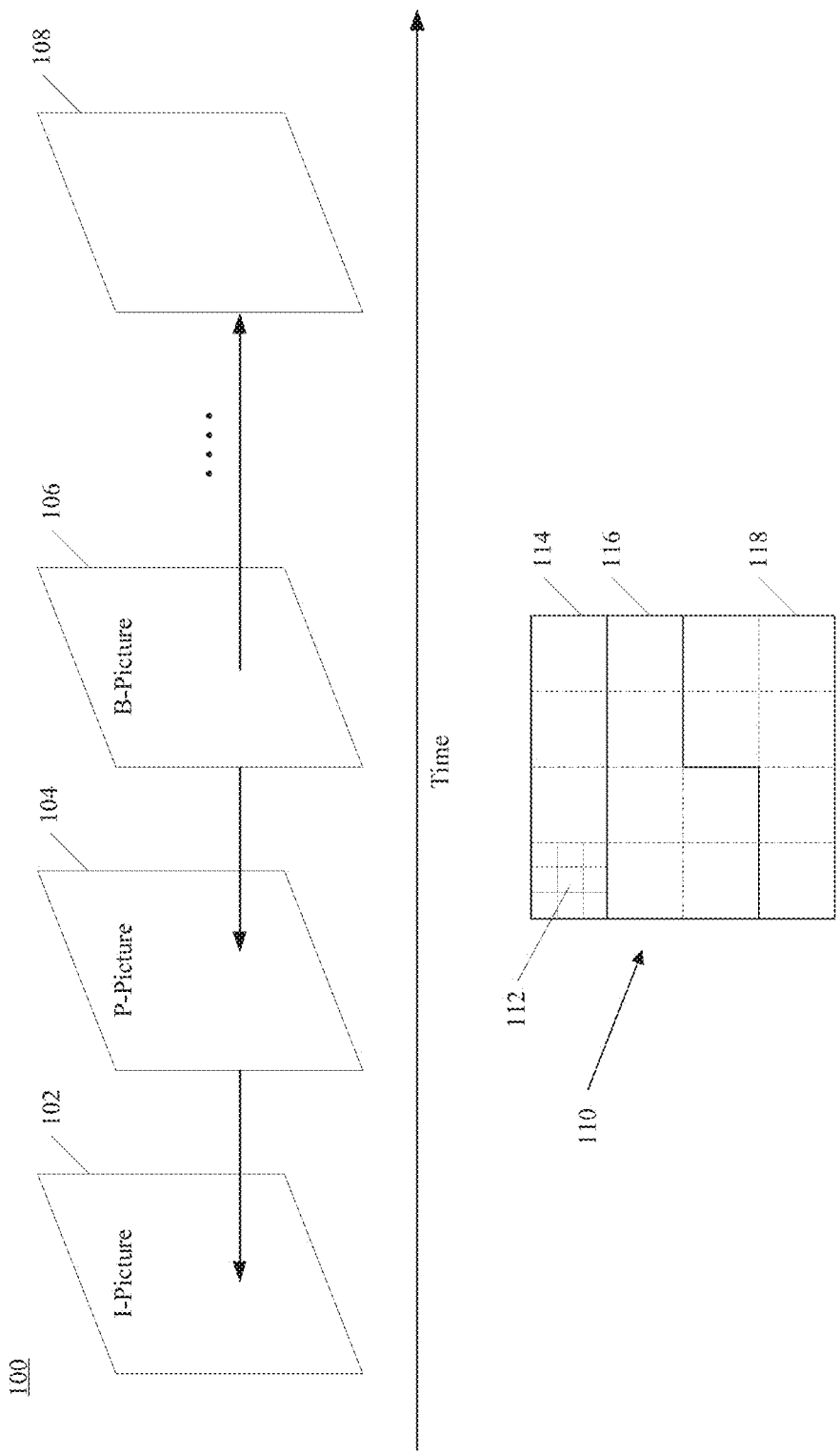
FIG. 1 illustrates structures of an exemplary video sequence, consistent with embodiments of the disclosure, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture."

A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
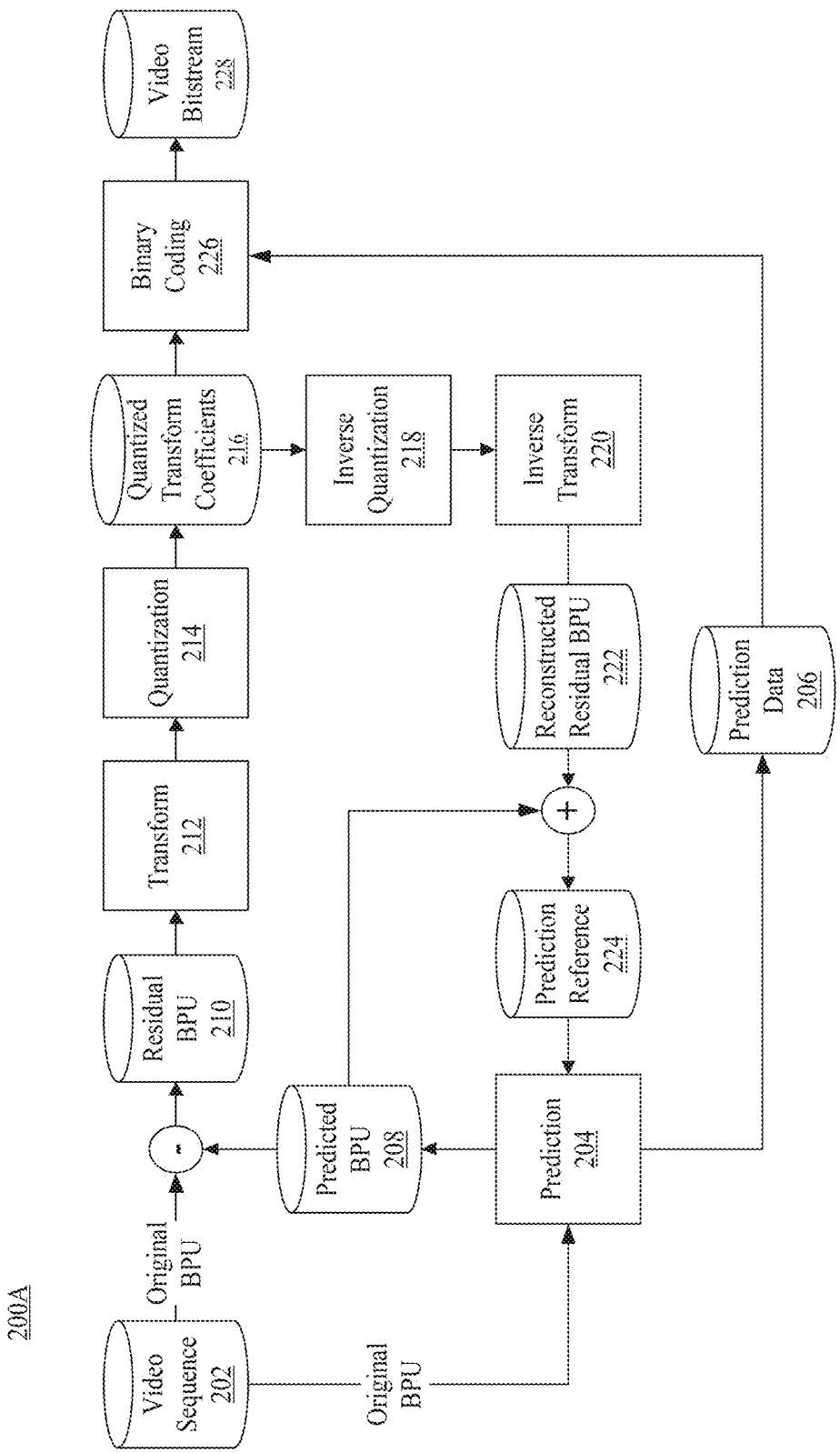
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
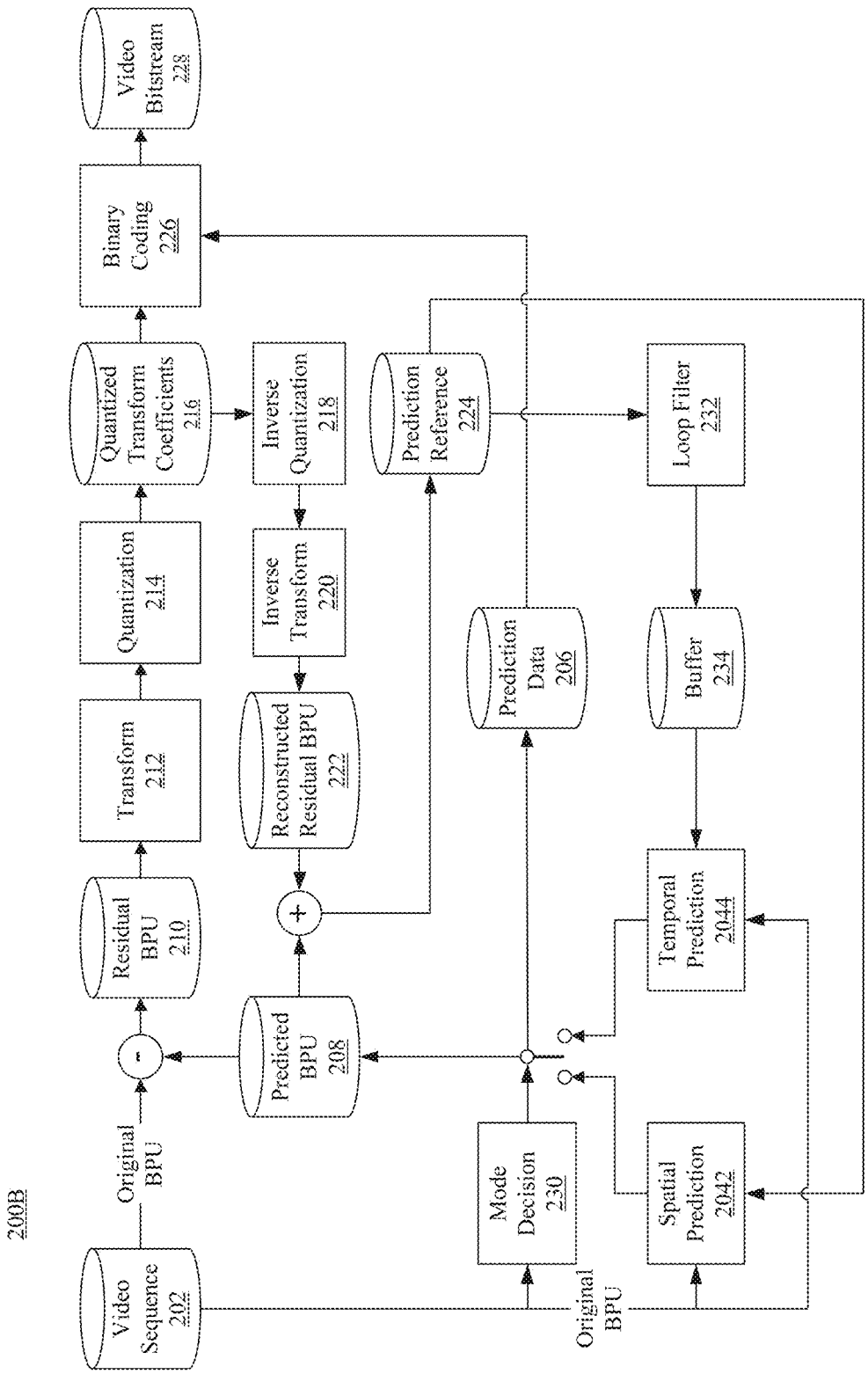
FIG. 2B illustrates a schematic diagram of another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
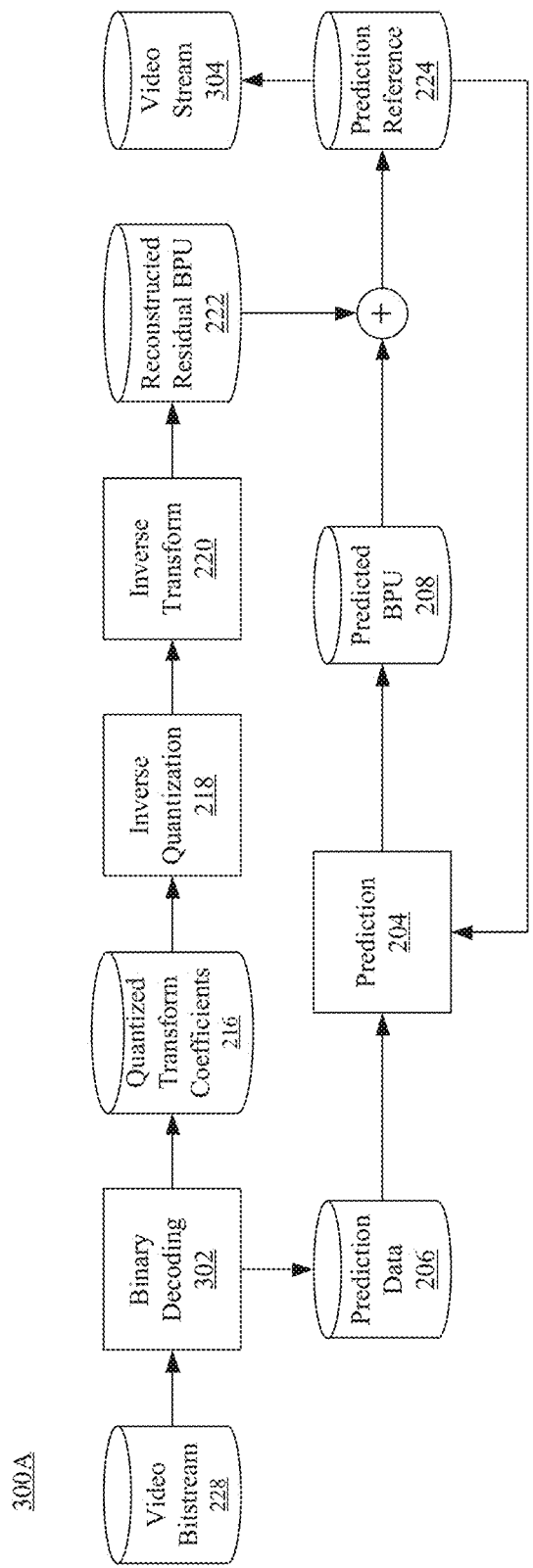
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
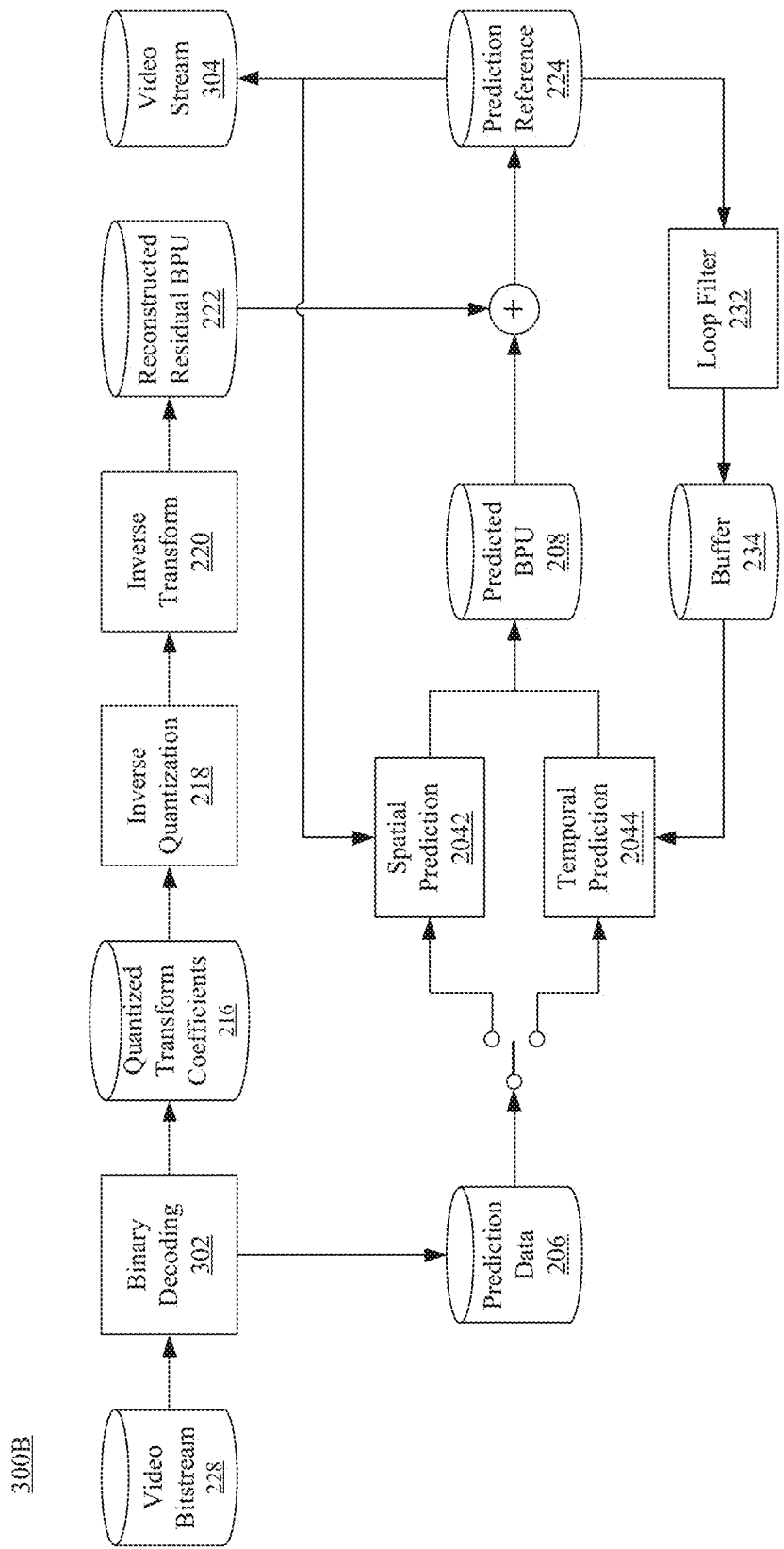
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
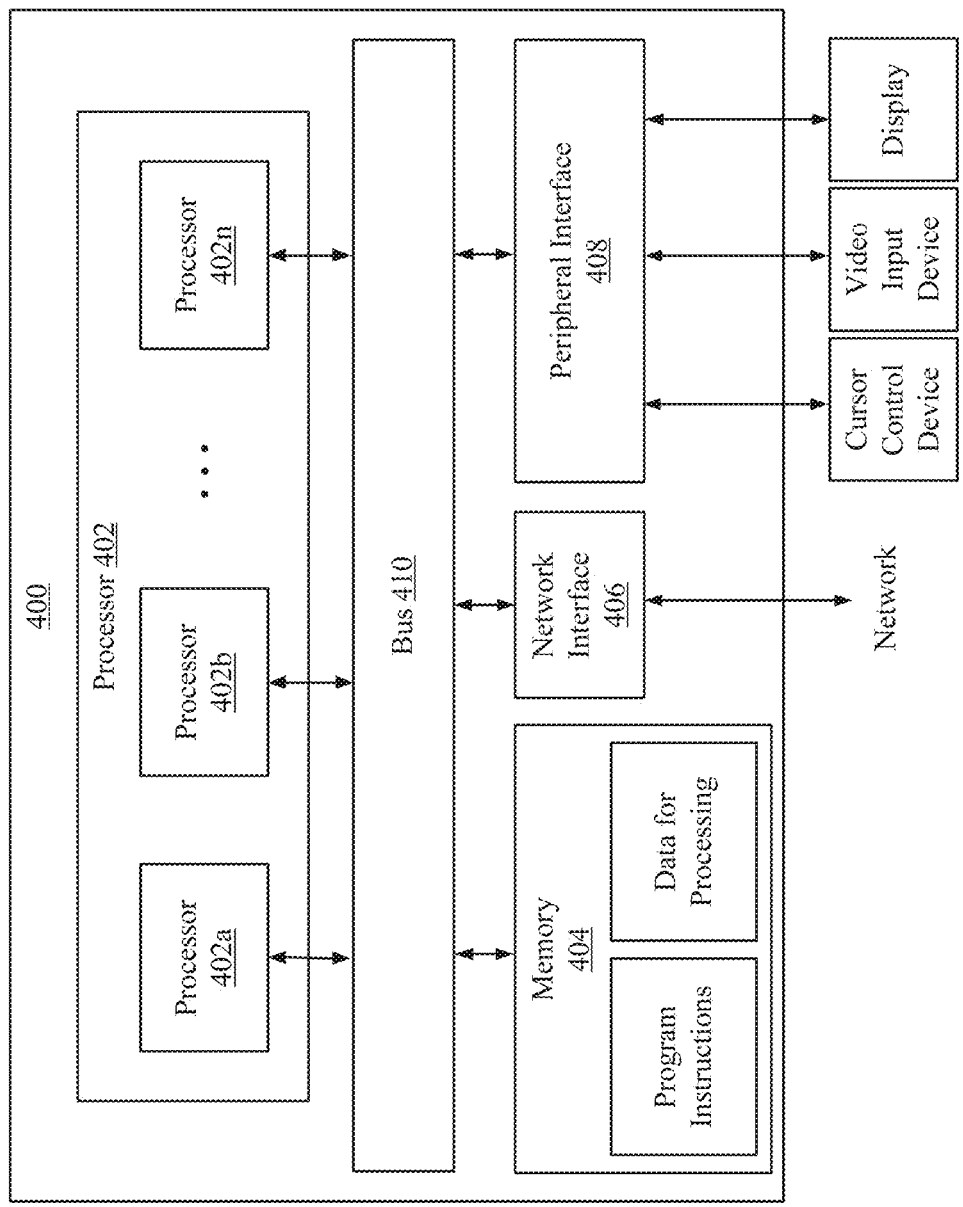
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides block partition methods for use in motion prediction. It is contemplated that the disclosed methods can be performed by either an encoder or a decoder.

A triangle partition mode is supported for inter prediction. The triangle partition mode can be applied to blocks that are 8×8 or larger and are coded in a triangle skip or merge mode. A triangle skip/merge mode is signalled in parallel to a regular merge mode, an MMVD mode, a combined inter and intra prediction (CIIP) mode, or a subblock merge mode.

Figure 5:
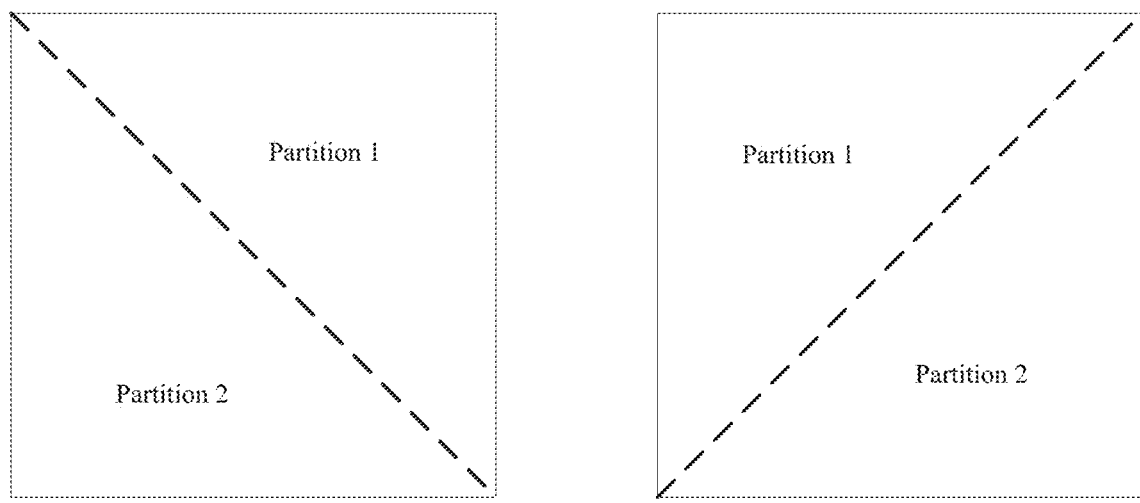
FIG. 5 illustrates an exemplary inter prediction based on triangle partition, consistent with embodiments of the disclosure.

When the triangle partition mode is used, a block can be split evenly into two triangle-shaped partitions, using either the diagonal split or the anti-diagonal split (FIG. 5). Each triangle partition in the block is inter-predicted using its own motion. Only uni-prediction is allowed for each partition. In other words, each partition has one motion vector and one reference index. The uni-prediction motion constraint is applied to ensure that same as the conventional bi-prediction, only two motion compensated predictions are needed for each block. The uni-prediction motion for each partition is derived directly from the merge candidate list constructed for extended merge prediction, and the selection of a uni-prediction motion from a given merge candidate in the list is according to the procedure described below.

If the triangle partition mode is used for a current block, then a flag indicating the direction of the triangle partition (diagonal or anti-diagonal) and two merge indices (one for each partition) are further signalled. After predicting each of the triangle partitions, the sample values along the diagonal or anti-diagonal edge are adjusted using a blending processing with adaptive weights. This is the prediction signal for the whole block, and a process for transforming and quantization can be applied to the whole block as in other prediction modes. It is noted that the sub-block transform (SBT) mode cannot be applied to the block coded using the triangle partition mode. The motion field of a block predicted using the triangle partition mode can be stored in 4×4 subblocks.

Uni-prediction candidate list construction for the triangle partition mode is described below.

Figure 6:
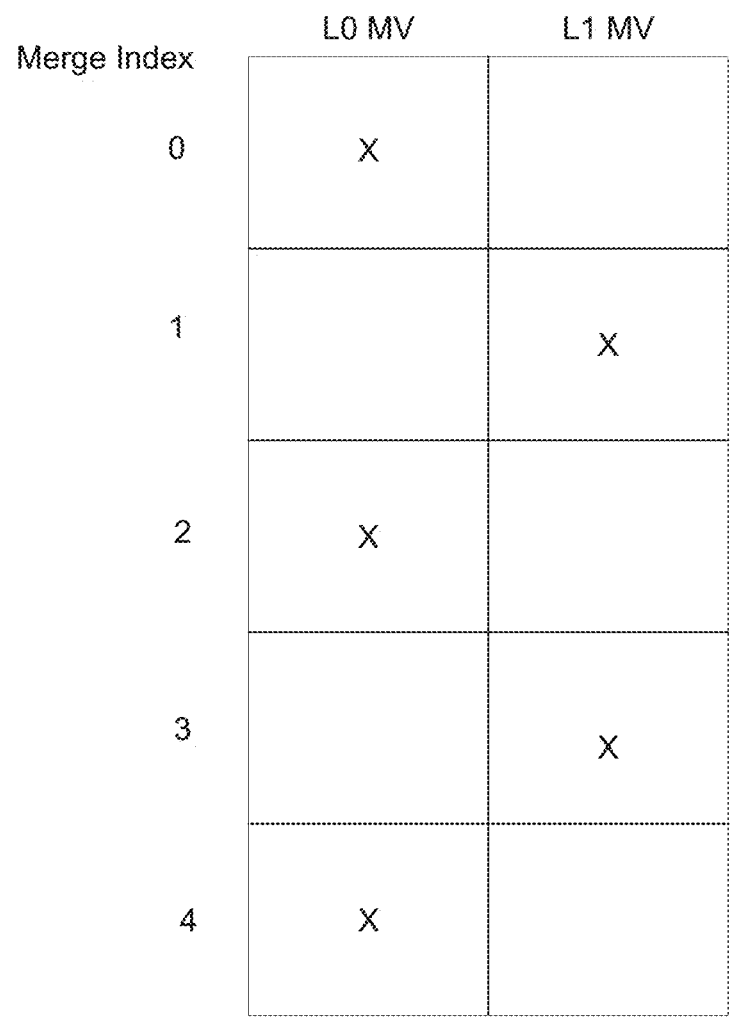

Given a merge candidate index, the uni-prediction motion vector is derived from the merge candidate list constructed for extended merge prediction, as exemplified in FIG. 6. For a candidate in the list, its LX (L0 or L1) motion vector with X equal to the parity of the merge candidate index value (i.e., X=0 or 1), is used as the uni-prediction motion vector for triangle partition mode. These motion vectors are marked with "x" in FIG. 6. When a corresponding LX motion vector does not exist, the L(1−X) motion vector of the same candidate in the extended merge prediction candidate list is used as the uni-prediction motion vector for triangle partition mode.

Blending along the triangle partition edge will be described below.

Figure 7:
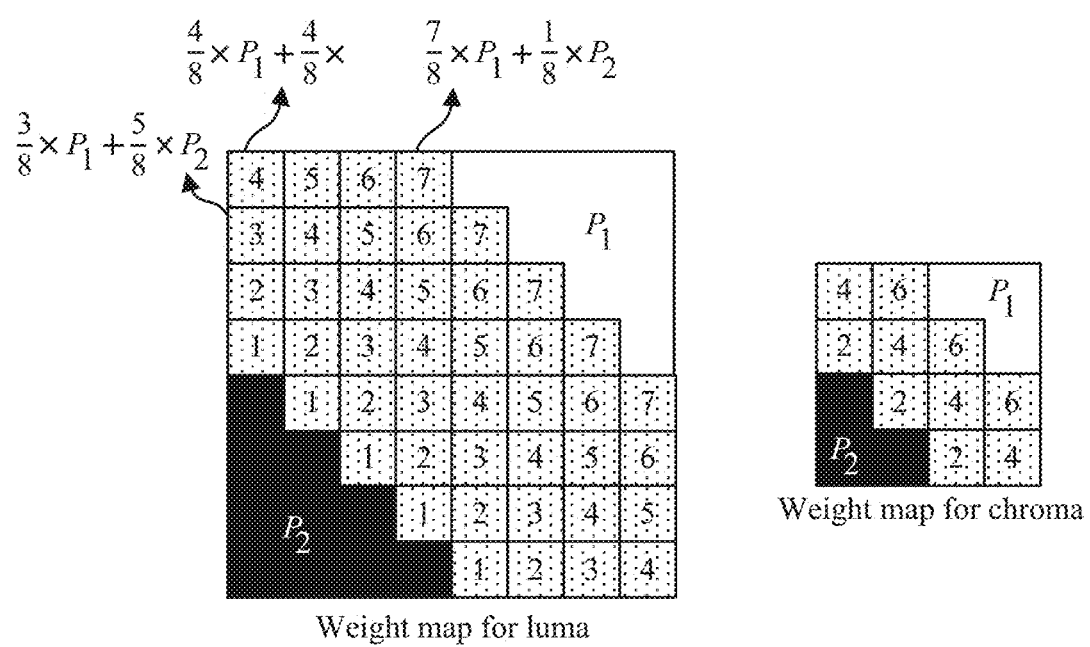
FIG. 7 illustrates an exemplary chroma weight map and an exemplary luma weight sample, consistent with embodiments of the disclosure.

After predicting each triangle partition using its own motion, blending is applied to the two prediction signals to derive samples around the diagonal edge or the anti-diagonal edge. The following weights are used in the blending process:

{7/8, 6/8, 5/8, 4/8, 3/8, 2/8, 1/8} for luma and {6/8, 4/8, 2/8} for chroma, as shown in FIG. 7.

The weight of each of the luma and chroma samples within a block predicted using triangle partition mode is calculated using the following equations:

the ratio $$R = (CuW_L > CuH_L)? \frac{CuW_L}{CuH_L} : \frac{CuH_L}{CuW_L}$$

the split direction splitDir is set to 0 if the block is split from a first direction (e.g., from a top-left corner to a bottom-right corner). Otherwise, splitDir is set to 1 if the block is split from a second direction (e.g., from a top-right corner to a bottom-left corner).

$sampleWeight_L[x][y] =$ $$\begin{cases} \text{clip3}\left(0, 8, \frac{x}{R} - y + 4\right) & \text{if } splitDir = 0 \text{ and } CuW_L > CuH_L \\ \text{clip3}\left(0, 8, x - \frac{y}{R} + 4\right) & \text{if } splitDir = 0 \text{ and } CuW_L \leq CuH_L \\ \text{clip3}\left(0, 8, CuH_L - 1 - \frac{x}{R} - y + 4\right) & \text{if } splitDir = 1 \text{ and } CuW_L > CuH_L \\ \text{clip3}\left(0, 8, CuW_L - 1 - x - \frac{y}{R} + 4\right) & \text{if } splitDir = 1 \text{ and } CuW_L \leq CuH_L \end{cases}$$

$sampleWeight_C[x][y] =$ $$\begin{cases} \text{clip3}\left(0, 4, \frac{x}{R} - y + 2\right) \times 2 & \text{if } splitDir = 0 \text{ and } CuW_C > CuH_C \\ \text{clip3}\left(0, 4, x - \frac{y}{R} + 2\right) \times 2 & \text{if } splitDir = 0 \text{ and } CuW_C \leq CuH_C \\ \text{clip3}\left(0, 4, CuH_C - 1 - \frac{x}{R} - y + 2\right) \times 2 & \text{if } splitDir = 1 \text{ and } CuW_C > CuH_C \\ \text{clip3}\left(0, 4, CuW_C - 1 - x - \frac{y}{R} + 2\right) \times 2 & \text{if } splitDir = 1 \text{ and } CuW_C \leq CuH_C \end{cases}$$

where the sampleWeight$_L$ represents the weight map for luma samples, sampleWeight$_C$ represents the weight map for chroma samples, (x, y) represents the position of luma/chroma sample, (CuW$_L$, CuH$_L$) represents the block width and height in luma samples, and (CuW$_C$, CuH$_C$) represents the block width and height in chroma samples.

Then, motion field storage in the triangle partition mode will be described below.

The motion vectors of a block coded in the triangle partition mode are stored in 4×4 subblocks. Depending on the position of each 4×4 subblock, either uni-prediction or bi-prediction motion vectors are stored. Denote Mv1 and Mv2 as uni-prediction motion vectors for partition 1 and partition 2 in FIG. 5, respectively. If a 4×4 subblock is located in the uni-predicted area, either Mv1 or Mv2 is stored for that 4×4 subblock. Otherwise, if the 4×4 subblock is located in the bi-predicted area, a bi-prediction motion vector is stored. The bi-prediction motion vector is derived from Mv1 and Mv2 according to the following process.

1. If Mv1 and Mv2 are from different reference picture lists (one from L0 and the other from L1), then Mv1 and Mv2 are simply combined to form the bi-prediction motion vector.

2. Otherwise, if Mv1 and Mv2 are from the same list, instead of bi-prediction motion, only uni-prediction motion Mv2 is stored.

Figure 8:
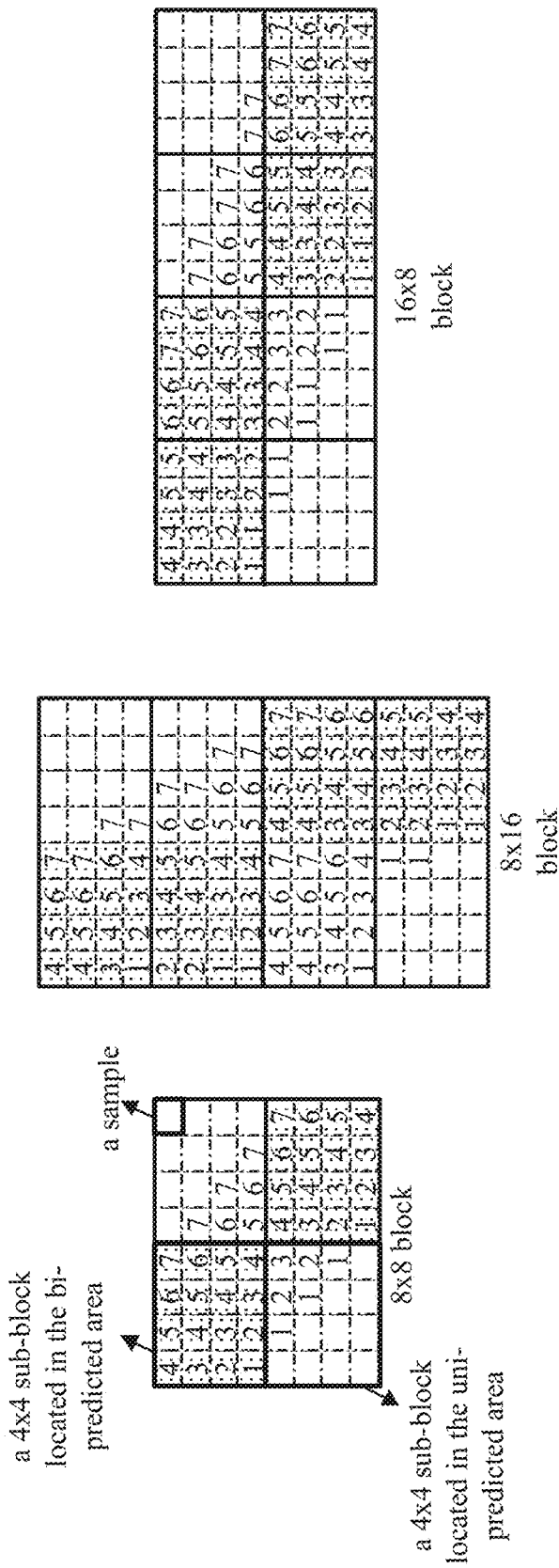
FIG. 8 illustrates examples of the 4×4 subblocks for storing motion vectors located in the uni-predicted or bi-predicted area, consistent with embodiments of the disclosure.

It is noted that, when all the samples within a 4×4 subblock are weighted, the 4×4 subblock is considered to be in the bi-predicted area. Otherwise, the 4×4 subblock is considered to be in the uni-predicted area. Examples of the bi-predicted area (which is the shadow area) and the uni-predicted area are shown in FIG. 8.

The following equations may be used to determine whether a 4×4 subblock is located in the bi-predicted area:
the ratio $$R = (CuW_L > CuH_L)? \frac{CuW_L}{CuH_L} : \frac{CuH_L}{CuW_L}$$

the split direction splitDir is set to 0 if the block is split from a top-left corner to a bottom-right corner. Otherwise, splitDir is set to 1 if the block is split from a top-right corner to a bottom-left corner.
the variable $$minSb = \min\left(\frac{CuW_L}{4}, \frac{CuH_L}{4}\right) - 1$$

if $CuW_L > CuH_L$ and splitDir=0,
if $$\frac{x/4}{R} = \frac{y}{4},$$

the 4×4 subblock is located in the bi-predicted area;
otherwise, the 4×4 subblock is located in the uni-predicted area;
if $CuW_L \leq CuH_L$ and splitDir=0,
if $$\frac{x}{4} = \frac{y/4}{R},$$

the 4×4 subblock is located in the bi-predicted area;
otherwise, the 4×4 subblock is located in the uni-predicted area;
if $CuW_L > CuH_L$ and splitDir=1,
if $$\frac{x/4}{R} + \frac{y}{4} = minSb,$$

the 4×4 subblock is located in the bi-predicted area;
otherwise, the 4×4 subblock is located in the uni-predicted area;
if $CuW_L \leq CuH_L$ and splitDir=1,
if $$\frac{x}{4} + \frac{y/4}{R} = minSb,$$

the 4×4 subblock is located in the bi-predicted area;
otherwise, the 4×4 subblock is located in the uni-predicted area;
where the (x, y) represents the position of the top-left luma sample of the 4×4 subblock and ($CuW_L$, $CuH_L$) represents the block width and block height in luma samples.

Exemplary syntax structures for the triangle partition mode are described below.

Figure 9:
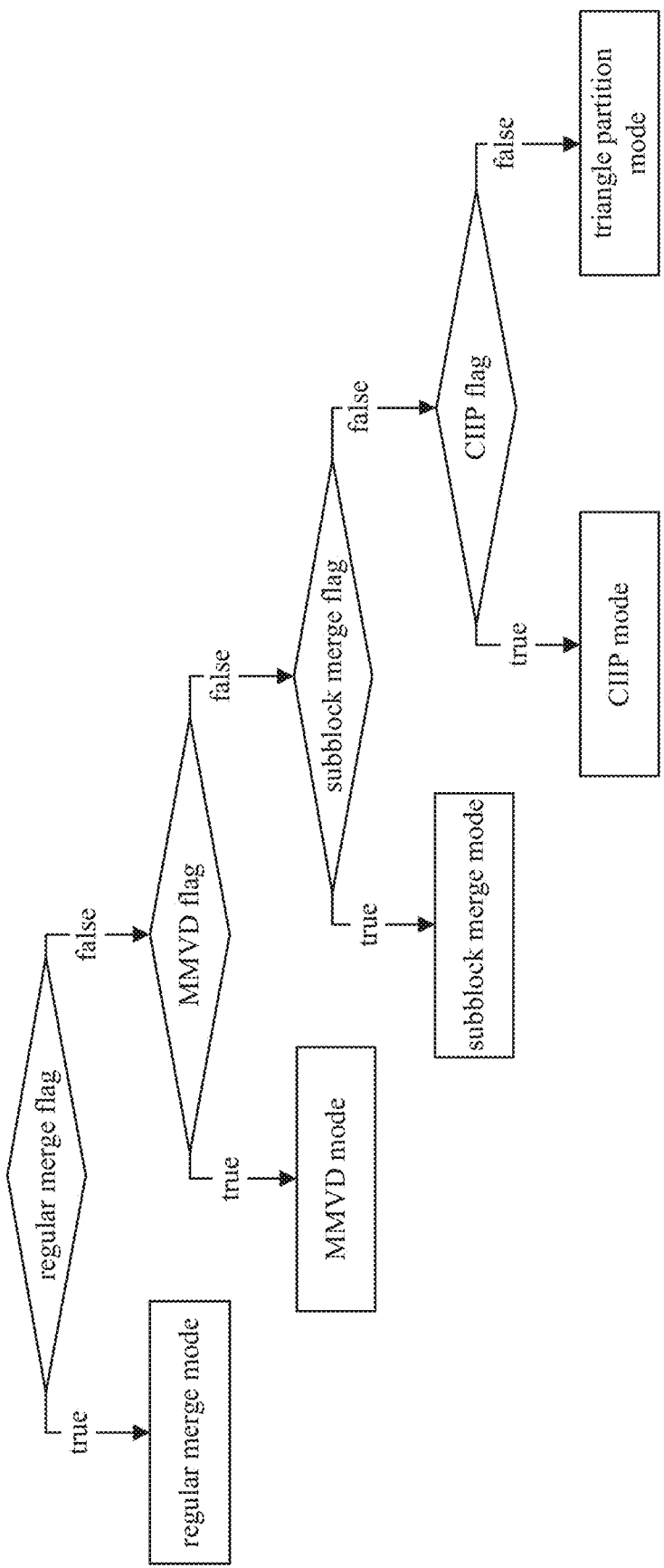
FIG. 9 illustrates an exemplary syntax structure of a merge mode, consistent with embodiments of the disclosure.
Figure 10:
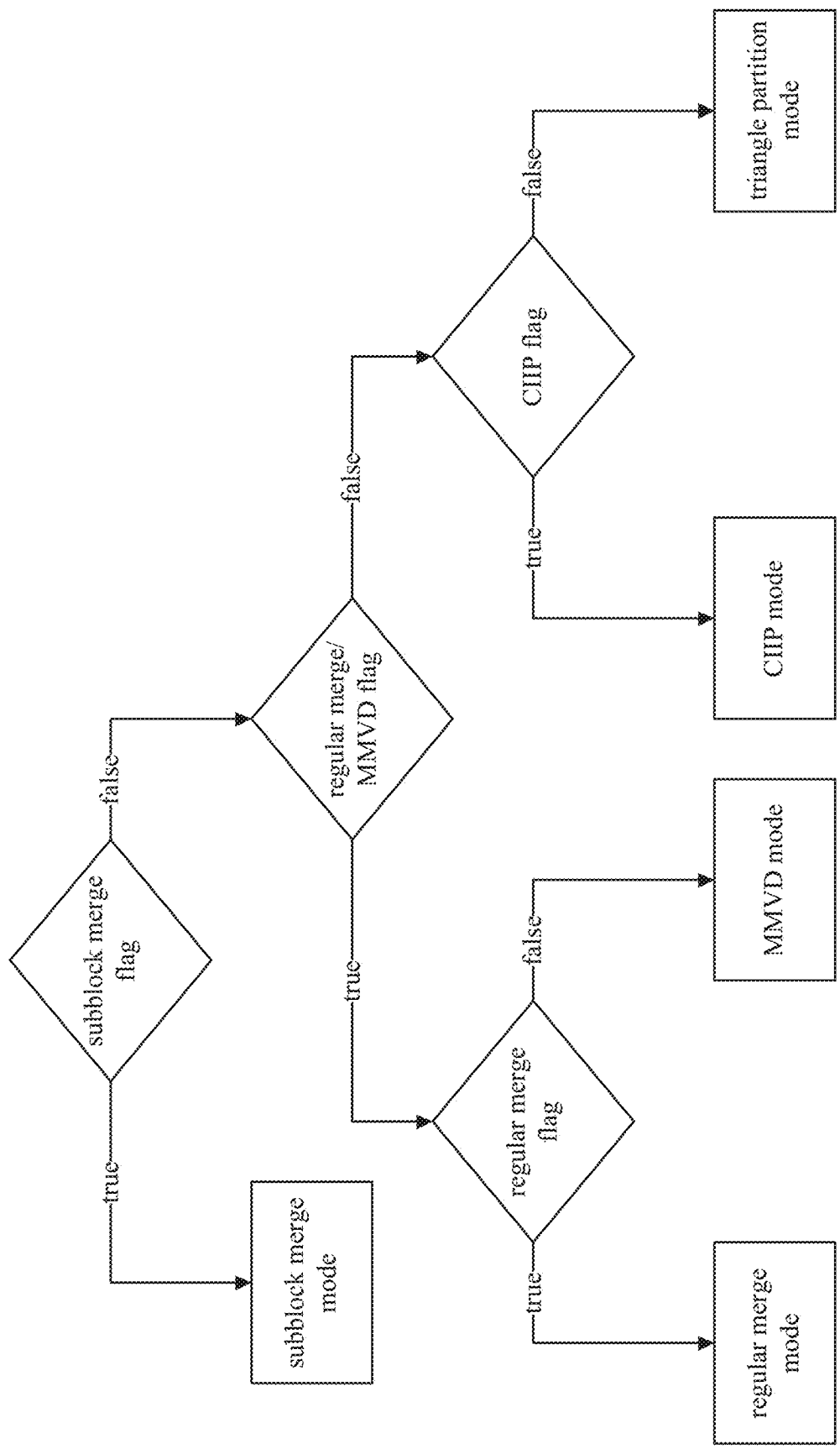
FIG. 10 illustrates another exemplary syntax structure of a merge mode, consistent with embodiments of the disclosure.

Exemplary syntax structures of a merge mode are shown in FIGS. 9-10, respectively. The CIIP flag shown in the figures is used to indicate whether a block is predicted using triangle partition mode.

Geometric partition mode consistent with the present disclosure is described as below.

Figure 11:
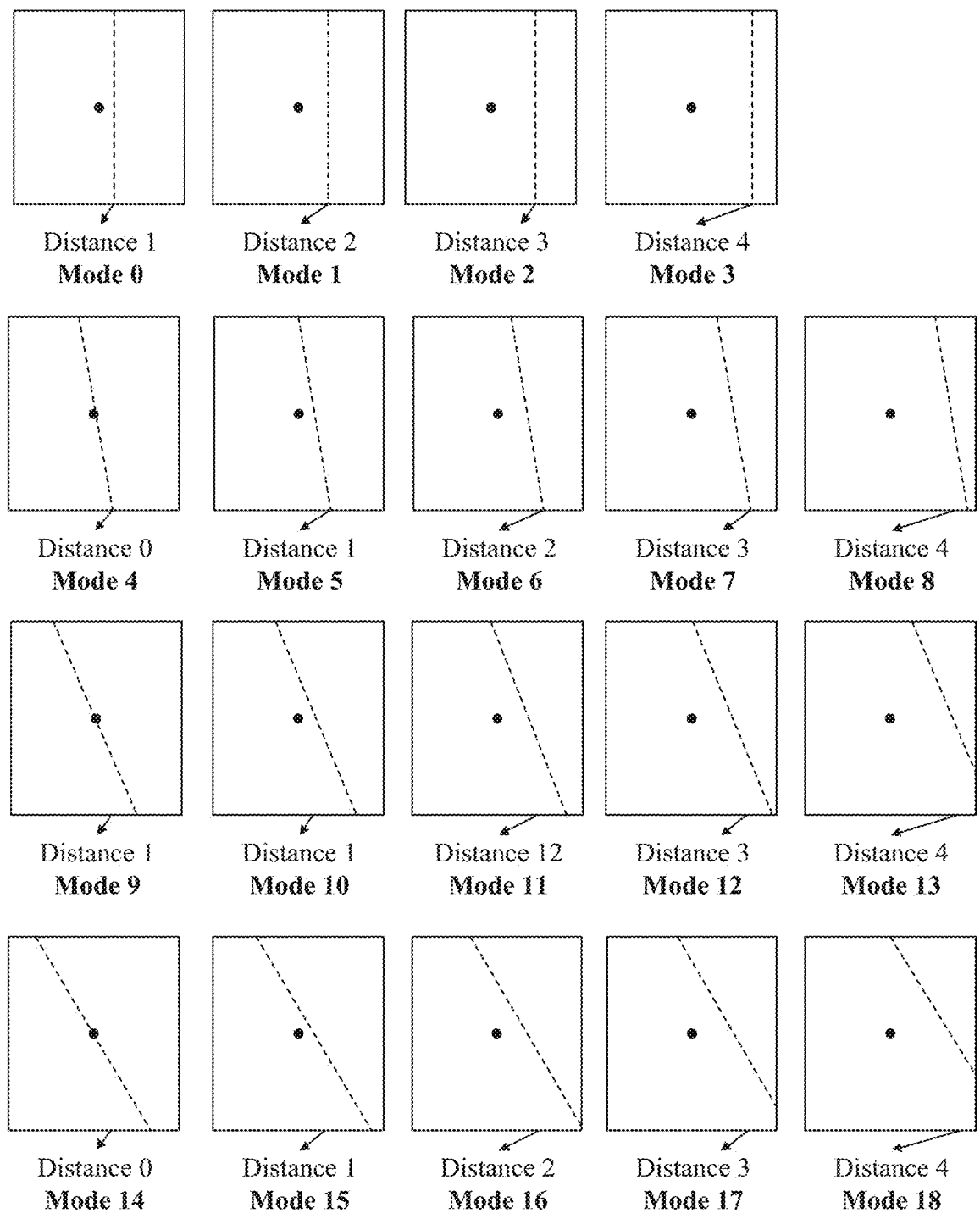
FIG. 11 illustrates exemplary geometric partitions, consistent with embodiments of the disclosure.

In the disclosed embodiments, the geometric partition mode can also be used to code video content. In the geometric partition mode, a block is split into two partitions, and the two partitions can be in either rectangular or non-rectangular shape, as shown in FIG. 11. Then the two partitions are inter-predicted with its own motion vectors. The uni-prediction motion is derived using the same process descried above with reference to FIG. 6. After predicting each of the geometric partitions, similar to the process used in triangle partition mode, the sample values along the partitioning edge are adjusted using a blending processing with adaptive weights. This is the prediction signal for the whole block, and transform and quantization process can be applied to the whole block as in other prediction modes. It is noted that the SBT mode can be applied to a block coded using geometric partition mode. Finally, the motion field of a block predicted using the geometric partition mode can be stored in 4×4 subblocks. The benefit of geometric partition mode is that it provides more flexible partitioning method for motion compensation.

The geometric partition mode is only applied to blocks whose width and height are both larger than or equal to 8 and the ratio of max(width, height)/min(width, height) is smaller than or equal to 4, and are coded in a geometric skip or merge mode. A geometric partition mode is signaled for each block in parallel to a regular merge mode, MMVD mode, CIIP mode, a subblock merge mode, or a triangle partition mode. When this mode is used for a current block, a geometric partition mode index indicating which one out of 140 partitioning method (32 quantized angle+5 quantized distance) is used to split the current block and two merge indices are further signaled. It is noted that the total number of geometric partitioning submodes may be one of 140 (16 quantized angle+9 quantized distance), 108 (16 quantized angle+7 quantized distance), 80 (12 quantized angle+7 quantized distance) and 64 (10 quantized angle+7 quantized distance) depending on different setting.

Blending along the geometric partition edge will be discussed as below. After predicting each geometric partition using its own motion, a blending process is applied to the two prediction signals to derive samples around the partition edge. In some embodiments, the weight for each luma sample is calculated using the following equations.

$$distFromLine = ((x \ll 1) + 1) \times Dis[displacementX] +$$
$$((y \ll 1) + 1) \times Dis[displacementY] - rho$$
$$disScaled = \text{Min}((abs(distFromLine)) \gg 4.14)$$
$$sampleWeight_L[x][y] =$$
$$distFromLine \le 0 \ ? \ GeoFilter[distScaled]:8 - GeoFilter[distScaled]$$

where (x, y) represents the position of each luma sample, Dis[ ] and GeoFilter [ ] are two look-up tables as shown in Table 12 and Tables 13A-13B of FIGS. 12-13, respectively The parameters displacementX, displacementY, and rho are calculated as follows:

$$displacementX = angleIdx$$
$$displacementY = (displacementX + NumAngles \gg 2) \ \% \ NumAngles$$
$$rho = distanceIdx \times stepSize \times scaleStep +$$
$$CuW \times Dis[displacementX] + CuH \times Dis[displacementY]$$
$$stepSize = stepDis + 64$$
$$scaleStep = (wIdx \ge hIdx) \ ? \ (1 \ll hIdx):(hIdx - wIdx)$$
$$wIdx = \log2(CuW) - 3$$
$$hIdx = \log2(CuH) - 3$$
$$whRatio = (wIdx \ge hIdx)?(wIdx - hIdx):(hIdx - wIdx)$$
$$angleN = \begin{cases} angleIdx & angleIdx > 0 \text{ and } angleIdx \le 8 \\ 16 - angleIdx & angleIdx > 8 \text{ and } angleIdx \le 16 \\ angleIdx - 16 & angleIdx > 16 \text{ and } angleIdx \le 24 \\ 32 - angleIdx & \text{otherwise} \end{cases}$$
$$angleN = (wIdx \ge hIdx) \ ? \ 8 - angleN:angleN$$

where (CuW, CuH) is the block width and height in luma samples, NumAngles is set to 32, angleIdx and distanceIdx are derived from Table 14 of FIG. 14, and stepDis is derived from Table 15A of FIG. 15A.

In some embodiments, the parameters displacementX, displacementY, and rho can also be calculated as follows.

$$displacementX = angleIdx$$
$$displacementY = (displacementX + NumAngles \gg 2) \ \% \ NumAngles$$
$$rho = distanceIdx \times (stepSize \ll scaleStep) + Dis[displacementX] \ll$$
$$wIdx + Dis[displacementY] \ll hIdx$$
$$stepSize = stepDis + 77$$
$$scaleStep = (wIdx \ge hIdx) \ ? \ hIdx - 3:wIdx - 3$$
$$wIdx = \log2(CuW)$$
$$hIdx = \log2(CuH)$$
$$whRatio = (wIdx \ge hIdx) \ ? \ (wIdx - hIdx):(hIdx - wIdx)$$
$$angleN = \begin{cases} angleIdx \ \% \ 8 & wIdx \ge hIdx \text{ and } (angleIdx \gg 3) \ \% \ 1 = 1 \\ 8 - (angleIdx \ \% \ 8) & wIdx \ge hIdx \text{ and } (angleIdx \gg 3) \ \% \ 1 = 0 \\ 8 - (angleIdx \ \% \ 8) & wIdx < hIdx \text{ and } (angleIdx \gg 3) \ \% \ 1 = 1 \\ angleIdx \ \% \ 8 & wIdx < hIdx \text{ and } (angleIdx \gg 3) \ \% \ 1 = 0 \end{cases}$$

where (CuW, CuH) is the block width and height in luma samples, NumAngles is set to 32, and stepDis is derived from Table 15B of FIG. 15B. The angleIdx and distanceIdx are derived from Table 15C, Table 15D, Table 15E, and Table 15F of FIGS. 15C-15F, when the total number of geometric partitioning submodes is set to 140, 108, 80 and 64, respectively.

The weight for chroma sample is subsampled from the top-left luma samples weights of each 2×2 luma subblock e.g., for YUV 4:2:0 video format.

Motion field storage in the geometric partition mode will be described below.

The motion vectors of a block coded in the geometric partition mode are stored in 4×4 subblocks. For each 4×4 subblock, either uni-prediction or bi-prediction motion vectors are stored. The derivation process for bi-prediction motion is the same as the process described above. To determine whether uni-prediction or bi-prediction motion vectors are stored for a 4×4 subblock, two kinds of methods are proposed.

In a first method, for a 4×4 subblock, the sample weight value of its 4 corners are summed up. If the sum is smaller than a threshold2 and greater than a threshold1, bi-prediction motion vectors is stored for this 4×4 subblock. Otherwise, uni-prediction motion vector is stored. The threshold1 and threshold2 are set to 32>>(((log 2(CuW)+log 2(CuH)) >>1)−1) and 32−threshold1, respectively.

In a second method, the following equations are used to determine which motion vector is stored for this 4×4 subblock depending on its position.

$$rho_{subblk} = 3 \times Dis[displacementX] + 3 \times Dis[displacementY]$$
$$distFromLine_{subblk} = ((x_{subblk} \ll 3) + 1) \times Dis[displacementX] +$$
$$((y_{subblk} \ll 3) + 1) \times Dis[displacementY] - rho + rho_{subblk}$$
$$motionMask[x_{subblk}][y_{subblk}] =$$
$$abs(distFromLine_{subblk}) < 256 \ ? \ 2:(distFromLine_{subblk} \le 0 \ ? \ 0:1)$$

where ($x_{subblk}$, $y_{subblk}$) represents the position of each 4×4 subblock. The variables Dis [ ], displacementX, displacementY and rho are the same as the variables described above. When the value of motionMask[$x_{subblk}$][$y_{subblk}$] is equal to 2, bi-prediction motion vectors are stored for this 4×4 subblock. Otherwise, uni-prediction motion vector is stored for this 4×4 subblock.

Three exemplary syntax structures for the geometric partition mode are shown in FIGS. 16-17B, respectively.

In some embodiments, a sub block transform can be used. In the sub block transform, a residual block is split into two residual sub blocks, as shown in FIG. 18. Only one of the two residual sub blocks is coded. For the other residual sub block, the residue is set equal to 0.

For an inter prediction block with residue, a CU level flag is signaled to indicate whether sub block transform is applied or not. When the sub block transform mode is used, parameters are signaled to indicate that the residual block is symmetric or asymmetric split into two sub blocks in either horizontal or vertical direction.

Triangle partition and geometric partition modes are two partitioning methods to improve the coding efficiency of motion compensation. Triangle partition may be viewed as a subset of geometric partition. However, in the current implementation, the syntax structure, blending process, and motion field storage of geometric partition mode is different from those of triangle partition mode. For example, the following processes are different in these two modes.

1. For a block coded in merge mode, two flags (including a triangle partition mode flag and a geometric partition mode flag) are signaled. Moreover, a triangle partition mode can be applied to blocks of which width or height is equal to 4. However, a geometric partition mode cannot be applied to those blocks.

2. The equations used in the calculation of weight of luma samples coded in the triangle partition mode is different from the luma sample weight calculation in geometric partition mode. Moreover, the weight of chroma samples coded in triangle partition mode is calculated separately, whereas the weight of chroma samples coded in geometric partition mode is subsampled from the corresponding luma samples.

3. The motion vectors of a block coded in either triangle partition or geometric partition modes are both stored in 4×4 subblocks. And depending on the position of each 4×4 subblock, either uni-prediction or bi-prediction motion vectors are stored. However, the process of selecting one of uni-prediction or bi-prediction motion vectors to be stored for a 4×4 subblock is different for the triangle partition mode and geometric partition mode.

4. The SBT mode is not allowed in the case of triangle partition mode but it can be applied to the geometric partition mode.

Because the triangle partition mode can be viewed as a subset of geometric partition mode, it can unify all the process used in triangle partition and geometric partition modes.

To unify the syntax of triangle partition and geometric partition modes, it can use only one flag to indicate whether a block is split into two partitions. When the size of a block is larger than or equal to 64 luma samples, the flag is signaled. When the flag is true, a partition mode index is further signaled to indicate which partition method is used to split the block.

In one embodiment, a flag (e.g., the CIIP flag in FIGS. 19-20) is signaled when a block is not coded using subblock merge, regular merge, and MMVD modes.

In another embodiment, a flag (e.g., the triangle/geometric flag in FIG. 21) is signaled at the beginning of merge syntax structure.

When a block is split into two partitions, a partition mode index is further signaled to indicate which partition method is used.

In one embodiment, the two triangle partition modes (e.g., splitting a block either from a top-left corner to a bottom-right corner or a top-right corner to a bottom-left corner) is put in the front of partition mode list, followed by the geometric partition modes. In other words, when the partition mode index is equal to 0 or 1, the block is split using the triangle partition mode. Otherwise, the block is split using the geometric partition mode.

In another embodiment, the triangle partition modes is treated as one of geometric partition modes, as shown in Table 22A of FIG. 22A. For example, when the partition mode index is equal to 19, the block is split from a top-left corner to a bottom-right corner. As another example, the partition mode index 58 represents that the block is split from a top-right corner to a bottom-left corner.

In yet another embodiment, the triangle partition modes is also treated as one of geometric partition modes, as shown in Table 22B of FIG. 22B. When the partition mode index is equal to 10, the block is split from a top-left corner to a bottom-right corner. Moreover, the partition mode index being 24 represents that the block is split from a top-right corner to a bottom-left corner.

It is noted that the number of partition modes for a block may depend on a block size and/or a block shape.

In one embodiment, only two partition modes are allowed for a block if its width or height is equal to 4, or the ratio of max(width, height)/min(width, height) is larger than 4. Otherwise, 142 partition modes are allowed.

In another embodiment, when the size of a block is larger than a threshold, the number of partition modes is reduced. For example, when the size of a block is larger than 1024 luma samples, only 24 quantized angles and 4 quantized distances are allowed.

In yet another embodiment, when the block shape is narrow-and-tall or wide-and-flat, the number of partition modes is reduced. For example, when the ratio of max (width, height)/min(width, height) is larger than 2, only 24 quantized angle and 4 quantized distance are allowed. Further, only angles that partition the block along the larger dimension may be allowed, as shown in FIG. 23. As shown in FIG. 23, for a wide-and-flat block, the 3 angles shown in dashed lines are not allowed, and only the angles shown in solid lines are allowed.

In yet another embodiment, when the size of a block is larger than a threshold and the block shape is narrow-and-tall or wide-and-flat, the number of partition modes can be reduced. For example, when the size of a block is larger than 1024 luma samples and the ratio of max(width, height)/min (width, height) is larger than 2, only 24 quantized angle and 4 quantized distance are allowed. This may further be combined with the restriction shown in FIG. 23.

The look-up table for angle indices and distance indices may be changed.

In one embodiment, the partition mode index is used distance index first order instead of angle index first order, as shown in Table 24 of FIG. 24.

In another embodiment, the partition mode index order is related to the occurrence of partitioning method. The higher occurrence partitioning method is put in the front of the look-up table. An example is shown in Table 25 of FIG. 25. The angle index 0, 4, 8, and 12 with distance 0 have higher probability to be used in partitioning a block.

As mentioned before, the triangle partition mode can be applied to a block whose size is larger than or equal to 64 luma samples. However, the geometric partition mode can be applied to a block whose width and height are both larger than or equal to 8 and the ratio of max(width, height)/min (width, height) is smaller than or equal to 4. It can unify the restrictions on block size and block shape of triangle partition and geometric partition modes.

In one embodiment, both the triangle partition mode and the geometric partition mode can be applied to a block whose width and height are both larger than or equal to 8 and the ratio of max(width, height)/min(width, height) is smaller than or equal to 4.

In another embodiment, both the triangle partition mode and the geometric partition mode can be applied to a block whose size is larger than or equal to 64 luma samples.

In yet another embodiment, both the triangle partition mode and the geometric partition mode can be applied to a block whose size is larger than or equal to 64 luma samples and the ratio of max(width, height)/min(width, height) is smaller than or equal to 4.

Embodiments of the disclosure also provide a method for unifying the weight calculation process of triangle partition and geometric partition modes.

In one embodiment, the weight calculation process for luma samples of triangle partition is replaced with the process used in geometric partition mode (described in the above blending processing) with the following two modification:
1. The value in Dis[ ] is replaced with the value in Table 26 of FIG. 26.
2. wIdx=log 2(CuW)−2 and hIdx=log 2(CuH)−2.

In addition, for a block coded in the triangle partition mode, if the block is split from the top-left corner to the bottom-right corner, the angleIdx and distanceIdx are set to 4 and 0, respectively. Otherwise (e.g., the block is split from the top-right corner to the bottom-left corner), the angleIdx and distanceIdx are set to 12 and 0, respectively.

In another embodiment, for both the triangle partition mode and the geometric partition mode, the weight for chroma sample is subsampled from the top-left luma sample's weights of each 2×2 luma subblock.

In yet another embodiment, for both the triangle partition mode and the geometric partition mode, the weight for a chroma sample is calculated using the same process as that used for a luma sample coded in the geometric partition mode.

In this disclosure, it can also unify the process of motion field storage used in the triangle partition mode and the geometric partition mode.

In one embodiment, the motion field storage for the triangle partition mode is replaced with that for the geometric partition mode. That is, the weights of 4 luma samples located at 4 corners of a 4×4 subblock are summed up. If the sum is smaller than a threshold2 and greater than a threshold1, bi-prediction motion vectors can be stored for this 4×4 subblock. Otherwise, a uni-prediction motion vector is stored. The threshold1 and threshold2 are set to 32>>(((log 2(CuW)+log 2(CuH))>>1)−1) and 32−threshold1, respectively.

In another embodiment, for a block coded using either the triangle partition mode or the geometric partition mode, the weight of each luma sample is checked. If the weight of a luma sample is not equal to 0 or 8, the luma sample is viewed as a weighted sample. If all the luma samples in a 4×4 subblock are weighted, the bi-prediction motion is stored for the 4×4 subblock. Otherwise, the uni-prediction motion is stored.

To harmonize the interaction between SBT and geometric partition mode with the interaction between SBT and triangle partition mode, it can disable SBT for geometric partition mode in this disclosure. The combination of SBT and geometric partition mode may create two intersection boundaries within a block, which may cause subjective quality problem.

In one embodiment, the cu_sbt_flag is not signaled when the geometric partition is used, as shown in Table 27 of FIG. 27. The related syntax is italicized and highlighted in grey in FIG. 27.

In another embodiment, part of the SBT partition mode is disabled depending on the GEO partition mode. When an SBT partitioning edge is intersected with the GEO partitioning edge, this SBT partition mode is not allowed. Otherwise, the SBT partition mode is allowed. FIG. 28 shows an example of the SBT partition mode and the GEO partition mode. Further, the angle and distance indices may be used to determine whether there is an intersection between the GEO partitioning edge and the SBT partitioning edge. In one example, when an angle index of a current block is 0 (i.e., vertical partitioning edge), the horizontal SBT partitioning cannot be applied to the current block. Moreover, the SBT syntax may be modified as Table 29 of FIG. 29, with changes emphasized in italic and grey.

The geometric partition mode splits a block into two geometric shape partitions, and each geometric partition performs motion compensation with its own motion vector. The geometric partition mode improves the prediction accuracy of inter prediction. However, it may be complicated in the following aspects.

In a first aspect, the total number of geometric partitioning submodes is huge. Therefore, it is impossible to store all the masks for blending weights and motion field storage in real implementation. The total number of bits needed to store the masks in the case of 140 submodes is:

For blending weights: (8×8+8×16+8×32+8×64+16×8+16×16+16×32+16×64+32×8+32×16+32×32+32×64+64×8+64×16+64× 32+64×64+64× 128+128×64+128× 128)×140×4=26,414,080 bits=3,301,760 bytes=3.3 Mbytes For motion field storage: (2×2+2×4+2×8+2×16+4×2+4×4+4×8+4×16+8×2+8×4+8×8+8×16+16×2+16×4+16×8+16×16+16×32+32×16+32×32)×140×2=825,440 bits=103,180 bytes=103 Kbytes

|  | 140 partitioning submodes | 108 partitioning submodes | 80 partitioning submodes | 64 partitioning submodes |
|---|---|---|---|---|
| blending weights | 3,301,760 bytes | 2,547,072 bytes | 1,886,720 bytes | 1,509,376 bytes |
| motion storage | 103,180 bytes | 79,596 bytes | 58,960 bytes | 47,168 bytes |
| Overall | 3,404,940 bytes | 2,626,668 bytes | 1,945,680 bytes | 1,556,544 bytes |

In a second aspect, if instead of storing them, the masks are calculated on the fly, then computational complexity is increased. The equations for calculating the mask for blending weights and motion field storage are complicated. More specifically, the number of multiplication (×), shift (<<), addition (+) and comparison operations are huge. Assuming that a block of size W×H, the numbers of each operation per block are:

Multiplication: 5+2×W×H+2×(W×H/16);
Shift: 4+3×W×H+2×(W×H/16);
Addition: 8+6×W×H+5×(W×H/16);
Comparison: 4+2×W×H+2×(W×H/16).

Details are listed in the following table.

| Equations | × | << | + | comparison |
|---|---|---|---|---|
| Per block | 5 | 4 | 8 | 4 |
| displacementX = angleIdx | 0 | 0 | 0 | 0 |
| displacementY = (displancementX + NumAngles >> 2)% NumAngles | 1 | 1 | 1 | 0 |
| rho = distanceIdx × (stepSize << scaleStep) + Dis[displacementX] << wIdx + Dis[displacementY] << hIdx | 1 | 3 | 2 | 0 |
| stepSize = stepDis + 77 | 0 | 0 | 1 | 0 |
| scaleStep = (wIdx ≥ hIdx) ? hIdx − 3:wIdx − 3 | 0 | 0 | 2 | 1 |

-continued

| Equations | × | << | + | comparison |
|---|---|---|---|---|
| wIdx = log2(CuW) | 0 | 0 | 0 | 0 |
| hIdx = log2(CuH) | 0 | 0 | 0 | 0 |
| whRatio = (wIdx ≥ hIdx) ? (wIdx − hIdx):(hIdx − wIdx) | 0 | 0 | 1 | 1 |
| $angleN = \begin{cases} angleIdx \% 8 & wIdx \geq hIdx \text{ and } (angleIdx \gg 3)\%1 = 1 \\ 8 - (angleIdx \% 8) & wIdx \geq hIdx \text{ and } (angleIdx \gg 3)\%1 = 0 \\ 8 - (angleIdx \% 8) & wIdx < hIdx \text{ and } (angleIdx \gg 3)\%1 = 1 \\ angleIdx \% 8 & wIdx < hIdx \text{ and } (angleIdx \gg 3)\%1 = 0 \end{cases}$ | 1 | 0 | 1 | 2 |
| $rho_{subblk}$ = 3 × Dis[displacementX] + 3 × Dis[displacementY] | 2 | 0 | 0 | 0 |
| Per luma sample | 2 | 3 | 6 | 2 |
| distFromLine = ((x << 1) + 1) × Dis[displacementX] + ((y << 1) + 1) × Dis[displacementY] − rho | 2 | 2 | 4 | 0 |
| distScaled = Min((abs(distFromLine) + 4) >> 3.26) | 0 | 1 | 1 | 1 |
| $sampleWeight_L[x][y]$ = distFromLine ≤ 0 ? GeoFilter[distScaled]:8 − GeoFilter[distScaled] | 0 | 0 | 1 | 1 |
| Per 4 × 4 subblock | 2 | 2 | 5 | 2 |
| $distFromLine_{subblk}$ = $((x_{subblk} << 3) + 1)$ × Dis[displacementX] + $((y_{subblk} << 3) + 1)$ × Dis[displacementY] − rho + $rho_{subblk}$ | 2 | 2 | 5 | 0 |
| $motionMask[x_{subblk}][y_{subblk}]$ = abs($distFromLine_{subblk}$) < 256 ? 2: ($distFromLine_{subblk}$ ≤ 0 ? 0:1) | 0 | 0 | 0 | 2 |

Moreover, memory is still needed to store four pre-calculated tables, which are Dis[ ], GeoFilter[ ], stepDis[ ], and a look-up table for angleIdx and distanceIdx. The sizes of each table are listed as follows.

| Table | Size |
|---|---|
| Dis[ ] | 32 × 8 = 256 bits |
| GeoFilter[ ] | 27 × 4 = 108 bits |
| stepDis[ ] | 45 × 11 = 495 bits |
| Look-up table for angleIdx and distanceIdx | 140 modes: 140 × (5 + 3) = 1120 bits |
| | 108 modes: 108 × (5 + 2) = 756 bits |
| | 80 modes: 80 × (5 + 2) = 560 bits |
| | 64 modes: 64 × (5 + 2) = 448 bits |

In a third aspect, in current geometric partition mode design, the combinations of 45°/135° and distanceIdx[ ] are always disallowed since they assume that triangle partition mode in VVC supports these partitioning options. However, for the non-square blocks, the partition angle in triangle partition mode is not 45° or 135°, as shown in the following table. Thus, it is meaningless to exclude these two partitioning angles for the non-square blocks.

| width:height ratio | 1:1 | 1:2 | 1:4 | 1:8 | 1:16 |
|---|---|---|---|---|---|
| Triangle angle 1 | 135° | 116.5° | 104° | 97.1° | 93.6° |
| Triangle angle 2 | 45° | 63.5° | 76° | 82.9° | 86.4° |

| width:height ratio | 2:1 | 4:1 | 8:1 | 16:1 |
|---|---|---|---|---|
| Triangle angle 1 | | 153.4° | 166° | 172.9° | 176.4° |
| Triangle angle 2 | | 26.6° | 14° | 7.1° | 3.6° |

In a fourth aspect, since some combinations of angle and distance are not supported in geometric partition mode, such as horizontal split with distanceIdx 0 or vertical split with distanceIdx 0 (this is to avoid the redundancy with binary tree partitions), a look-up table is used to derive the angle and distance for each geometric partitioning submode. The look-up table may not be necessary if the restrictions of combination of angle and distance are removed.

In a fifth aspect, the blending process, motion field storage, and the syntax structure used in triangle partition mode and geometric partition mode are not unified, which means that two kinds of logic are required for these two modes in both software and hardware implementation. Besides, the total number of bits needed to store the masks for triangle mode is:

For blending weights: (4×16+4×32+4×64+8×8+8×16+8×32+8×64+16×4+16×8+16×16+16×32+16×64+32×4+32×8+32×16+32×32+32×64+64×4+64×8+64×16+64×32+64×64+64×128+128×64+128×128)×2×4=384,512 bits=48,064 bytes=48 Kbytes For motion field storage: (1×4+1×8+1×16+2×2+2×4+2×8+2×16+4×1+4×2+4×4+4×8+4×16+8×1+8×2+8×4+8×8+8×16+16×1+16×2+16×4+16×8+16×16+16×32+32×16+32×32)×2×2=12,016 bits=1,502 bytes=1.5 Kbytes

| | |
|---|---|
| 140 geometric partitioning submodes + triangle mode | 3,454,506 bytes |
| 108 geometric partitioning submodes + triangle mode | 2,676,234 bytes |
| 80 geometric partitioning submodes + triangle mode | 1,995,246 bytes |
| 64 geometric partitioning submodes + triangle mode | 1,606,110 bytes |

To solve aforementioned problems, several solutions are proposed.

A first solution is directed to simplification of the geometric partition mode.

To avoid calculating the masks for blending weights and motion field storage on the fly, it is proposed to derive the masks for each block from several pre-calculated masks whose size is 256×256 or 64×64. The proposed methods can reduce the memory for storing the masks.

In a proposed cropped method, a first and a second set of masks are pre-defined. The first set of masks, g_sampleWeight$_L$[ ], may contain several masks, each of the masks has a size of 256×256, and the masks are used to derive blending weights for each block. The second set of masks, g_motionMask[ ], may contain several masks, each of the masks has a size of 64×64, and the masks are used to derive the mask for motion field storage for each block. The number of masks in the first and the second sets depends on the number of geometric partitioning submodes. For blocks of different sizes, their masks are cropped from one of mask in the first and the second set.

In one embodiment, the pre-defined masks in the first and the second set may be calculated using the equations described with reference to FIGS. 14 and 15A-15F and with respect to the motion field storage. The number of masks in the first and the second sets are both N, where N is set to the number of angles supported in geometric partition mode. The $n^{th}$ masks with index n in the first and the second set represent the mask of angle n, where n is in the range from 0 to N−1.

In one example, the variable N is set to 16 when the number of geometric partitioning submodes is set to 140, that is, 16 angles plus 9 distances. In another example, the variable N is set to 16 when the number of geometric partitioning submodes is set to 108, that is, 16 angles plus 7 distances. In other example, the variable N is set to 12 and 10 when the number of geometric partitioning submodes is set to 80 (12 angles plus 7 distances) and 64 (10 angles plus 7 distances), respectively.

For a block whose size is W×H with geometric partitioning index set to K, the mask for blending weights of luma samples are derived as follows.

Variables angleIdx A and distanceIdx D are obtained from a look-up table using the geometric partitioning index K. Examples of the look-up table are shown in Table 15C of FIG. 15C, Table 15D of FIG. 15D, Table 22B of FIG. 22B, Table 30 of FIG. 30, and Table 31 of FIG. 31.

Variables offsetX and offsetY are calculated as follows.

$offsetX =$
$$\begin{cases} (256-W) \gg 1 & \text{horizontal split or (not vertical split and } H \geq W) \\ ((256-W) \gg 1) + A < N \text{ ? } (D \times W) \gg 3:-((D \times W) \gg 3) & \text{otherwise} \end{cases}$$

$offsetY =$
$$\begin{cases} ((256-H) \gg 1) + A < N \text{ ? } (D \times H) \gg 3:-((D \times H) \gg 3) & \text{horizontal split or (not vertical split and } H \geq W) \\ (256-H) \gg 1 & \text{otherwise} \end{cases}$$

$sampleWeight_L[x][y] = g\_sampleWeight_L[A \% N][x+offsetX][y+offsetY]$

The blending weights for chroma samples are subsampled from the weights of luma samples. That is, the weight of top-left luma sample for each corresponding 2×2 luma subblock is used as the weight of chroma sample for YUV 4:2:0 video format.

Moreover, the mask for motion field storage is derived as follows.

Variables offsetXmotion and offsetYmotion are calculated as follows:

$offsetXmotion = \begin{cases} (64-(W \gg 2)) \gg 1 & \text{horizontal split or (not vertical split and } H \geq W) \\ ((64-(W \gg 2)) \gg 1) + A < N \text{ ? } (D \times W) \gg 5:-((D \times W) \gg 5) & \text{otherwise} \end{cases}$ $offsetYmotion = \begin{cases} ((64-(H \gg 2)) \gg 1) + A < N \text{ ? } (D \times H) \gg 5:-((D \times H) \gg 5) & \text{horizontal split or (not vertical split and } H \geq W) \\ (64-(H \gg 2)) \gg 1 & \text{otherwise} \end{cases}$ $motionMask[x_{subblk}][y_{subblk}] = g\_motionMask[A \% N][x_{subblk}+offsetXmotion][y_{subblk}+offsetYmotion]$ The number of bits needed to store the pre-defined masks are listed as follows:

For blending weights:(256×256)×16×4=4,193,304 bits=524,288 bytes=524 Kbytes

For motion field storage:(64×64)×16×2=131,072 bits=16,384 bytes=16 Kbytes

|  | 140 partitioning submodes | 108 partitioning submodes | 80 partitioning submodes | 64 partitioning submodes |
|---|---|---|---|---|
| blending weights | 524,288 bytes | 524,288 bytes | 393,216 bytes | 327,680 bytes |
| motion storage | 16,384 bytes | 16,384 bytes | 12,288 bytes | 10,240 bytes |
| Overall % of reduction compared to original geometric design | 540,672 bytes 84.1% | 540,672 bytes 79.4% | 405,504 bytes 79.2% | 337,920 bytes 78.3% |

Moreover, the mask can be calculated on the fly using the following simplified equations:

$distFromLine = (((x + offsetX) \ll 1) + 1) \times Dis[displacementX] +$
$(((y + offsetY) \ll 1) + 1) \times Dis[displacementY] - Rho[displacementX]$
$distScaled = \text{Min}((\text{abs}(distFromLine) + 4) \gg 3.26)$ $sampleWeight_L[x][y] =$
$distFromLine \leq 0 \text{ ? } GeoFilter[distScaled]:8 - GeoFilter[distScaled]$ where (x, y) represents the position of each luma sample, Dis[ ] and GeoFilter[ ] are two look-up tables as shown in Table 12 and Table 13, respectively. Rho[ ] is a look-up table shown in Table 32 of FIG. 32.

The parameters displacementX and displacementY are calculated as follows:

$$displacementX = angleIdx \% 16$$

$$displacementY = (displacementX + NumAngles \gg 2) \% NumAngles$$

where NumAngles is set to 32. The angleIdx is derived from Table 15C, Table 15D, Table 15E, and Table 15F, when the total number of geometric partitioning sub-modes is set to 140, 108, 80 and 64, respectively. The angleIdx can also be derived from the look-up table are shown in Table 22B, Table 30, and Table 31.

$$distFromLine_{subblk} =$$
$$(((x_{subblk} + offsetXmotion) \ll 3) + 1) \times Dis[displacementX] +$$
$$(((y_{subblk} + offsetYmotion) \ll 3) + 1) \times Dis[displacementY] -$$
$$Rho_{subblk}[displacementX]$$

$$motioMask[x_{subblk}][y_{subblk}] =$$
$$abs(distFromLine_{subblk}) < 256 \; ? \; 2:(distFromLine_{subblk} \leq 0 \; ? \; 0:1)$$

$$offsetX = \begin{cases} (-W) \gg 1 & \text{horizontal split or (not vertical split and } H \geq W) \\ ((-W) \gg 1) + A < N \; ? \; (D \times W) \gg 3 : -((D \times W) \gg 3) & \text{otherwise} \end{cases}$$

$$offsetY = \begin{cases} ((-H) \gg 1) + A < N \; ? \; (D \times H) \gg 3 : -((D \times H) \gg 3) & \text{horizontal split or (not vertical split and } H \geq W) \\ (-H) \gg 1 & \text{otherwise} \end{cases}$$

Assuming that a block of size W×H, the numbers of each operation per block are:
Multiplication: 4+2×W×H+2×(W×H/16);
Shift: 9+3×W×H+2×(W×H/16);
Addition: 7+8×W×H+6×(W×H/16);
Comparison: 6+2×W×H+2×(W×H/16).

Details on numbers of each operation per block are listed in Table 33 of FIG. 33.

The memory are needed to store five pre-calculated tables, which are Dis[ ], GeoFilter[ ], Rho[ ], Rho$_{subblk}$[ ] and the look-up tables for angleIdx and distanceIdx. The look-up table for Rho$_{subblk}$[ ] is illustrated in FIG. 34. The sizes of each table are listed as follows.

| Table | Size |
| --- | --- |
| Dis[ ] | 32 × 8 = 256 bits |
| GeoFilter[ ] | 27 × 4 = 108 bits |
| Rho[ ] | 16 × 16 = 256 bits |
| Rho$_{subblk}$[ ] | 16 × 16 = 256 bits |
| Look-up table for | 140 modes: 140 × (5 + 3) = 1120 bits |
| angleIdx and distanceIdx | 108 modes: 108 × (5 + 2) = 756 bits |
| | 80 modes: 80 × (5 + 2) = 560 bits |
| | 64 modes: 64 × (5 + 2) = 448 bits |

The computational complexity of the proposed method is similar to that of the original geometric design. More specifically, comparing to the original geometric design.

The number of multiplication operation is increased by 1 for a W×H block

The number of shift operation is increased by 5 for a W×H block

The number of comparison operation is increased by 2 for a W×H block

The number of addition operation is increased by 2×W×H+(W×H/16)−1 for a W×H block The memory usage is increased by 17 bits The equations used to calculate the mask can be further simplified as follows:

Variables angleIdx A and distanceIdx D are obtained from a look-up table using the geometric partitioning index K. Examples of the look-up table are shown in Table 15C, Table 15D, Table 22B, Table 30, and Table 31.

Variable N (the number of masks in the first and the second sets) is set to 16 when the angleIdx and distanceIdx are derived using the Table 15C, Table 15D and Table 22B. On the other hands, variable N is set to 12 and 10 when the angleIdx and distanceIdx are derived using the Table 30 and Table 31, respectively Variables offsetX and offsetY are calculated as follows:

Variables displacementX and displacementY are calculated as follows:

displacementX=angleIdx displacementY=(displancementX+NumAngles>>2)% NumAngles where NumAngles is set to 32.

The weight for a luma sample located at position (x, y) is calculated as follow:

$$weightIdx = (((x + offsetX) \ll 1) + 1 * disLut[displacementX] +$$
$$(((y + offsetY) \ll 1) + 1)) * disLut[displacementY]$$

$$partFlip = (angleIdx \geq 13 \;\&\&\; angleIdx \leq 27) \; ? \; 0:1$$

$$weightIdxL = partFlip \; ? \; 32 + weightIdx:32 - weightIdx$$

$$sampleWeight_L[x][y] = Clip3(0, 8, (weightIdxL + 4) \gg 3),$$

where disLut[ ] is a look-up table shown in the following:

| angleIdx | 0 | 2 | 3 | 4 | 5 | 6 | 8 | 10 | 11 | 12 | 13 | 14 |
| --- | --- | --- | --- | --- | --- | --- | --- | --- | --- | --- | --- | --- |
| disLut[idx] | 8 | 8 | 8 | 4 | 4 | 2 | 0 | −2 | −4 | −4 | −8 | −8 |

-continued

| angleIdx | 16 | 18 | 19 | 20 | 21 | 22 | 24 | 26 | 27 | 28 | 29 | 30 |
|---|---|---|---|---|---|---|---|---|---|---|---|---|
| disLut[idx] | −8 | −8 | −8 | −4 | −4 | −2 | 0 | 2 | 4 | 4 | 8 | 8 |

In another embodiment, the pre-defined masks in the first and the second set may be calculated using the equations described in with reference to FIGS. 14 and 15A-15F and with respect to the motion field storage. The number of masks in the first and the second set are both $N_{reduced}$, where $N_{reduced}=(N>>1)+1$ and N is the number of angles supported in geometric partition mode. In one example, the variable $N_{reduced}$ is set to 9 when the number of geometric partitioning submodes is set to 140. That is, 16 angles plus 9 distances. In another example, the variable $N_{reduced}$ is set to 9, 7, and 6, when the number of geometric partitioning submodes is set to 108 (16 angles plus 7 distances), 80 (12 angles plus 7 distances), and 64 (10 angles plus 7 distances), respectively.

For the angle between 0 and $N_{reduced}-1$, their masks are directly cropped from the masks in the first and the second set. On the other hands, the masks for the angle between $N_{reduced}$ and N−1 are cropped from the masks in the first and the second set and flipped in horizontal direction. FIG. 35A shows examples for the masks of angle 135°, and FIG. 35B shows examples for the masks of angle 45°, consistent with the present embodiment.

For a block whose size is W×H with geometric partitioning index set to K, the mask for blending weights of luma samples are derived as follows.

Variables angleIdx A and distanceIdx D are obtained from a look-up table using the geometric partitioning index K. Examples of the look-up table are shown in Table 15C, Table 15D, Table 22B, Table 30, and Table 31.

Variables offsetX and offsetY can be calculated as follows.

$$offsetX = \begin{cases} (256-W) \gg 1 & \text{horizontal split or (not vertical split and } H \geq W) \\ ((256-W) \gg 1) + A < N \text{ ? } (D \times W) \gg 3 :- ((D \times W) \gg 3) & \text{otherwise} \end{cases}$$

$$offsetY = \begin{cases} ((256-H) \gg 1) + A < N \text{ ? } (D \times H) \gg 3 :- ((D \times H) \gg 3) & \text{horizontal split or (not vertical split and } H \geq W) \\ (256-H) \gg 1 & \text{otherwise} \end{cases}$$

$$sampleWeight_L[x][y] = \begin{cases} g\_sampleWeight_L[A \% N][x + offsetX][y + offsetY] & A \% N < N_{reduced} \\ g\_sampleWeight_L[N - A \% N][W - 1 - x + offsetX][y + offsetY] & \text{otherwise} \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

Variables offsetXmotion and offsetYmotion are calculated as follows:

$$offsetXmotion = \begin{cases} (64 - (W \gg 2)) \gg 1 & \text{horizontal split or (not vertical split and } H \geq W) \\ ((64 - (W \gg 2)) \gg 1) + A < N \text{ ? } (D \times W) \gg 5 :- ((D \times W) \gg 5) & \text{otherwise} \end{cases}$$

$$offsetYmotion = \begin{cases} ((64 - (H \gg 2)) \gg 1) + A < N \text{ ? } (D \times W) \gg 5 :- ((D \times H) \gg 5) & \text{horizontal split or (not vertical split and } H \geq W) \\ (64 - (H \gg 2)) \gg 1 & \text{otherwise} \end{cases}$$

$$motionMask[x_{subblk}][y_{subblk}] =$$

$$\begin{cases} g\_motionMask[A \% N][x_{subblk} + offsetXmotion][y_{subblk} + offsetYmotion] & A \% N < N_{reduced} \\ g\_motionMask[N - A \% N][(W \gg 2) - 1 - x_{subblk} + offsetXmotion][y_{subblk} + offsetYmotion] & \text{otherwise} \end{cases}$$

The number of bits needed to store the pre-defined masks are listed as follows:
For blending weights:(256×256)×9×4=2,359,296 bits=294,912 bytes=295 Kbytes
For motion field storage:(64×64)×9×2=131,072 bits=16, 384 bytes=16 Kbytes

|  | 140 partitioning submodes | 108 partitioning submodes | 80 partitioning submodes | 64 partitioning submodes |
| --- | --- | --- | --- | --- |
| blending weights | 294,912 bytes | 294,912 bytes | 229,376 bytes | 196,608 bytes |
| motion storage | 9,216 bytes | 9,216 bytes | 7,168 bytes | 6,144 bytes |
| Overall % of reduction compared to original geometric design | 304,128 bytes 91.1% | 304,128 bytes 88.4% | 236,544 bytes 87.8% | 202,752 bytes 87.0% |

In a third embodiment, the pre-defined masks in the first and the second set may be calculated using the equations described above. The number of masks in the first and the second set are both $N_{reduced}$, where $N_{reduced}=(N>>1)+1$ and N is the number of angles supported in geometric partition mode. For the angle between 0 and $N_{reduced}-1$, their masks are directly cropped from the masks in the first and the second set. On the other hands, the masks for the angle between $N_{reduced}$ and $N-1$ are cropped from the masks in the first and the second set and flipped in vertical direction. FIG. 36 shows examples for the masks of angle 135°, and FIG. 36B shows examples for the masks of angle 45°, consistent with the present embodiment.

For a block whose size is W×H with geometric partitioning index set to K, the mask for blending weights of luma samples are derived as follows:

Variables angleIdx A and distanceIdx D are obtained from a look-up table using the geometric partitioning index K. Examples of the look-up table are shown in Table 15C, Table 15D, Table 22B, Table 30, and Table 31.

Variables offsetX and offsetY can be calculated as follows:

$$offsetX = \begin{cases} (256-W) \gg 1 & \text{horizontal split or (not vertical split and } H \geq W) \\ ((256-W) \gg 1) + A < N \text{ ? } (D \times W) \gg 3 :- ((D \times W) \gg 3) & \text{otherwise} \end{cases}$$

$$offsetY = \begin{cases} ((256-H) \gg 1) + A < N \text{ ? } (D \times H) \gg 3 :- ((D \times H) \gg 3) & \text{horizontal split or (not vertical split and } H \geq W) \\ (256-H) \gg 1 & \text{otherwise} \end{cases}$$

$$sampleWeight_L[x][y] = \begin{cases} g\_sampleWeight_L[A \% N][x+offsetX][y+offsetY] & A \% N < N_{reduced} \\ g\_sampleWeight_L[N-A \% N][x+offsetX][H-1-y+offsetY] & \text{otherwise} \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

Variables offsetXmotion and offsetYmotion can be calculated as follows:

$$offsetXmotion = \begin{cases} (64-(W \gg 2)) \gg 1 & \text{horizontal split or (not vertical split and } H \geq W) \\ ((64-(W \gg 2)) \gg 1) + A < N \text{ ? } (D \times W) \gg 5 :- ((D \times W) \gg 5) & \text{otherwise} \end{cases}$$

$$offsetYmotion = \begin{cases} ((64-(H \gg 2)) \gg 1) + A < N \text{ ? } (D \times W) \gg 5 :- ((D \times H) \gg 5) & \text{horizontal split or (not vertical split and } H \geq W) \\ (64-(H \gg 2)) \gg 1 & \text{otherwise} \end{cases}$$

$$motionMask[x_{subblk}][y_{subblk}] = \begin{cases} g\_motionMask[A \% N][x_{subblk}+offsetXmotion][y_{subblk}+offsetYmotion] & A \% N < N_{reduced} \\ g\_motionMask[N-A \% N][x_{subblk}+offsetXmotion][(H \gg 2)-1-y_{subblk}+offsetYmotion] & \text{otherwise} \end{cases}$$

The number of bits needed to store the pre-defined masks are listed as follows:
For blending weights:(256×256)×9×4=2,359,296 bits=294,912 bytes=295 Kbytes
For motion field storage:(64×64)×9×2=131,072 bits=16,384 bytes=16 Kbytes

|  | 140 partitioning submodes | 108 partitioning submodes | 80 partitioning submodes | 64 partitioning submodes |
| --- | --- | --- | --- | --- |
| blending weights | 294,912 bytes | 294,912 bytes | 229,376 bytes | 196,608 bytes |
| motion storage | 9,216 bytes | 9,216 bytes | 7,168 bytes | 6,144 bytes |
| Overall % of reduction compared to original geometric design | 304,128 bytes 91.1% | 304,128 bytes 88.4% | 236,544 bytes 87.8% | 202,752 bytes 87.0% |

It is noted that in the aforementioned embodiments, the methods for offset derivation and chroma weights derivation may be modified.

Different methods for the offset derivation are presented as below. As compared to the embodiments above, the differences are highlighted in italic and bold.

The equations for offset derivation may be modified to guarantee that the offset is not equal to 0 when distanceIdx is not 0. In one example, the variables offsetX and offsetY are calculated as follow.

$$offsetX = \begin{cases} (256 - W) \gg 1 & \text{horizontal split or (not vertical split and } H \geq W) \\ ((256 - W) \gg 1) + A < N \text{ ? } \boldsymbol{D \times \max(1, W \gg 3)} :- (\boldsymbol{D \times \max(1, W \gg 3)}) & \text{otherwise} \end{cases}$$

$$offsetY = \begin{cases} ((256 - H) \gg 1) + A < N \text{ ? } \boldsymbol{D \times \max(1, H \gg 3)} :- (\boldsymbol{D \times \max(1, H \gg 3)}) & \text{horizontal split or (not vertical split and } H \geq W) \\ (256 - H) \gg 1 & \text{otherwise} \end{cases}$$

The offset derivation may be based on the number of distances supported in geometric partition mode. In one example, when 7 distances are supported, the variables offsetX and offsetY are calculated as follow (which is the same as the method presented in the first embodiment).

$$offsetX = \begin{cases} (256 - W) \gg 1 & \text{horizontal split or (not vertical split and } H \geq W) \\ ((256 - W) \gg 1) + A < N \text{ ? } (D \times W) \gg 3 :- ((D \times W) \gg 3) & \text{otherwise} \end{cases}$$

$$offsetY = \begin{cases} ((256 - H) \gg 1) + A < N \text{ ? } (D \times H) \gg 3 :- ((D \times H) \gg 3) & \text{horizontal split or (not vertical split and } H \geq W) \\ (256 - H) \gg 1 & \text{otherwise} \end{cases}$$

In another example, when 9 distances are supported, the variables offsetX and offsetY are calculated as follow:

$$offsetX = \begin{cases} (256 - W) \gg 1 & \text{horizontal split or (not vertical split and } H \geq W) \\ ((256 - W) \gg 1) + A < N \text{ ? } (D \times W) \gg \boldsymbol{4} :- ((D \times W) \gg \boldsymbol{4}) & \text{otherwise} \end{cases}$$

$$offsetY = \begin{cases} ((256 - H) \gg 1) + A < N \text{ ? } (D \times H) \gg \boldsymbol{4} :- ((D \times H) \gg \boldsymbol{4}) & \text{horizontal split or (not vertical split and } H \geq W) \\ (256 - H) \gg 1 & \text{otherwise} \end{cases}$$

The offset derivation may be based on the partitioning angle. In one example, for the angle from 135° to 225° and from 315° to 45°, the offsets are added in vertical direction. Otherwise, the offsets are added in horizontal direction for the angle from 45° to 135° and from 225° to 315°. The variables offsetX and offsetY are calculated as follow.

$$offsetX = \begin{cases} (256 - W) \gg 1 & \text{angle from } 135° \text{ to } 225° \text{ and from } 315° \text{ to } 45° \\ ((256 - W) \gg 1) + A < N ? (D \times W) \gg 3 :- ((D \times W) \gg 3) & \text{otherwise} \end{cases}$$

$$offsetY = \begin{cases} ((256 - H) \gg 1) + A < N ? (D \times H) \gg 3 :- ((D \times H) \gg 3) & \text{angle from } 135° \text{ to } 225° \text{ and from } 315° \text{ to } 45° \\ (256 - H) \gg 1 & \text{otherwise} \end{cases}$$

The weights for chroma samples may be directly derived from the first set of masks, g_sampleWeight$_L$[ ]. For a block whose size is W×H with geometric partitioning index set to K, the mask for blending weights of chroma samples are derived as follows.

The size of chroma block is W'×H'

Variables angleIdx A and distanceIdx D are obtained from a look-up table using the geometric partitioning index K. Examples of the look-up table are shown in Table 15C, Table 15D, Table 22B, Table 30, and Table 31.

Variables offsetXchroma and offsetYchroma are calculated as follows.

$$offsetXchroma = \begin{cases} (256 - W') \gg 1 & \text{horizontal split or (not vertical split and } H' \geq W') \\ ((256 - W') \gg 1) + A < N ? (D \times W') \gg 3 :- ((D \times W') \gg 3) & \text{otherwise} \end{cases}$$

$$offsetYchroma = \begin{cases} ((256 - H') \gg 1) + A < N ? (D \times H') \gg 3 :- ((D \times H') \gg 3) & \text{horizontal split or (not vertical split and } H' \geq W') \\ (256 - H') \gg 1 & \text{otherwise} \end{cases}$$

$$sampleWeight_C[x][y] = g\_sampleWeight_L[A \% N][x + offsetXchroma][y + offsetYchroma]$$

where (x, y) represents the position of each chroma sample.

The size of pre-defined masks in the first set may not be 256×256. The size may depend on the maximum block size and maximum shift offset. Assuming that the maximum block size is S, the number of supported distances is Nd, and the shift offset for each distance is defined as follows: offset=(D×S)>>0. Then, the width and height of pre-defined masks can be calculated as follows.

$$S + ((((N_d - 1) \gg 1) \times S) \gg 0) \ll 1$$

In one example, the variables S, N$_d$, and O are set to 128, 9, and 4, respectively. The size of pre-defined masks is set to 192×192. In another example, the variables S, N$_d$, and O are set to 128, 7, and 3, respectively. The size of pre-defined masks is set to 224×224.

whose size is 256×256, and the masks are used to derive blending weights for each block. The second set of masks, g_motionMask[ ], may contain several masks whose size is 64×64, and the masks are used to derive the mask for motion field storage for each block. For square blocks, same as the cropped method, the masks are cropped from one of mask in the first and the second set. For non-square blocks, the masks are cropped from one of mask in the first and the second set, followed by an upsampling process.

In one embodiment, the pre-defined masks in the first set and the second set may be calculated using the equations described above. The number of masks in the first set and the second set are both N, where N is set to the number of angles supported in geometric partition mode. The n$^{th}$ masks with index n in the first and the second set represent the mask of angle n, where n ranges from 0 to N−1. For a block whose size is W×H with geometric partitioning index set to K, the mask for blending weights of luma samples are derived as follows.

Variables angleIdx A and distanceIdx D are obtained from a look-up table using the geometric partitioning index K. Examples of the look-up table are shown in Table 15C, Table 15D, Table 22B, Table 30, and Table 31.

A variable minSize is set to min(W, H)

Variables ratioWH and ratioHW is set to log 2(max(W/H, 1)) and log 2(max(H/W, 1)), respectively Variables offset X and offset Y can be calculated as follows:

$$offsetX = \begin{cases} (256 - minSize) \gg 1 & \text{horizontal split or (not vertical split and } H \geq W) \\ ((256 - minSize) \gg 1) + A < N ? (D \times minSize) \gg 3 :- ((D \times minSize) \gg 3) & \text{otherwise} \end{cases}$$

$$offsetY = \begin{cases} ((256 - minSize) \gg 1) + A < N ? (D \times minSize) \gg 3 :- ((D \times minSize) \gg 3) & \text{horizontal split or (not vertical split and } H \geq W) \\ (256 - minSize) \gg 1 & \text{otherwise} \end{cases}$$

$$sampleWeight_L[x][y] = g\_sampleWeight_L[A \% N][(x \gg ratioWH) + offsetX][(y \gg ratioHW) + offsetY]$$

In some embodiments, same as the cropped method, a first and a second set of masks are pre-defined. The first set of masks, g_sampleWeight$_L$[ ], may contain several masks The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

A variable minSubblk is set to min(W, H)>>2

Variables offsetXmotion and offsetYmotion can be calculated as follows:

$$offsetXmotion = \begin{cases} (64 - (minSubblk \gg 2)) \gg 1 & \text{horizontal split or (not vertical split and } H \geq W) \\ ((64 - (minSubblk \gg 2)) \gg 1) + A < N \text{ ? } (D \times minSubblk) \gg 5 :- ((D \times minSubblk) \gg 5) & \text{otherwise} \end{cases}$$

$$offsetYmotion = \begin{cases} ((64 - (minSubblk \gg 2)) \gg 1) + A < N \text{ ? } (D \times minSubblk) \gg 5 :- ((D \times minSubblk) \gg 5) & \text{horizontal split or (not vertical split and } H \geq W) \\ (64 - (minSubblk \gg 2)) \gg 1 & \text{otherwise} \end{cases}$$

$$motionMask[x_{subblk}][y_{subblk}] = g\_motionMask[A \% N][(x_{subblk} \gg ratioWH) + offsetXmotion][(y_{subblk} \gg ratioHW) + offsetYmotion]$$

In another embodiment, the pre-defined masks in the first set and the second set may be calculated using the equations described above. The number of masks in the first set and the second set are both $N_{reduced}$, where $N_{reduced}=(N\gg1)+1$ and N is the number of angles supported in geometric partition mode. For a block whose size is W×H with geometric partitioning index set to K, the mask for blending weights of luma samples are derived as follows.

Variables angleIdx A and distanceIdx D are obtained from a look-up table using the geometric partitioning index K. Examples of the look-up table are shown in Table 15C, Table 15D, Table 22B, Table 30, and Table 31.

A variable minSize is set to min(W, H)

Variables ratioWH and ratioHW is set to log 2(max(W/H, 1)) and log 2(max(H/W, 1)), respectively Variables offsetX and offsetY can be calculated as follows:

$$offsetX = \begin{cases} (256 - minSize) \gg 1 & \text{horizontal split or (not vertical split and } H \geq W) \\ ((256 - minSize) \gg 1) + A < N \text{ ? } (D \times minSize) \gg 3 :- ((D \times minSize) \gg 3) & \text{otherwise} \end{cases}$$

$$offsetY = \begin{cases} ((256 - minSize) \gg 1) + A < N \text{ ? } (D \times minSize) \gg 3 :- ((D \times minSize) \gg 3) & \text{horizontal split or (not vertical split and } H \geq W) \\ (256 - minSize) \gg 1 & \text{otherwise} \end{cases}$$

$$sampleWeight_L[x][y] = \begin{cases} g\_sampleWeight_L[A \% N][(x \gg ratioWH) + offset][(y \gg ratioHW) + offset] & A \% N < N_{reduced} \\ g\_sampleWeight_L[N - A \% N][minSize - 1 - (x \gg ratioWH) + offsetX][(y \gg ratioHW) + offsetY] & \text{otherwise} \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

A variable minSubblk is set to min(W, H)>>2

Variables offsetXmotion and offsetYmotion can be calculated as follows:

$$offsetXmotion = \begin{cases} (64 - (minSubblk \gg 2)) \gg 1 & \text{horizontal split or (not vertical split and } H \geq W) \\ ((64 - (minSubblk \gg 2)) \gg 1) + A < N \text{ ? } (D \times minSubblk) \gg 5 :- ((D \times minSubblk) \gg 5) & \text{otherwise} \end{cases}$$

$$offsetYmotion =$$
$$\begin{cases} ((64 - (minSubblk \gg 2)) \gg 1) + A < N \ ? \ (D \times minSubblk) \gg 5 :- ((D \times minSubblk) \gg 5) & \text{horizontal split or (not vertical split and } H \geq W) \\ (64 - (minSubblk \gg 2)) \gg 1 & \text{otherwise} \end{cases}$$

$$motionMask[x_{subblk}][y_{subblk}] =$$
$$\begin{cases} g\_motionMask[A \ \% \ N][(x_{subblk} \gg ratioWH) + offsetXmotion][(y_{subblk} \gg ratioHW) + offsetYmotion] & A \ \% \ N < N_{reduced} \\ g\_motionMask[N - A \ \% \ N][minSubblk - 1 - (x_{subblk} \gg ratioWH) + offsetXmotion][(y_{subblk} \gg ratioHW) + offsetYmotion] & \text{otherwise} \end{cases}$$

In a third embodiment, the pre-defined masks in the first set and the second set may be calculated using the equations described above. The number of masks in the first set and the second set are both $N_{reduced}$, where $N_{reduced}=(N\gg 1)+1$ and $N$ is the number of angles supported in geometric partition mode. For a block whose size is W×H with geometric partitioning index set to K, the mask for blending weights of luma samples are derived as follows.

Variables angleIdx A and distanceIdx D are obtained from a look-up table using the geometric partitioning index K. Examples of the look-up table are shown in Table 15C, Table 15D, Table 22B, Table 30, and Table 31.

A variable minSize is set to min(W, H)

Variables ratioWH and ratioHW is set to log 2(max(W/H, 1)) and log 2(max(H/W, 1)), respectively Variables offsetX and offsetY can be calculated as follows:

$$offsetX =$$
$$\begin{cases} (256 - minSize) \gg 1 & \text{horizontal split or (not vertical split and } H \geq W) \\ ((256 - minSize) \gg 1) + A < N \ ? \ (D \times minSize) \gg 3 :- ((D \times minSize) \gg 3) & \text{otherwise} \end{cases}$$

$$offsetY =$$
$$\begin{cases} ((256 - minSize) \gg 1) + A < N \ ? \ (D \times minSize) \gg 3 :- ((D \times minSize) \gg 3) & \text{horizontal split or (not vertical split and } H \geq W) \\ (256 - minSize) \gg 1 & \text{otherwise} \end{cases}$$

$$sampleWeight_L[x][y] =$$
$$\begin{cases} g\_sampleWeight_L[A \ \% \ N][(x \gg ratioWH) + offsetX][(y \gg ratioHW) + offsetY] & A \ \% \ N < N_{reduced} \\ g\_sampleWeight_L[N - A \ \% \ N][(x \gg ratioHW) + offsetX][minSize - 1 - (y \gg ratioWH) + offsetY] & \text{otherwise} \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

A variable minSubblk is set to min(W, H)>>2

Variables offsetXmotion and offsetYmotion can be calculated as follows:

$$offsetXmotion =$$
$$\begin{cases} (64 - (minSubblk \gg 2)) \gg 1 & \text{horizontal split or (not vertical split and } H \geq W) \\ ((64 - (minSubblk \gg 2)) \gg 1) + A < N \ ? \ (D \times minSubblk) \gg 5 :- ((D \times minSubblk) \gg 5) & \text{otherwise} \end{cases}$$

$$offsetYmotion =$$
$$\begin{cases} ((64 - (minSubblk \gg 2)) \gg 1 + A < N \ ? \ (D \times minSubblk) \gg 5 :- ((D \times minSubblk) \gg 5) & \text{horizontal split or (not vertical split and } H \geq W) \\ (64 - (minSubblk \gg 2)) \gg 1 & \text{otherwise} \end{cases}$$

$$motionMask[x_{subblk}][y_{subblk}] =$$
$$\begin{cases} g\_motionMask[A \ \% \ N][(x_{subblk} \gg ratioWH) + offsetXmotion][(y_{subblk} \gg ratioHW) + offsetYmotion] & A \ \% \ N < N_{reduced} \\ g\_motionMask[N - A \ \% \ N][(x_{subblk} \gg ratioWH) + offsetmotionX][minSubblkk - 1 - (y_{subblk} \gg ratioHW) + offsetmotionY] & \text{otherwise} \end{cases}$$

It is noted that different methods for offset and chroma weights derivation described above can also be applied herein.

In the original design for geometric partition mode, the combination of partitioning a block cross the block center with 135° or 45° are always excluded. The main purpose is to remove the redundant partition option with triangle partition mode from geometric partition mode. However, the partitioning angle is neither 135° nor 45° for non-square blocks coded using triangle partition mode. Therefore, two angles can be adaptively excluded based on block shape.

In some embodiments of the disclosure, the two angles that are excluded are changed based on block shape. For the square blocks, 135° and 45° are excluded, which is the same as original geometric partition design. For other block shape, the excluded angles are listed in Table 37 of FIG. 37. For example, for a block whose size is 8×16 (i.e. width to height ratio is 1 to 2), the angles 112.5° and 67.5° are excluded, that is, angleIdx 10 and angleIdx 6. Then, the look-up table for the geometric partitioning index is modified as Table 38 of FIG. 38. The parts of Table 38 related to the excluded angles are highlighted in grey in FIG. 38.

It is noted that this embodiment can be combined with other embodiments in this disclosure. For example, the masks of blending weights and motion field storage using the excluded angles can be calculated using the methods of triangle partition mode. For the other angles, the cropped methods are used to derive the masks.

As mentioned before, the blending process, motion field storage and syntax structure used in triangle partition and geometric modes are not unified. In this disclosure, it is proposed to unify all the processes.

In one embodiment, the proposed cropped method described above is used in the processes of blending and motion field storage for both triangle and geometric partition modes. Besides, the look-up table for angle and distance of each geometric partitioning submode is removed. A first and a second set of masks are pre-defined and may be calculated using the equations described above, respectively. The number of masks in the first and the second set are both $N_{reduced}$, where $N_{reduced}=(N>>1)+1$ and N is the number of angles supported in geometric partition mode. Let Np represents the number of distances supported in geometric partition mode. Thus, the total number of geometric partition submodes are $N \times N_D$. In one example, N and $N_D$ are set to 8 and 7, respectively. In another example, N and Np are set to 12 and 7, respectively. In other example, N and $N_D$ are set to an even number and an odd number, respectively.

For a block whose size is W×H with geometric partitioning index set to K, the mask for blending weights of luma samples are derived as follows.

A variable $N_{halfD}$ is set to $N_D>>1$.

Variables angleIdx A and distanceIdx D are set to K % N and K/N, respectively.

Variables offsetX and offsetY are calculated as follows:

$offsetX =$ $$\begin{cases} (256 - W) >> 1 & \text{horizontal split or (not} \\ & \text{vertical split and } H \geq W) \\ ((256 - W) >> 1) + D > & \text{otherwise} \\ N_{halfD} ? ((D - N_{halfD}) \times W) >> 3 : - \\ ((D \times W) >> 3) \end{cases}$$

$offsetY =$ $$\begin{cases} ((256 - H) >> 1) + D > & \text{horizontal split or (not} \\ N_{halfD} ? ((D - N_{halfD}) \times H) >> 3 : - & \text{vertical split and } H \geq W) \\ ((D \times H) >> 3) \\ (256 - H) >> 1 & \text{otherwise} \end{cases}$$

$$sampleWeight_L[x][y] = \begin{cases} g\_sampleWeight_L[A] & A < N_{reduced} \\ [x + offsetX][y + offsetY] \\ g\_sampleWeight_L[N - A] & \text{otherwise} \\ [W - 1 - x + offsetX] \\ [y + offsetY] \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

Variables offsetXmotion and offsetYmotion are calculated as follows:

$offsetXmotion =$ $$\begin{cases} (64 - (W >> 2)) >> 1 & \text{horizontal split or (not} \\ & \text{vertical split and } H \geq W) \\ ((64 - (W >> 2)) >> 1) + & \text{otherwise} \\ D > N_{halfD} ? ((D - N_{halfD}) \times W) >> 5 : - \\ ((D \times W) >> 5) \end{cases}$$

$offsetYmotion =$ $$\begin{cases} ((64 - (H >> 2)) >> 1) + & \text{horizontal split or (not} \\ D > N_{halfD} ? ((D - N_{halfD}) \times H) >> 5 : - & \text{vertical split and } H \geq W) \\ ((D \times H) >> 5) \\ (64 - (H >> 2)) >> 1 & \text{otherwise} \end{cases}$$

$$motionMask[x_{subblk}][y_{subblk}] = \begin{cases} g\_motionMask[A] & A < N_{reduced} \\ [x_{subblk} + offsetXmotion] \\ [y_{subblk} + offsetYmotion] \\ g\_motionMask[N - A] & \text{otherwise} \\ [((W >> 2) - 1 - \\ x_{subblk} + offsetXmotion] \\ [y_{subblk} + offsetYmotion] \end{cases}$$

The number of bits needed to store the pre-defined masks are $(256 \times 256) \times ((N>>1)+1) \times 4 + (63 \times 64) \times ((N>>1)+1) \times 2$.

|  | N = 16 | N = 12 | N = 8 |
| --- | --- | --- | --- |
| Memory of the proposed method | 304,128 bytes | 236,544 bytes | 168,960 bytes |
| % of reduction compared to 140 geometric partitioning submodes + triangle mode | 91.2% | 93.2% | 95.1% |
| % of reduction compared to 108 geometric partitioning submodes + triangle mode | 88.6% | 91.2% | 93.7% |
| % of reduction compared to 80 geometric partitioning submodes + triangle mode | 84.8% | 88.1% | 91.5% |
| % of reduction compared to 64 geometric partitioning submodes + triangle mode | 81.1% | 85.3% | 89.5% |

In another embodiment, the proposed cropped method described above is used in the processes of blending and motion field storage for both triangle and geometric partition modes. Besides, the look-up table for angle and distance of each geometric partitioning submode is removed. A first and a second set of masks are pre-defined and may be calculated using the equations described above, respectively. The number of masks in the first and the second set are both $N_{reduced}$, where $N_{reduced}=(N>>1)+1$ and N is the number of angles supported in geometric partition mode. Let Np represents the number of distances supported in geometric partition mode. Therefore, the total number of geometric partition submodes are $N \times N_D$.

For a block whose size is W×H with geometric partitioning index set to K, the mask for blending weights of luma samples are derived as follows:

A variable $N_{halfD}$ is set to $N_D>>1$.

Variables angleIdx A and distanceIdx D are set to K % N and K/N, respectively.

Variables offsetX and offsetY are calculated as follows:

$$offsetX = \begin{cases} (256 - W) >> 1 & \text{horizontal split or (not vertical split and } H \geq W) \\ ((256 - W) >> 1) + & \text{otherwise} \\ D > N_{halfD} \ ? \ ((D - N_{halfD}) \times W) >> 3 : - \\ ((D \times W) >> 3) \end{cases}$$

$$offsetY = \begin{cases} ((256 - H) >> 1) + & \text{horizontal split or (not} \\ D > N_{halfD} \ ? \ ((D - N_{halfD}) \times H) >> 3 : - & \text{vertical split and } H \geq W) \\ ((D \times H) >> 3) \\ (256 - H) >> 1 & \text{otherwise} \end{cases}$$

$$sampleWeight_L[x][y] = \begin{cases} g\_sampleWeight_L[A] & A < N_{reduced} \\ [x + offsetX][y + offsetY] \\ g\_sampleWeight_L[N - A] & \text{otherwise} \\ [x + offsetX] \\ [H - 1 - y + offsetY] \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows.

Variables offsetXmotion and offsetYmotion are calculated as follows:

$$offsetXmotion = \begin{cases} (64 - (W >> 2)) >> 1 & \text{horizontal split or (not vertical split and } H \geq W) \\ ((64 - (W >> 2)) >> 1) + & \text{otherwise} \\ D > N_{halfD} \ ? \ ((D - N_{halfD}) \times W) >> 5 : - \\ ((D \times W) >> 5) \end{cases}$$

$$offsetYmotion = \begin{cases} ((64 - (H >> 2)) >> 1) + & \text{horizontal split or (not} \\ D > N_{halfD} \ ? \ ((D - N_{halfD}) \times H) >> 5 : - & \text{vertical split and } H \geq W) \\ ((D \times H) >> 5) \\ (64 - (H >> 2)) >> 1 & \text{otherwise} \end{cases}$$

$$motionMask[x_{subblk}][y_{subblk}] = \begin{cases} g\_motionMask[A] & A < N_{reduced} \\ [x_{subblk} + offsetXmotion] \\ [y_{subblk} + offsetYmotion] \\ g\_motionMask[N - A] & \text{otherwise} \\ [x_{subblk} + offsetXmotion] \\ [(H >> 2) - 1 - \\ y_{subblk} + offsetYmotion] \end{cases}$$

In a third embodiment, the proposed upsampled method described above is used in the processes of blending and motion field storage for both triangle and geometric partition modes. Besides, the look-up table for angle and distance of each geometric partitioning submode is removed. A first and a second set of masks are pre-defined and may be calculated using the equations described above, respectively. The number of masks in the first and the second set are both $N_{reduced}$, where $N_{reduced}=(N>>1)+1$ and N is the number of angles supported in geometric partition mode. Let No represents the number of distances supported in geometric partition mode. Thus, the total number of geometric partition submodes are $N \times N_D$. For a block whose size is W×H with geometric partitioning index set to K, the mask for blending weights of luma samples are derived as follows.

A variable $N_{halfD}$ is set to $N_D >> 1$.
Variables angleIdx A and distanceIdx D are set to K % N and K/N, respectively.
A variable minSize is set to min(W, H)
Variables ratioWH and ratioHW is set to log 2(max(W/H, 1)) and log 2(max(H/W, 1)), respectively
A variable offset is calculated as follows:

$$offset = ((256 - minSize) >> 1) + D > N_{halfD} \ ? \ ((D - N_{halfD}) \times minSize) >> 3 : - ((D \times minSize) >> 3)$$

$$sampleWeight_L[x][y] = \begin{cases} g\_sampleWeight_L[A] & A < N_{reduced} \\ [(x >> ratioWH) + offset] \\ [(y >> ratioHW) + offset] \\ g\_sampleWeight_L[N - A] & \text{otherwise} \\ [minSize - 1 - \\ (x >> ratioWH) + offset] \\ [(y >> ratioHW) + offset] \end{cases}$$

The blending weights for chroma samples are subsampled from the weights of luma samples. That is, the weight of top-left luma sample for each corresponding 2×2 luma subblock is used as the weight of chroma sample for YUV 4:2:0 video format.

On the other hands, the mask for motion field storage is derived as follows:

A variable minSubblk is set to min(W, H)>>2
A variable offsetmotion is calculated as follows:

$$offsetmotion = ((64 - minSubblk) >> 1) + D > N_{halfD} \ ? \ ((D - N_{halfD}) \times minSize) >> 5 : - ((D \times minSize) >> 5)$$

$$motionMask[x_{subblk}][y_{subblk}] = \begin{cases} g\_motionMask[A] & A < N_{reduced} \\ [(x_{subblk} >> ratioWH) + offsetmotion] \\ [(y_{subblk} >> ratioHW) + offsetmotion] \\ g\_motionMask[N - A] & \text{otherwise} \\ [minSubblk - 1 - \\ (x_{subblk} >> ratioWH) + offsetmotion] \\ [(y_{subblk} >> ratioHW) + offsetmotion] \end{cases}$$

Figure 39:
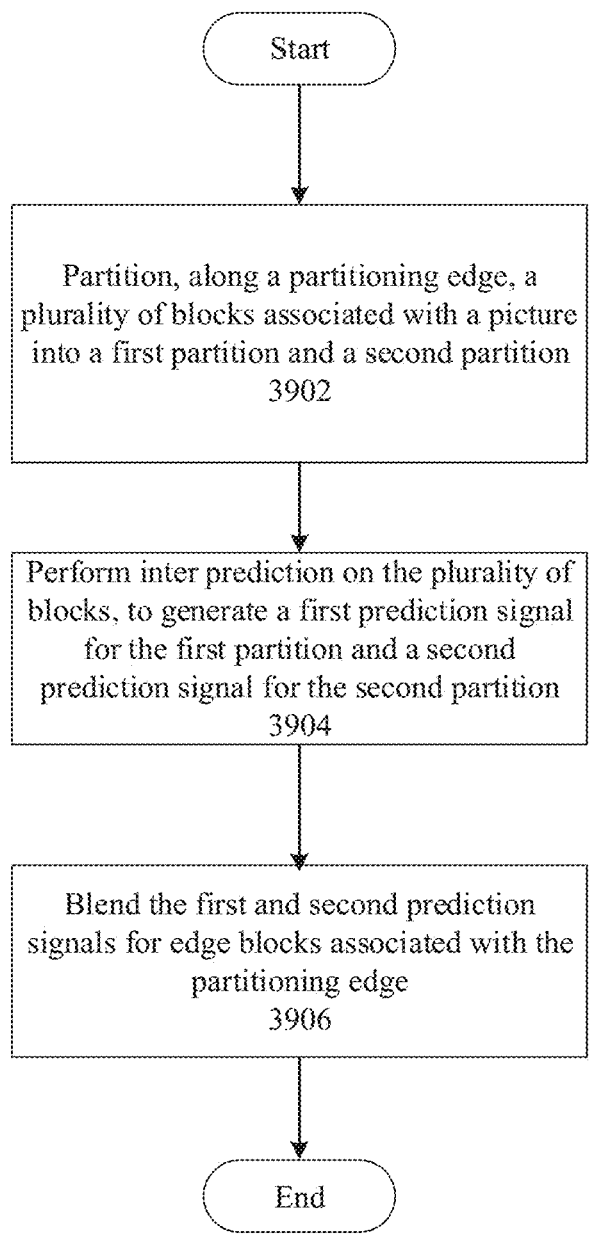
FIG. 39 is a flowchart of an exemplary method for processing video content, consistent with embodiments of the disclosure.

FIG. 39 is a flowchart of an exemplary method 3900 for processing video content, according to some embodiments of the disclosure. In some embodiments, method 3900 can be performed by a codec (e.g., an encoder using encoding processes 200A or 200B in FIGS. 2A-2B or a decoder using decoding processes 300A or 300B in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures.

The apparatus can perform method 3900 at the level of pictures. For example, the apparatus can process one picture at a time in method 3900. For another example, the apparatus can process a plurality of pictures at a time in method 3900. Method 3900 can include steps as below.

At step 3902, a plurality of blocks can be partitioned along a partitioning edge into a first partition and a second partition.

The plurality of blocks are subblocks of a first block associated with a picture. It is appreciated that a picture can be associated with a plurality of blocks (including the first block), and each of the block can be divided as a plurality of subblocks. The first block can be associated with a chroma block and a luma block. Accordingly, each of the plurality of blocks (e.g., the subblocks) can be associated with a chroma subblock and a luma subblock. A partition mode of the plurality of blocks (e.g., the subblocks) can be determined, and the plurality of blocks (e.g., the subblocks) can be partitioned based on the partition mode. The partitioning can provide improvement on inter prediction on the first block. An exemplary partition mode can include a triangle partition mode or a geometric partition mode.

As discussed above, the partition mode can be determined in accordance with at least one indication signal. For example, with reference back to FIG. 19, a first indication signal (e.g., a subblock merge flag), a second indication signal (e.g., a regular merge/MMVD flag), and a third indication signal (e.g., a CIIP flag) are provided to determine the partition mode for a first block. As shown in FIG. 19, whether the first block is coded using a subblock merge mode can be determined according to the first indication signal (e.g., a subblock merge flag). In response to the determination that the first block is not coded using the subblock merge mode, whether the first block is coded using one of a regular mode or a merge mode with motion vector differences (MMVD) can be determined according to the second indication signal (e.g., a regular merge/MMVD flag). In response to the determination that the first block is not coded using the regular mode or the MMVD, whether the first block is coded using the CIIP can be determined using the CIIP flag.

In some embodiments, before determining whether the first block is coded using the CIIP according to the third indication signal, step 3902 can further include: determining whether a size of the first block satisfies a given condition; and in response to the determination that the size of the first block satisfies the given condition, generating the third indication signal, or in response to the determination that the size of the first block fails to satisfy the given condition, determining the first block is coded using the CIIP mode. The given condition can include: a width and a height of the first block are both greater than or equal to 8; and a ratio of a greater value between the width and the height and a smaller value of between the width and the height is less than or equal to 4.

Then, in response to the determination that the first block is not coded using the CIIP mode, it can be determined that the partition mode of the first block is one of a triangle partition mode or a geometric partition mode.

When the partition mode of the first block is determined to be one of a triangle partition mode or a geometric partition mode, a target partitioning manner can be further determined according to a partition mode index, an angle index, or a distance index. Then, the partitioning edge corresponding to the target partitioning manner can be determined.

Generally, a partition mode (a triangle partition mode or a geometric partition mode) can be associated with a plurality of partitioning manners, and the partition mode index can indicate a number of a partitioning manner among the plurality of partitioning manners. The partition mode index can be associated with the angle index and the distance index. The angle index can indicate an angle of a partitioning edge of a given partitioning manner corresponding to the partition mode index, and the distance index can indicate a distance between the partitioning edge and a center of the first block.

In some embodiments, a look-up table (e.g., Table 22A of FIG. 22A or Table 22B of FIG. 22B) can include a plurality of partition mode indices, a plurality of angle indices, and a plurality of distance indices associated with a plurality of partitioning manners. Given a partition mode index (e.g., K), an angle index and a distance index associated with a partitioning manner can be determined. Thus, the target partitioning manner can be determined in the look-up table according to the partition mode index.

Among the plurality of partitioning manners, the look-up table can include a first partitioning manner associated with a first partition mode index and a second partitioning manner associated with a second partition mode index, and the first and second partitioning manners are directed to the triangle partition mode. For example, with reference to Table 22B of FIG. 22B, when the partition mode index of "10" is associated with partitioning the block from a top-left corner to a bottom-right corner. And, the partition mode index of "24" is associated with partitioning the block from a top-right corner to a bottom-left corner.

At step 3904, inter prediction can be performed on the plurality of blocks to generate a first prediction signal for the first partition and a second prediction signal for the second partition. A first motion vector can be applied to the first partition to generate the first prediction signal (e.g., a motion vector for the first partition), and a second motion vector can be applied to the second partition to generate the second prediction signal (e.g., a motion vector for the second partition). The first and second prediction signals can be stored in 4×4 subblocks.

At step 3906, the first and second prediction signals for edge blocks associated with the partitioning edge can be blended. As the first block has been partitioned before applying the inter prediction on the first block, partitions of the first block can be blended to finish the coding of the block. In some embodiments, edge blocks associated with the partitioning edge can be blended. It is appreciated that the prediction signal for blocks of each partition is identical. To blend the first and second prediction signals for the edge blocks associated with the partitioning edge, weights for each of the edge blocks can be determined.

In some embodiments, a set of masks can be generated for determining blending weights. For example, the first set of masks (e.g., g_sampleWeight$_L$[ ]) can contain several masks, a size of each mask is 256×256, and the masks are used to derive the blending weights for each block. A number (i.e., N) of the set of masks can be set to a number of angles supported in the geometric partition mode. For example, with reference to Table 22B of FIG. 22B, the number of the angles supported in the geometric partition mode is 64, and thus, the number of masks is 16. A first offset (e.g., offsetX) and a second offset (e.g., offsetY) can be determined based on a size of the block, an angle value of the target partitioning manner, and a distance value of the target partitioning manner. For example, offsetX and offsetY can be determined for a block with a size of W×H using the below equations.

$$offsetX = \begin{cases} (-W) >> 1 & \text{horizontal split or (not} \\ & \text{vertical split and } H \geq W) \\ ((-W) >> 1) + & \text{otherwise} \\ A < N \ ? \ ((D \times W) >> 3) : - \\ ((D \times W) >> 3) \end{cases}$$

$$offsetY = \begin{cases} ((-H) >> 1) + & \text{horizontal split or (not} \\ A < N \ ? \ ((D \times H) >> 3) : - & \text{vertical split and } H \geq W) \\ ((D \times H) >> 3) \\ (-H) >> 1 & \text{otherwise} \end{cases}$$

wherein A and D are an angle index and a distance index, respectively. The angle index A and the distance index D can be obtained from a look-up table (e.g., Table 22B of FIG. 22B) using the partition mode index K. Thus, a number of the set of masks is determined based on a number of angle indices of the look-up table, the angle value of the target partitioning manner is determined based on the angle index of the look-up table corresponding to the target partitioning manner, and the distance value of the target partitioning manner is determined based on the distance index of the look-up table corresponding to the target partitioning manner.

The angle index A is used to determine whether the split is horizontal or vertical. In the case that the angle index A is derived from the look-up table Table 22B of FIG. 22B, when the angle index A is equal to 8 or 24, the block is horizontal split. On the other hands, when the angle index is equal to 0 or 16, the block is vertical split. Therefore, the condition horizontal split or (not vertical split and H≥W) is equivalent to A % 16==8 or (A % 16 !=0 and H≥W)

As another example, offsetX and offsetY can be determined for a block with a size of W×H using the below equations.

$$offsetX = \begin{cases} (-W) >> 1 & \text{horizontal split or (not} \\ & \text{vertical split and } H \geq W) \\ ((-W) >> 1) + & \text{otherwise} \\ D > N_{halfD} \ ? \ ((D - N_{halfD}) \times \\ W) >> 3 : - ((D \times W) >> 3) \end{cases}$$

$$offsetY = \begin{cases} ((-H) >> 1) + & \text{horizontal split or (not} \\ D > N_{halfD} \ ? \ ((D - N_{halfD}) \times & \text{vertical split and } H \geq W) \\ H) >> 3 : - ((D \times H) >> 3) \\ (-H) >> 1 & \text{otherwise} \end{cases}$$

wherein $N_{halfD}$ is a half of a number of distances supported in the geometric partition mode, an angle index A and a distance index D can be determined based on the partition mode index K. For example, A=K % N, and D=K/N. Thus, the angle value of the target partitioning manner is determined based on the partition mode index and the number of angles supported in the geometric partition mode, and the distance value of the target partitioning manner is determined based on the partition mode index and the number of angles supported in the geometric partition mode.

Based on the set of masks (e.g., g_sampleWeight$_L$[ ]), a plurality of blending weights for the edge subblocks can be generated using the first and second offsets (offsetX and offsetY) can be determined.

In some embodiments, a first offset (e.g., offsetX) and a second offset (e.g., offsetY) can be determined without using the set of masks, and blending weights can be determined on-the-fly. For example, weights for each of the edge blocks can be calculated using the following equations:

$$offsetX = \begin{cases} (-W) >> 1 & \text{horizontal split or (not} \\ & \text{vertical split and } H \geq W) \\ ((-W) >> 1) + & \text{otherwise} \\ A < N \ ? \ (D \times W) >> 3 : - \\ ((D \times W) >> 3) \end{cases}$$

$$offsetY = \begin{cases} ((-H) >> 1) + & \text{horizontal split or (not} \\ A < N \ ? \ (D \times H) >> 3 : - & \text{vertical split and } H \geq W) \\ ((D \times H) >> 3) \\ (-H) >> 1 & \text{otherwise} \end{cases}$$

$displacementX = angleIdx$ $displacementY = (displacementX +$ $NumAngles >> 2) \% NumAngles$, where $NumAngles$ is set to 32.

The weight (e.g., sampleWeight$_L$[x][y]) for a luma sample located at position (x, y) can be calculated as follow:

$weightIdx = (((x + offsetX) << 1) + 1) * disLut[displacementX] +$ $(((y + offsetY) << 1) + 1) * disLut[displacementY]$ $partFlip = (angleIdx >= 13 \ \&\& \ angleIdx <= 27) \ ? \ 0:1$ $weightIdxL = partFlip \ ? \ 32 + weightIdx : 32 - weightIdx$ $sampleWeight_L[x][y] = Clip3(0, 8, (weightIdxL + 4) >> 3)$ As the first block includes a chroma block and a luma block, the plurality of blending weights can include a plurality of luma weights for the edge blocks and a plurality of chroma weights for the edge blocks. Among the plurality of chroma weights, a chroma weight is determined based on a luma weight for a top-left corner of a 2×2 subblock corresponding to the chroma weight. For example, with reference to FIG. 7, a luma weight for a top-left corner of a 2×2 luma subblock can be used as a chroma weight for a chroma block.

Accordingly, blending the first and second prediction signals for edge blocks associated with the partitioning edge can further include: blending the first and second prediction signals to determine luma values of the edge blocks according to the plurality of luma weights for the edge blocks; and blending the first and second prediction signals to determine chroma values of the edge blocks according to the plurality of chroma weights for the edge blocks.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for processing video content, comprising:
   partitioning, along a partitioning edge, a plurality of blocks associated with a picture into a first partition and a second partition;
   performing inter prediction on the plurality of blocks, to generate a first prediction signal for the first partition and a second prediction signal for the second partition; and
   blending the first and second prediction signals for edge blocks associated with the partitioning edge.

2. The method according to clause 1, wherein partitioning, along the partitioning edge, the plurality of blocks further comprises:
   determining a partition mode of the plurality of blocks; and
   partitioning the plurality of blocks based on the partition mode.

3. The method according to clause 2, wherein the plurality of blocks are subblocks of a first block, and determining the partition mode for the plurality of blocks further comprises:
   determining, according to a first indication signal, whether the first block is coded using a subblock merge mode;
   in response to the determination that the first block is not coded using the subblock merge mode, determining, according to a second indication signal, whether the first block is coded using one of a regular mode or a merge mode with motion vector differences (MMVD);
   in response to the determination that the first block is not coded using one of the regular mode or the MMVD, determining, according to a third indication signal, whether the first block is coded using a combined inter and intra prediction (CIIP) mode; and
   in response to the determination that the first block is not coded using the CIIP mode, determining the partition mode of the plurality of blocks is one of a triangle partition mode or a geometric partition mode.

4. The method according to clause 2 or 3, wherein partitioning, along the partitioning edge, the plurality of blocks further comprises:
   determining a target partitioning manner according to a partition mode index, an angle index, or a distance index; and
   determining the partitioning edge corresponding to the target partitioning manner.

5. The method according to clause 4, further comprising:
   generating a set of masks;
   determining a first offset and a second offset based on a size of the first block, an angle value of the target partitioning manner, and a distance value of the target partitioning manner; and
   generating, based on the set of masks, a plurality of blending weights using the first and second offsets.

6. The method according to clause 5, wherein a number of the set of masks is determined based on a number of angles supported in the geometric partition mode, the angle value of the target partitioning manner is determined based on the partition mode index and the number of angles supported in the geometric partition mode, and the distance value of the target partitioning manner is determined based on the partition mode index and the number of angles supported in the geometric partition mode.

7. The method according to clause 5 or 6, wherein determining the target partitioning manner according to the partition mode index, the angle index, or the distance index further comprises:
   determining the target partitioning manner according to a look-up table, wherein the look-up table comprises a plurality of partition mode indices, a plurality of angle indices, and a plurality of distance indices associated with a plurality of partitioning manners.

8. The method according to clause 7, wherein
   a number of the set of masks is determined based on a number of angle indices of the look-up table, the angle value of the target partitioning manner is determined based on an angle index of the look-up table corresponding to the target partitioning manner, and the distance value of the target partitioning manner is determined based on a distance index of the look-up table corresponding to the target partitioning manner.

9. The method according to clause 7 or 8, wherein the look-up table comprises, among the plurality of partitioning manners, a first partitioning manner associated with a first partition mode index and a second partitioning manner associated with a second partition mode index, the first and second partitioning manners corresponding to the triangle partition mode.

10. The method according to clause 9, wherein the first partition mode index is equal to 10 and the first partitioning manner associated with the first partition mode index corresponds to splitting the block from a top-left corner to a bottom-right corner of the block, and the second partition mode index is equal to 24 and the second partitioning manner associated with the second partition mode index corresponds to splitting the block from a top-right corner to a bottom-left corner of the block.

11. The method according to any one of clauses 5-10, wherein the plurality of blending weights comprise a plurality of luma weights for the edge blocks and a plurality of chroma weights for the edge blocks, and blending the first and second prediction signals for the edge blocks associated with the partitioning edge further comprises:
   determining luma values of the edge blocks according to the plurality of luma weights for the edge subblocks; and
   determining chroma values of the edge subblocks according to the plurality of chroma weights for the edge subblocks.

12. The method according to clause 11, wherein, among the plurality of chroma weights, a chroma weight is determined based on a luma weight for a top-left corner of a 2×2 block corresponding to the chroma weight.

13. The method according to clause 4, further comprising:
   determining a first offset and a second offset based on a size of the first block, an angle value of the target partitioning manner, and a distance value of the target partitioning manner; and
   generating a plurality of blending weights for luma samples in the first block using the first and second offsets.

14. The method according to clause 13, wherein the first offset and the second offset are determined using the below equations:

$$\text{the first offset} = \begin{cases} (-W) >> 1 & A \% 16 == 8 \text{ or } (A \% 16 ! = 0 \text{ and } H \geq W) \\ ((-W) >> 1) + \\ A < 16 \ ? \ (D \times W) >> 3 : - \\ ((D \times W) >> 3) & \text{otherwise} \end{cases}$$

-continued $$\text{the second offset} = \begin{cases} ((-H) >> 1) + & A \% 16 == 8 \text{ or } (A \% \\ A < 16 \; ? \; (D \times H) >> 3 : - & 16! = 0 \text{ and } H \geq W) \\ ((D \times H) >> 3) \\ (-H) >> 1 & \text{otherwise} \end{cases},$$

wherein W represents a width of the first block, H represents a height of the first block, A represents the angle value of the targeting partitioning manner, and D represents the distance value of the targeting partitioning manner.

15. The method according to any one of clauses 3-14, wherein before determining, according to the third indication signal, whether the first block is coded using the combined inter and intra prediction (CIIP) mode, the method further comprises:
   determining whether a size of the first block satisfies a given condition; and
   in response to the determination that the size of the first block satisfies the given condition, generating the third indication signal, or
   in response to the determination that the size of the block fails to satisfy the given condition, determining the block is coded using the CIIP mode.

16. The method according to clause 15, wherein the given condition comprises:
   a width and a height of the first block are each greater than or equal to 8; and
   a ratio of a greater value between the width and the height and a smaller value between the width and the height is less than or equal to 4.

17. A system for processing video content, comprising:
   a memory storing a set of instructions; and
   at least one processor configured to execute the set of instructions to cause the system to perform:
   partitioning, along a partitioning edge, a plurality of blocks associated with a picture into a first partition and a second partition;
   performing inter prediction on the plurality of blocks, to generate a first prediction signal for the first partition and a second prediction signal for the second partition; and
   blending the first and second prediction signals for edge blocks associated with the partitioning edge.

18. The system according to clause 17, wherein in partitioning, along the partitioning edge, the plurality of blocks, the at least one processor is configured to execute the set of instructions to cause the system to further perform:
   determining a partition mode of the plurality of blocks; and
   partitioning the plurality of blocks based on the partition mode.

19. The system according to clause 18, wherein the plurality of blocks are subblocks of a first block, and in determining the partition mode for the plurality of blocks, the at least one processor is configured to execute the set of instructions to cause the system to further perform:
   determining, according to a first indication signal, whether the first block is coded using a subblock merge mode;
   in response to the determination that the first block is not coded using the subblock merge mode, determining, according to a second indication signal, whether the first block is coded using one of a regular mode or a merge mode with motion vector differences (MMVD);
   in response to the determination that the first block is not coded using one of the regular mode or the MMVD, determining, according to a third indication signal, whether the first block is coded using a combined inter and intra prediction (CIIP) mode; and
   in response to the determination that the first block is not coded using the CIIP mode, determining the partition mode of the plurality of blocks is one of a triangle partition mode or a geometric partition mode.

20. A non-transitory computer readable medium storing instructions that are executable by at least one processor of a computer system, wherein the execution of the instructions causes the computer system to perform a method comprising:
   partitioning, along a partitioning edge, a plurality of blocks associated with a picture into a first partition and a second partition;
   performing inter prediction on the plurality of blocks, to generate a first prediction signal for the first partition and a second prediction signal for the second partition; and
   blending the first and second prediction signals for edge blocks associated with the partitioning edge.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video decoding method, comprising:
   decoding a bitstream associated with a picture;
   reconstructing a first block of the picture;
   partitioning, along a partitioning edge, the first block into a first partition and a second partition, the partitioning comprising:
      determining a target partitioning manner according to a partition mode index, an angle index, or a distance index; and
      determining the partitioning edge corresponding to the target partitioning manner;
   performing inter prediction on the first block, to generate a first prediction signal for the first partition and a second prediction signal for the second partition;
   determining a first offset and a second offset based on a size of the first block, an angle value of the target partitioning manner, and a distance value of the target partitioning manner, wherein the first offset and the second offset are determined based on the below equations:

$$\text{the first offset} = \begin{cases} (-W) >> 1 & A\ \%\ 16 == 8\ \text{or}\ (A\ \%\ 16\ != 0\ \text{and}\ H \geq W) \\ ((-W) >> 1) + \\ A < 16\ ?\ (D \times W) >> 3 : - \\ ((D \times W) >> 3) & \text{otherwise} \end{cases}$$

$$\text{the second offset} = \begin{cases} ((-H) >> 1) + \\ A < 16\ ?\ (D \times H) >> 3 : - & A\ \%\ 16 == 8\ \text{or}\ (A\ \%\ 16\ != 0\ \text{and}\ H \geq W) \\ ((D \times H) >> 3) \\ (-H) >> 1 & \text{otherwise} \end{cases},$$

wherein "W" represents a width of the first block, "H" represents a height of the first block, "A" represents the angle value of the targeting partitioning manner, and "D" represents the distance value of the targeting partitioning manner; and
   determining, based on the first and second offsets, a mask for motion field storage.

2. The method of claim 1, wherein partitioning, along the partitioning edge, the first block further comprises:
   determining a partition mode of the first block, comprising:
      determining, according to a first indication signal, whether the first block is coded using a subblock merge mode;
      in response to the determination that the first block is not coded using the subblock merge mode, determining, according to a second indication signal, whether the first block is coded using one of a regular mode or a merge mode with motion vector differences (MMVD); and
      in response to the determination that the first block is not coded using one of the regular mode or the MMVD, determining, according to a third indication signal, whether the first block is coded using a combined inter and intra prediction (CIIP) mode; and
   partitioning the first block based on the partition mode.

3. The method of claim 2, wherein in response to the determination that the first block is not coded using the CIIP mode, determining the partition mode of the first block is one of a triangle partition mode or a geometric partition mode.

4. The method of claim 3, further comprising:
   determining a set of masks; and
   determining, based on the set of masks, a plurality of blending weights using the first and second offsets.

5. The method of claim 4, wherein:
   a number of the set of masks is determined based on a number of angles supported in the geometric partition mode;
   the angle value of the target partitioning manner is determined based on the partition mode index and the number of angles supported in the geometric partition mode; and
   the distance value of the target partitioning manner is determined based on the partition mode index and the number of angles supported in the geometric partition mode.

6. The method of claim 4, wherein determining the target partitioning manner according to the partition mode index, the angle index, or the distance index further comprises:
   determining the target partitioning manner according to a look-up table, wherein the look-up table comprises a plurality of partition mode indices, a plurality of angle indices, and a plurality of distance indices associated with a plurality of partitioning manners.

7. The method of claim 6, wherein:
   a number of the set of masks is determined based on a number of angle indices of the look-up table;
   the angle value of the target partitioning manner is determined based on an angle index of the look-up table corresponding to the target partitioning manner; and
   the distance value of the target partitioning manner is determined based on a distance index of the look-up table corresponding to the target partitioning manner.

8. The method of claim 6, wherein the look-up table comprises, among the plurality of partitioning manners, a first partitioning manner associated with a first partition mode index and a second partitioning manner associated with a second partition mode index, the first partitioning manner and the second partitioning manner corresponding to the triangle partition mode.

9. The method of claim 8, wherein:
   the first partition mode index is equal to 10 and the first partitioning manner associated with the first partition mode index corresponds to splitting the block from a top-left corner to a bottom-right corner of the block; and
   the second partition mode index is equal to 24 and the second partitioning manner associated with the second partition mode index corresponds to splitting the block from a top-right corner to a bottom-left corner of the block.

10. The method of claim 4, wherein the plurality of blending weights comprise a plurality of luma weights for the luma samples surrounding the partitioning edge and a plurality of chroma weights for the chroma samples surrounding the partitioning edge, and blending the first and second prediction signals for the samples associated with the partitioning edge further comprises:
  determining luma values of the luma samples according to the plurality of luma weights; and
  determining chroma values of the chroma samples according to the plurality of chroma weights.

11. The method of claim 10, wherein, among the plurality of chroma weights, a chroma weight is determined based on a luma weight for a top-left corner of a 2×2 block corresponding to the chroma weight.

12. The method of claim 2, wherein before determining, according to the third indication signal, whether the first block is coded using the combined inter and intra prediction (CIIP) mode, the method further comprises:
  determining whether a size of the first block satisfies a given condition; and
  in response to the determination that the size of the first block satisfies the given condition, generating the third indication signal, or
  in response to the determination that the size of the block fails to satisfy the given condition, determining the block is coded using the CIIP mode.

13. The method of claim 12, wherein the given condition comprises:
  a width and a height of the first block are both greater than or equal to 8; and
  a ratio of a greater value between the width and the height and a smaller value between the width and the height is less than or equal to 4.

14. A video encoding method, comprising:
  partitioning, along a partitioning edge, a first block associated with a picture into a first partition and a second partition, the partitioning comprising:
    determining a target partitioning manner according to a partition mode index, an angle index, or a distance index; and
    determining the partitioning edge corresponding to the target partitioning manner;
  performing inter prediction on the first block, to generate a first prediction signal for the first partition and a second prediction signal for the second partition;
  determining a first offset and a second offset based on a size of the first block, an angle value of the target partitioning manner, and a distance value of the target partitioning manner, wherein the first offset and the second offset are determined based on the below equations:

$$\text{the first offset} = \begin{cases} (-W) >> 1 & A \% 16 == 8 \text{ or } (A \% 16 != 0 \text{ and } H \geq W) \\ ((-W) >> 1) + \\ A < 16 \ ? \ (D \times W) >> 3 : - \\ ((D \times W) >> 3) & \text{otherwise} \end{cases}$$

$$\text{the second offset} = \begin{cases} ((-H) >> 1) + \\ A < 16 \ ? \ (D \times H) >> 3 : - & A \% 16 == 8 \text{ or } (A \% 16 != 0 \text{ and } H \geq W) \\ ((D \times H) >> 3) \\ (-H) >> 1 & \text{otherwise} \end{cases},$$

wherein "W" represents a width of the first block, "H" represents a height of the first block, "A" represents the angle value of the targeting partitioning manner, and "D" represents the distance value of the targeting partitioning manner;
  determining, based on the first and second offsets, a mask for motion field storage; and
  encoding, based on the mask for motion field storage, the picture into a bitstream.

15. The method of claim 14, wherein partitioning, along the partitioning edge, the first block further comprises:
  determining a partition mode of the first block, comprising:
    determining, according to a first indication signal, whether the first block is coded using a subblock merge mode;
    in response to the determination that the first block is not coded using the subblock merge mode, determining, according to a second indication signal, whether the first block is coded using one of a regular mode or a merge mode with motion vector differences (MMVD); and
    in response to the determination that the first block is not coded using one of the regular mode or the MMVD, determining, according to a third indication signal, whether the first block is coded using a combined inter and intra prediction (CIIP) mode; and
  partitioning the first block based on the partition mode.

16. The method of claim 15, wherein before determining, according to the third indication signal, whether the first block is coded using the combined inter and intra prediction (CIIP) mode, the at least one processor is further configured to cause the system to perform:
  determining whether a size of the first block satisfies a given condition; and
  in response to the determination that the size of the first block satisfies the given condition, generating the third indication signal, or
  in response to the determination that the size of the block fails to satisfy the given condition, determining the block is coded using the CIIP mode.

17. The method of claim 16, wherein the given condition comprises:
  a width and a height of the first block are both greater than or equal to 8; and
  a ratio of a greater value between the width and the height and a smaller value between the width and the height is less than or equal to 4.

18. A method of storing a video, the method comprising:
  partitioning, along a partitioning edge, a first block associated with a picture into a first partition and a second partition, the partitioning comprising:
    determining a target partitioning manner according to a partition mode index, an angle index, or a distance index; and
    determining the partitioning edge corresponding to the target partitioning manner;
  performing inter prediction on the first block, to generate a first prediction signal for the first partition and a second prediction signal for the second partition;
  determining a first offset and a second offset based on a size of the first block, an angle value of the target partitioning manner, and a distance value of the target partitioning manner, wherein the first offset and the second offset are determined based on the below equations:

$$\text{the first offset} = \begin{cases} (-W) >> 1 & A \% 16 == 8 \text{ or } (A \% 16 != 0 \text{ and } H \geq W) \\ ((-W) >> 1) + & \text{otherwise} \\ A < 16 \ ? \ (D \times W) >> 3 : - \\ ((D \times W) >> 3) \end{cases}$$

-continued the second offset =
$$\begin{cases} ((-H) >> 1) + & A \% 16 == 8 \text{ or } (A \% \\ A < 16 \text{ ? } (D \times H) >> 3 : - & 16! = 0 \text{ and } H \geq W) \\ ((D \times H) >> 3) \\ (-H) >> 1 & \text{otherwise} \end{cases}, 5$$

wherein "W" represents a width of the first block, "H" represents a height of the first block, "A" represents the angle value of the targeting partitioning manner, and "D" represents the distance value of the targeting partitioning manner;

determining, based on the first and second offsets, a mask for motion field storage;

generating a bitstream comprising coded information representing the mask for motion field; and storing the bitstream in a non-transitory computer readable medium.

19. The method of claim 18, wherein partitioning, along the partitioning edge, the first block further comprises:

determining a partition mode of the first block, comprising:

determining, according to a first indication signal, whether the first block is coded using a subblock merge mode;

in response to the determination that the first block is not coded using the subblock merge mode, determining, according to a second indication signal, whether the first block is coded using one of a regular mode or a merge mode with motion vector differences (MMVD); and in response to the determination that the first block is not coded using one of the regular mode or the MMVD, determining, according to a third indication signal, whether the first block is coded using a combined inter and intra prediction (CIIP) mode; and partitioning the first block based on the partition mode.

20. The method of claim 19, wherein before determining, according to the third indication signal, whether the first block is coded using the combined inter and intra prediction (CIIP) mode, the method further comprises:

determining whether a size of the first block satisfies a given condition; and in response to the determination that the size of the first block satisfies the given condition, generating the third indication signal, or in response to the determination that the size of the block fails to satisfy the given condition, determining the block is coded using the CIIP mode.

* * * * *